US008347399B2

(12) United States Patent
Levien et al.

(10) Patent No.: US 8,347,399 B2
(45) Date of Patent: *Jan. 1, 2013

(54) PROVIDING GREATER ACCESS TO ONE OR MORE ITEMS IN RESPONSE TO DETERMINING DEVICE TRANSFER

(75) Inventors: Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/066,917

(22) Filed: Apr. 26, 2011

(65) Prior Publication Data
US 2012/0254985 A1 Oct. 4, 2012

Related U.S. Application Data

(63) Continuation-in-part of application No. 13/065,885, filed on Mar. 30, 2011, and a continuation of application No. 13/066,848, filed on Apr. 25, 2011.

(51) Int. Cl.
*G06F 7/00* (2006.01)
(52) U.S. Cl. ............. 726/26; 726/17; 382/103; 382/118
(58) Field of Classification Search ............... 726/17.26; 382/103, 118; 455/418, 411, 466; 463/29
See application file for complete search history.

(56) References Cited

U.S. PATENT DOCUMENTS

| 7,260,726 | B1 * | 8/2007 | Doe et al. ...................... 713/189 |
| 2009/0253410 | A1 * | 10/2009 | Fitzgerald et al. ............ 455/411 |
| 2010/0222141 | A1 * | 9/2010 | LaSalvia et al. ............... 463/29 |
| 2011/0093806 | A1 * | 4/2011 | Cohen et al. .................. 715/772 |
| 2011/0107427 | A1 * | 5/2011 | Cohen et al. .................... 726/26 |
| 2011/0202269 | A1 * | 8/2011 | Reventlow .................... 701/201 |
| 2011/0231911 | A1 * | 9/2011 | White et al. ...................... 726/7 |
| 2011/0265179 | A1 * | 10/2011 | Newman et al. ................ 726/22 |
| 2011/0317872 | A1 * | 12/2011 | Free .............................. 382/103 |
| 2012/0028625 | A1 * | 2/2012 | Konig ........................... 455/418 |
| 2012/0081392 | A1 | 4/2012 | Arthur |

OTHER PUBLICATIONS

Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unlock_customize_interact_with_ios_devices.html.
U.S. Appl. No. 13/374,479, Levien et al.
U.S. Appl. No. 13/374,352, Levien et al.

(Continued)

*Primary Examiner* — Kimyen Vu
*Assistant Examiner* — Sayed Beheshti Shirazi

(57) ABSTRACT

A computationally implemented method includes, but is not limited to: determining that a computing device associated with a first user and that was in possession of a second user has been transferred from the second user to the first user; and providing at least greater access via the computing device to one or more items in response to determining that the computing device has been transferred from the second user to the first user. In addition to the foregoing, other method aspects are described in the claims, drawings, and text forming a part of the present disclosure.

41 Claims, 26 Drawing Sheets

OTHER PUBLICATIONS

U.S. Appl. No. 13/374,213, Levien et al.
U.S. Appl. No. 13/374,083, Levien et al.
U.S. Appl. No. 13/373,796, Levien et al.
U.S. Appl. No. 13/373,679, Levien et al.
U.S. Appl. No. 13/317,832, Levien et al.
U.S. Appl. No. 13/317,827, Levien et al.
U.S. Appl. No. 13/200,800, Levien et al.
U.S. Appl. No. 13/200,743, Levien et al.
U.S. Appl. No. 13/199,286, Levien et al.
U.S. Appl. No. 13/199,237, Levien et al.
U.S. Appl. No. 13/135,392, Levien et al.
U.S. Appl. No. 13/135,314, Levien et al.
U.S. Appl. No. 13/066,848, Levien et al.
U.S. Appl. No. 13/065,964, Levien et al.
U.S. Appl. No. 13/065,885, Levien et al.
"Computer Detecting User Presence Video Mockup [Ubuntu]"; Web Upd8.org; Bearing a date of Sep. 14, 2010; pp. 1-11; located at: http://www.webup08.org/2010/09/computer-detecting-user-presence-video.html; printed on Mar. 30, 2011.
"How do I detect when a user is sitting in the chair in front of a computer?"; Superuser.com; Bearing a date of Aug. 11, 2009; 5 Total pages; located at: http://superuser.com/questions/21364/how-do-i-detect-when-a-user-is-sitting-in-the-chair-in-front-of-a-computer.
Pike, John; "Homeland Security: Biometrics"; GlobalSecurity.org; Bearing a date of Mar. 9, 2007; 4 Total pages; located at: http://www.globalsecurity.org/security/systems/biometrics.htm.

* cited by examiner

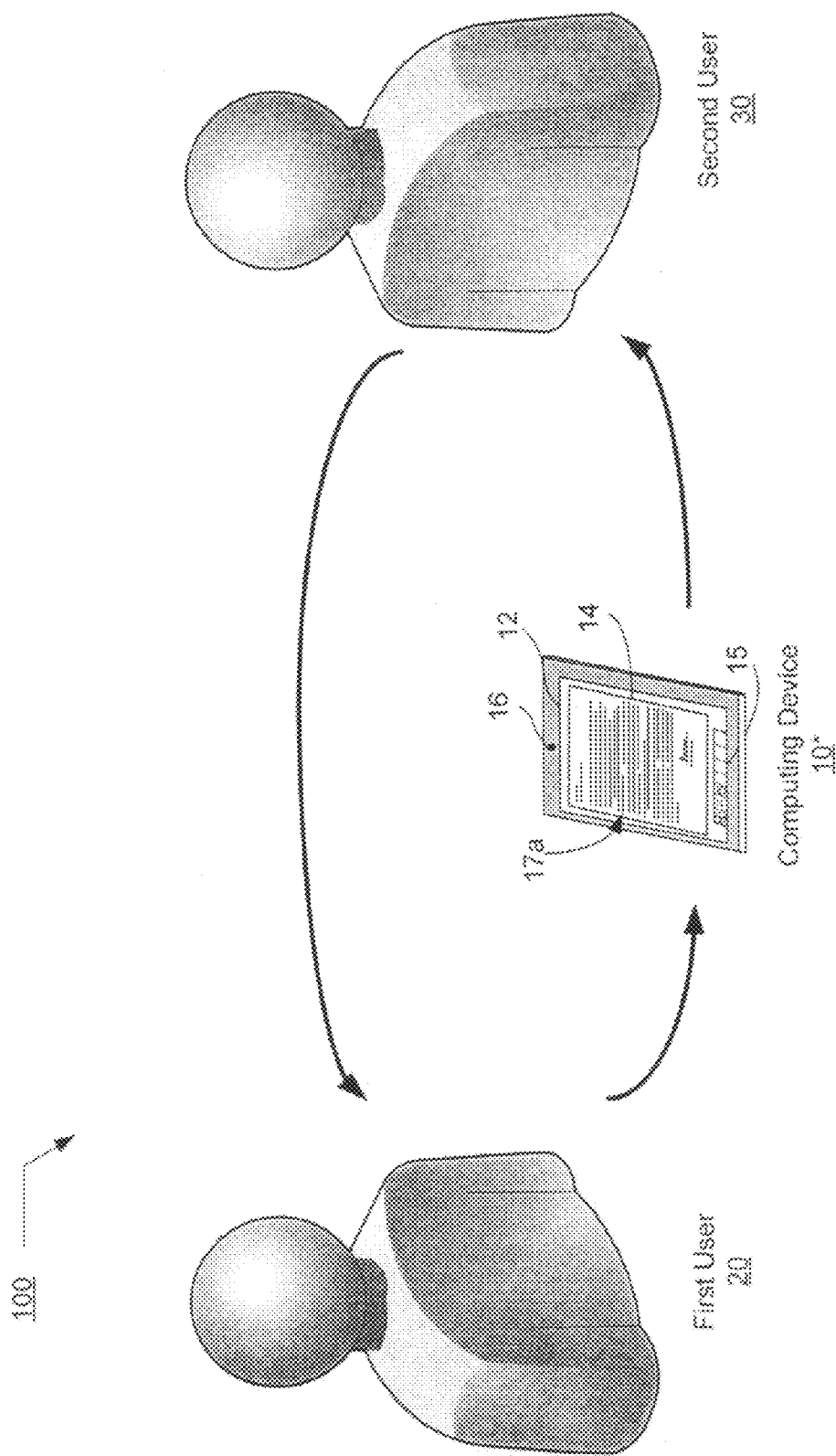

PROVIDING GREATER ACCESS TO ONE OR MORE ITEMS IN RESPONSE TO DETERMINING DEVICE TRANSFER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

For purposes of the USPTO extra-statutory requirements, the present application constitutes a continuation-in-part of U.S. patent application Ser. No. 13/065,885, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 30 Mar. 2011, which is currently co-pending or is an application of which a currently co-pending application is entitled to the benefit of the filing date.

For purposes of the USPTO extra-statutory requirements, the present application constitutes a continuation of U.S. patent application Ser. No. 13/066,848, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 25 Apr. 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A computationally implemented method includes, but is not limited to determining that a computing device associated with a first user and that was in possession of a second user has been transferred from the second user to the first user, wherein said determining that a computing device associated with a first user and that was in possession of a second user has been transferred from the second user to the first user is performed via at least one of a machine, article of manufacture, or composition of matter; and providing at least greater access via the computing device to one or more items in response to determining that the computing device has been transferred from the second user to the first user. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein-referenced method aspects depending upon the design choices of the system designer.

A computationally implemented system includes, but is not limited to: means for determining that a computing device associated with a first user and that was in possession of a second user has been transferred from the second user to the first user; and means for providing at least greater access via the computing device to one or more items in response to determining that the computing device has been transferred from the second user to the first user. In addition to the foregoing, other system aspects are described in the claims, drawings, and text forming a part of the present disclosure.

A computationally implemented system includes, but is not limited to: circuitry for determining that a computing device associated with a first user and that was in possession of a second user has been transferred from the second user to the first user; and circuitry for providing at least greater access via the computing device to one or more items in response to determining that the computing device has been transferred from the second user to the first user. In addition to the foregoing, other system aspects are described in the claims, drawings, and text forming a part of the present disclosure.

A computer program product comprising an article of manufacture bearing one or more instructions for determining that a computing device associated with a first user and that was in possession of a second user has been transferred from the second user to the first user; and one or more instructions for providing at least greater access via the computing device to one or more items in response to determining that the computing device has been transferred from the second user to the first user. In addition to the foregoing, other computer program product aspects are described in the claims, drawings, and text forming a part of the present disclosure.

A method for providing greater access to one or more items through a computing device, the method includes determining that a computing device associated with a first user and that was in possession of a second user has been transferred from the second user to the first user, wherein said determining that a computing device associated with a first user and that was in possession of a second user has been transferred from the second user to the first user is performed via at least one of a machine, article of manufacture, or composition of matter; and providing at least greater access via the computing device to one or more items in response to determining that the computing device has been transferred from the second user to the first user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 shows a computing device 10* being transferred between two users in an exemplary environment 100.

FIG. 5l is a high-level logic flowchart of a process depicting alternate implementations of the transfer determining operation 402 of FIG. 4.

DETAILED DESCRIPTION

Figure 2A:
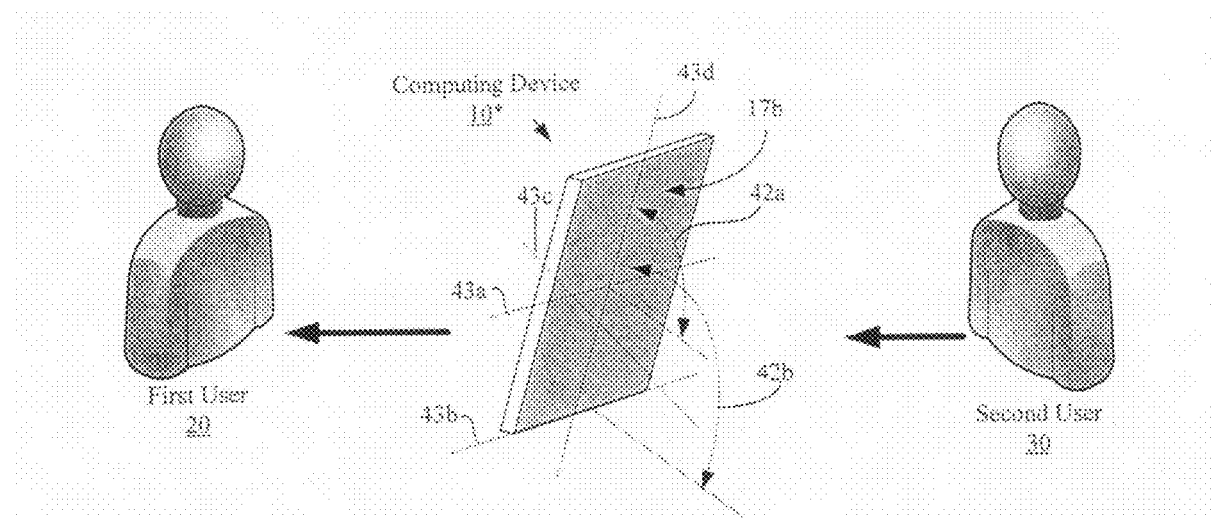
FIG. 2a shows one type of movement of the computing device 10* of FIG. 1 that may be directly detected/monitored by the computing device 10*.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have resulted in the development of computing devices that have increasingly smaller and smaller form factors while still maintaining exceptional processing capabilities. Examples of such computing devices include, for example, laptops, Netbooks, tablet computers (i.e., "slate" computers), e-readers, Smartphones, and so forth. Because of their compactness, such devices are becoming much easier to share among a plurality of users. That is, because of their small form factors, such devices allow users of such devices to easily pass or handoff their devices for others to use in order to access various items (e.g., documents, files, applications, and so forth). For example, suppose a primary user (e.g., an owner) of a tablet computer wants to show an electronic document that is being displayed through his/her tablet computer to a friend sitting across a table from the primary user. Typically, in order to show the electronic document that is being displayed through the tablet computer to the friend, the primary user may simply pass or handover the tablet computer to the friend thereby allowing the friend to view the electronic document.

Unfortunately by doing so, the primary user's friend, in addition to having access to the electronic document, may have access to many other things that the primary user may not want the friend to have access to. For example, upon handed the tablet computer, the friend may be able to view any confidential documents, images, applications, websites, passwords, and so forth, that may be open or running at the time that the tablet computer was handed over to the friend. Even worse, the primary users friend may be able to not just access open applications and content, but may be able to retrieve/use/modify any content (e.g., documents, image files, audio files, etc.) or applications that may be stored in the tablet computer.

In accordance with various embodiments, computationally implemented methods, systems, and articles of manufacture are provided that can provide greater or lesser accessibility via a computing device (e.g., a tablet computer, a Smartphone, a laptop computer, or other types of portable computer device) to one or more items (e.g., documents, files, image or audio files, applications, passwords, and so forth) depending upon whether the computing device, which may be associated with a first user (e.g., a user who can be identified by the computing device, such as by facial recognition system or password, and who is recognized by the computing device as having superior access right to the computing device and/or to items stored in the computing device such as the primary user or owner of the computing device), has been transferred from the first user to a second user (e.g., a third party who has inferior rights to access the one or more items than the first user) or whether the computing device has been transferred from the second user to the first user. In particular, the computationally implemented methods, systems, and articles of manufacture may be designed to automatically determine whether a computing device that is associated with a first user has been transferred from the first user to a second user; and in response to determining that the computing device has indeed been transferred from the first user to the second user, automatically configure the computing device to restrict access to one or more items (e.g., documents, files, image or audio files, applications, passwords, and so forth) that may have been accessible to the first user when the first user was in possession of the computing device.

Additionally or alternatively, the computationally implemented methods, systems, and articles of manufacture may be designed to, upon the computing device being transferred from the second user to the first user, determine that the computing device has indeed been transferred from the second user to the first user, and in response to determining that the computing device has been transferred back to the first user, automatically configure the computing device to provide at least greater access to the one or more items that may not have been accessible when the computing device was in the possession of the second user. In various embodiments, such computationally implemented methods, systems, and articles of manufacture may be implemented at the computing device.

Referring now to FIG. 1 illustrating a computing device 10* in an exemplary environment 100 being transferred back-and-forth between two users. In particular, FIG. 1 shows a computing device 10* being transferred from a first user 20 to a second user 30, and from the second user 30 back to the first user 20. For purposes of the following description, the first user 20 will be a user, such as the primary user or owner of the computing device 10*, who the computing device 10* can identify and who the computing device 10* recognizes as having superior access rights than others (e.g., the second user 30) to the computing device 10* and/or to one or more items (e.g., documents, image or audio files, applications, passwords, etc.) that may be stored/available through the computing device 10*. In contrast, the second user 30 may be any third party who has inferior access rights than the first user 20 to the computing device 10* and/or to the one or more items.

As will be further described herein, the illustrated computing device 10* may employ the computationally implemented methods, systems, and articles of manufacture in accordance with various embodiments. In particular, the computing device 10* may be endowed with logic that is designed to determine that the computing device 10* is being or has been transferred (e.g., handed or passed-off) from a first user 20 to a second user 30, and in response to such a determination, automatically restrict access to one or more items (e.g., electronic documents, image or audio files, passwords, applications, and so forth) that may have been accessible to the first user 20 when the first user 20 had possession of the computing device 10*.

The endowed logic may alternatively or additionally be designed to, upon the computing device 10* being transferred from the second user 30 (e.g., a user recognized by the computing device 10* as having inferior access rights) to the first user 20 (e.g., a user recognized by the computing device 10* as having superior access rights), determine that the computing device 10* is being or has been transferred from the second user 30 back to the first user 20, and in response to such a determination, automatically provide at least greater access to the one or more items than the access that was allowed for the one or more items when the computing device 10* was in possession of the second user 30. Note that in some embodiments a computing device 10* may be in the possession of a user (e.g., the first user 20 or the second user 30) when the user has some sort of control over the computing device 10* such as by holding the computing device 10*, by being in physical contact with the computing device 10*, by being physically closer to the computing device 10* than anyone else, or by being within reach, such within three or four feet, of the computing device 10*.

In various embodiments, the determination that the computing device 10* has been transferred from, for example, the second user 30 to the first user 20 (or vice versa) may be automatic without any interference (or input) by the first user 20 or the second user 30. In some embodiments, and for purposes of the following description, the first user 20 may be any user who has superior access rights than other users (e.g., second user 30) to the computing device 10* and/or to items (e.g., documents, images, applications, etc.) stored in the computing device 10*. Examples of a first user 20 include, for example, a primary user, such as the owner, of the computing device 10*. In contrast, a second user 30 for purposes of the following description may be any third party who has inferior access rights than the first user 20 to the computing device 10* and/or to the items that may be accessed via the computing device 10*. As will be further described herein, note that FIGS. 3a and 3b illustrate two different implementations of the computing device 10* of FIG. 1 illustrated in FIG. 3a as computing device 10' and in FIG. 3b as computing device 10".

Figure 2B:
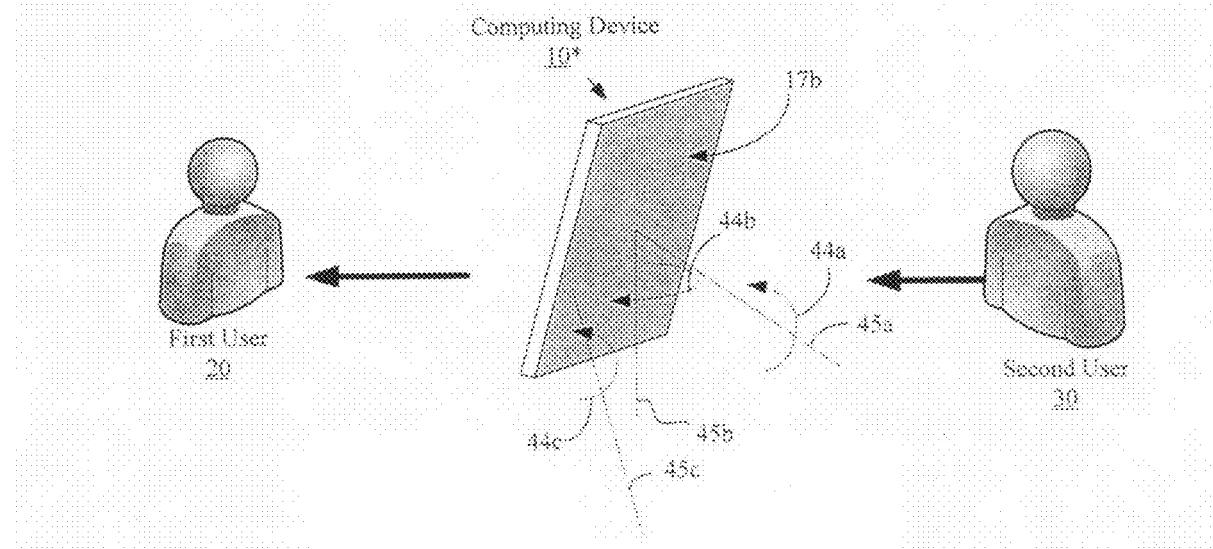
FIG. 2b shows another type of movement of the computing device 10* of FIG. 1 that may be directly detected/monitored by the computing device 10*.
Figure 2C:
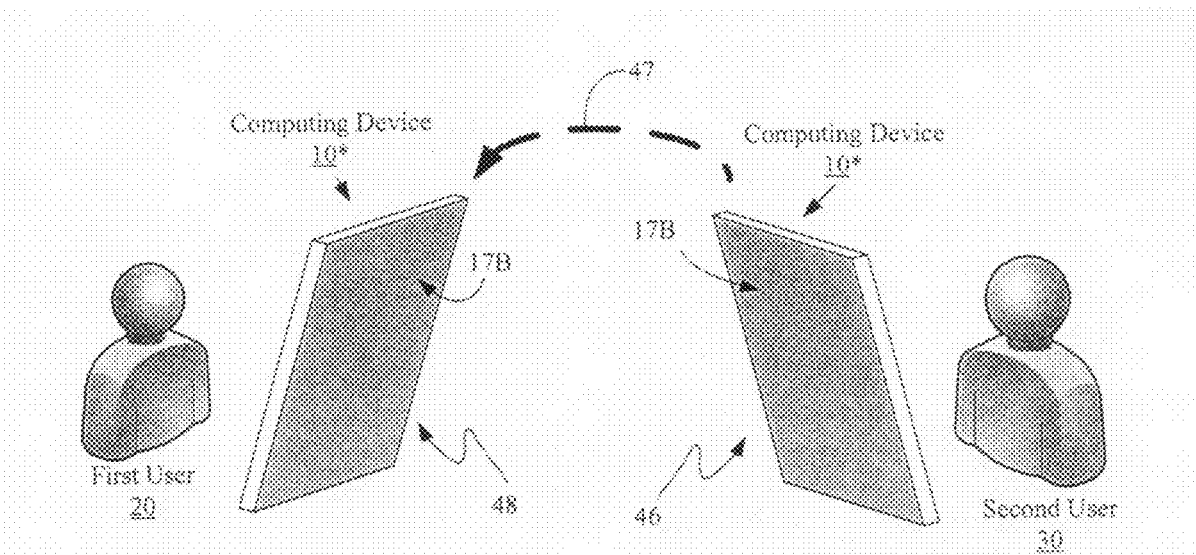
FIG. 2c shows another type of movement of the computing device 10* of FIG. 1 that may be directly detected/monitored by the computing device 10*.
Figure 2D:
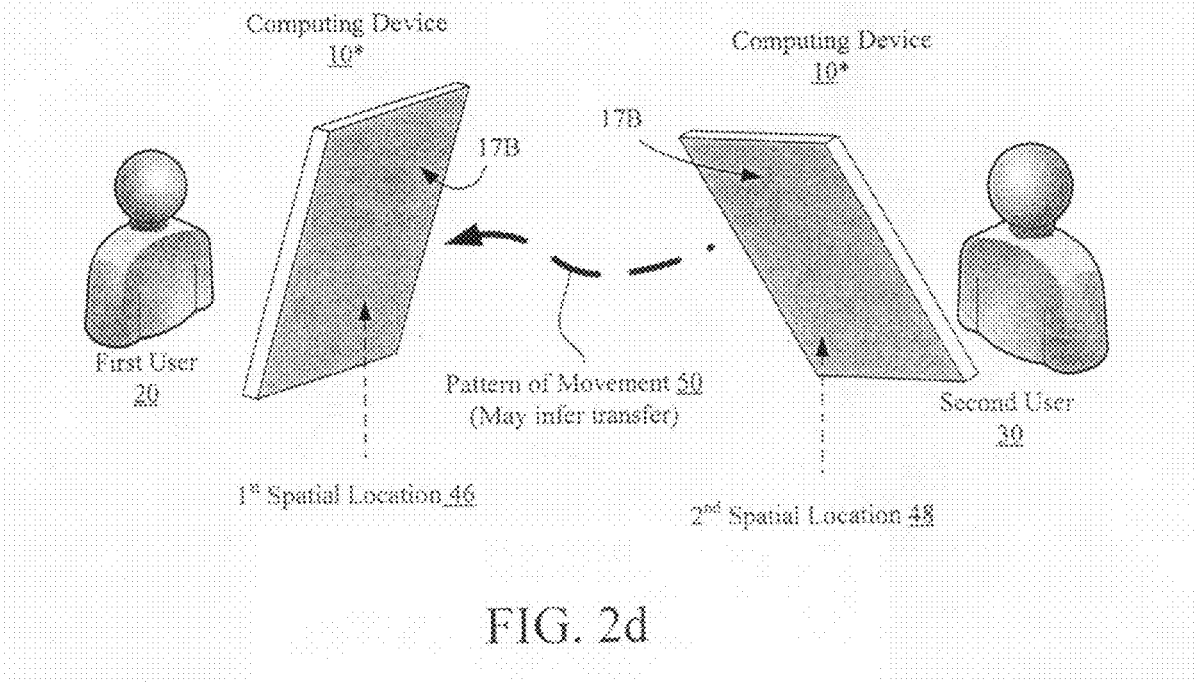
FIG. 2d shows overall 3-dimensional movements of the computing device 10* of FIG. 1 that may be directly detected/monitored by the computing device 10*.
Figure 3A:
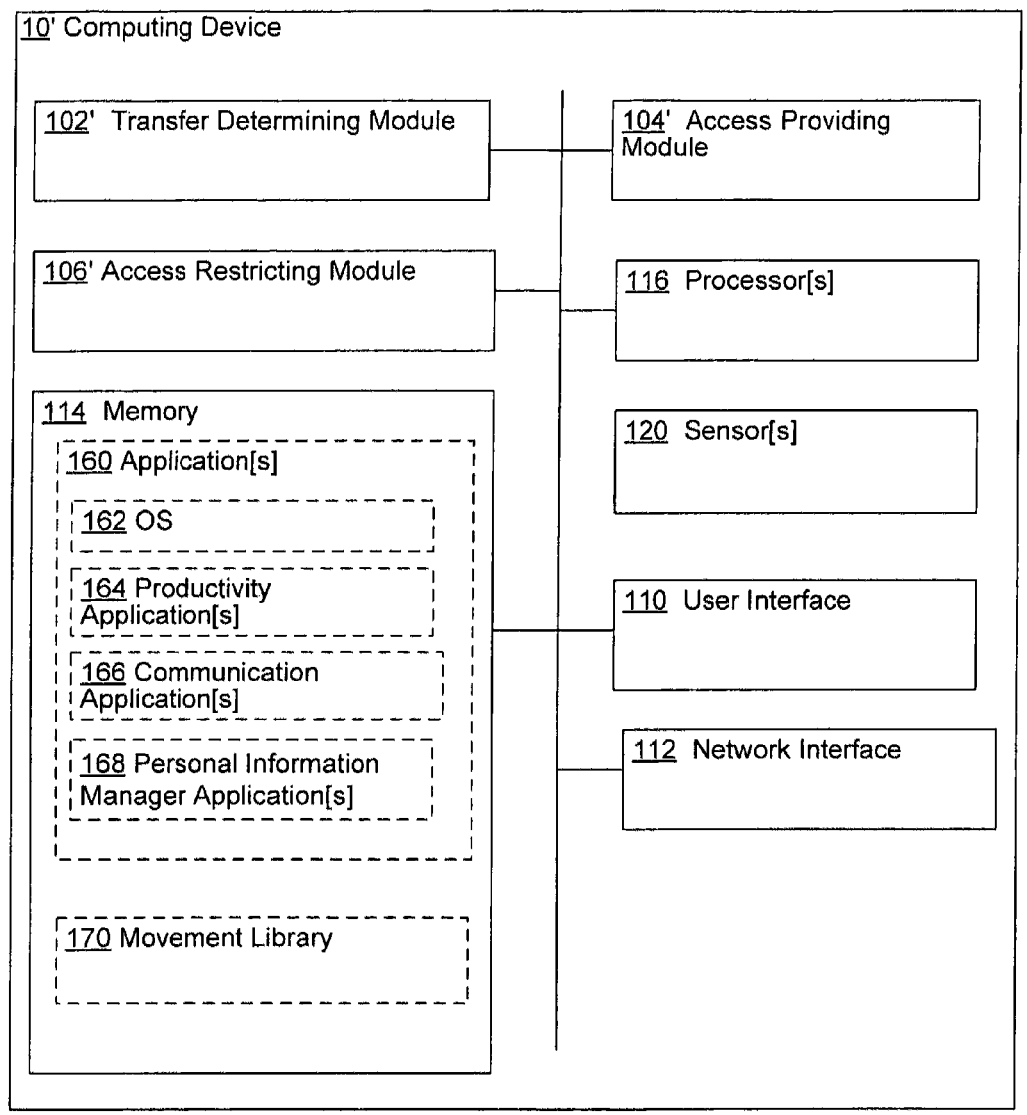
FIG. 3a shows a particular implementation of the computing device 10* of FIG. 1 illustrated as computing device 10'.
Figure 3B:
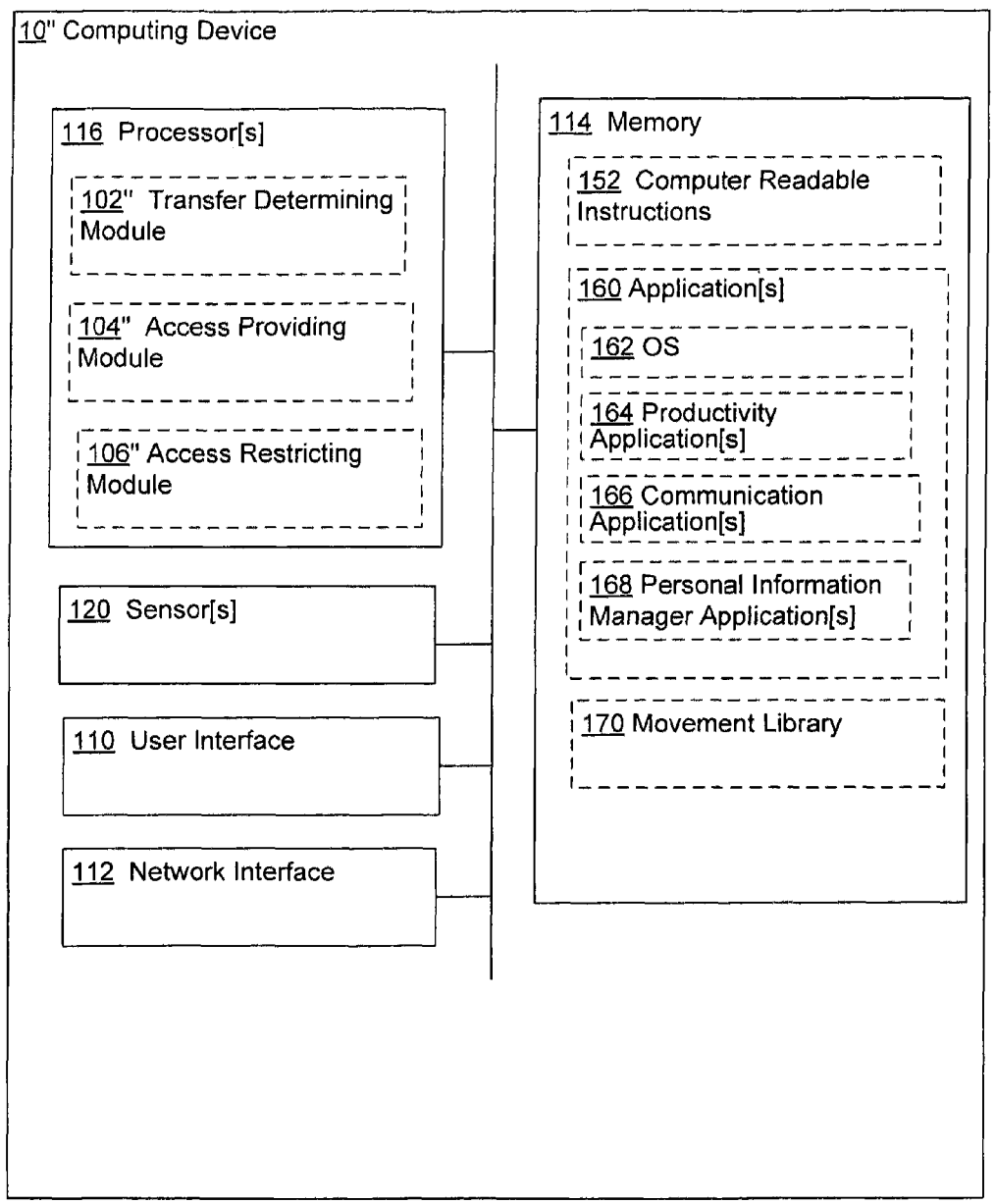
FIG. 3b shows another implementation of the computing device 10* of FIG. 1 illustrated as computing device 10".

In particular, and as will be further described herein, FIG. 3a illustrates a computing device 10' that is the "hardwired" or "hard" implementation of the computing device 10* of FIGS. 1, 2a, 2b, 2c, and 2d in which certain logic modules including a transfer determining module 102', an access providing module 104', and an access restricting module 106' are implemented using purely hardware or circuitry components (e.g., application specific integrated circuit or ASIC). In contrast, FIG. 3b illustrates a computing device 10" that is the "soft" implementation of the computing device 10* of FIGS. 1, 2a, 2b, 2c, and 2d in which certain logic modules including a transfer determining module 102", an access providing module 104", and an access restricting module 106" are implemented using one or more processors (e.g., microprocessors, controllers, etc.) executing one or more programming instructions (e.g., software).

Note that for purposes of the following, "*" represents a wildcard. Thus, references in the following to "computing device 10*" may be in reference to the computing device 10' of FIG. 3a or to the computing device 10" of FIG. 3b unless indicated otherwise. Note that two different implementations of the computing device 10* of FIG. 1 illustrated in FIGS. 3a and 3b (e.g., illustrated as computing device 10' in FIG. 3a and as computing device 10" in FIG. 3b) are two extreme or opposite versions of the computing device 10* of FIGS. 1, 2a, 2b, 2c, and 2d in which certain logic modules (e.g., the transfer determining module 102*, the access providing module 104*, and the access restricting module 106*) are implemented using purely "hardware solutions" (e.g., implemented using circuitry such as ASIC) as illustrated in FIG. 3a or using purely "software solutions" (e.g., implemented using software executed by hardware such as one or more processors) as illustrated in FIG. 3b. However, those having ordinary skill in the art will recognize that the computing device 10* or at least the logic modules (e.g., the transfer determining module 102*, the access providing module 104*, and the access restricting module 106*) may be implemented using essentially any combination of hardware and software solutions. Further details related to the two implementations of computing device 10* illustrated in FIGS. 3a and 3b will be provided in greater detail below.

Although the computing device 10* illustrated in FIG. 1 is depicted as being a tablet computer, in alternative embodiments, the novel computationally implemented methods, systems, and articles of manufacture may be embodied in other types of computer systems having other form factors including other types of portable computer devices such as, for example, laptops, Netbooks, Smartphones, e-readers, and so forth. As illustrated in FIG. 1, the computing device 10* includes a display 12, such as a touchscreen, on the front side 17a of the computing device 10*. As also depicted in FIG. 1, the display 12 displaying an exemplary document 14 and a tool bar 15. As further depicted, the computing device 10* may include a camera 16 (e.g., a webcam) disposed on the front side 17a of the computing device 10*. In some embodiments, additional cameras may be included on the front side 17a and/or backside 17b (see, for example, FIGS. 2a-2d) of the computing device 10*.

There are a number of ways to determine whether a computing device 10* is or has been transferred from one user to another (e.g., from a first user 20 to a second user 30 or from the second user 30 to the first user 20). In some cases, for instance, various sensor-provided data may be collected in order to make such a determination. Such data may indicate certain aspects of the computing device 10* (e.g., movements exhibited by the computing device 10* as a result of, for example, a user holding and deliberately moving the computing device 10* during the transfer of the computing device 10*) and/or various environmental aspects surrounding the computing device 10* (e.g., presence or absence certain visual and/or audio cues such as faces or voice patterns). For instance, when the computing device 10* of FIG. 1 is passed from, for example, the second user 30 (e.g., a third party having limited or restricted access rights to the computing device 10* and/or to items that may be available through the computing device 10*) to the first user 20 (e.g., a primary user or owner of the computing device 10* having at least greater access rights to the computing device 10* and/or its stored content than the second user 30), the second user 30 in passing off the computing device 10* may exhibit certain gestures, the occurrence of which may at least infer that the computing device 10* is being transferred from the second user 30 to another user (e.g., the first user 20). Such gestures may include, for example, the second user 30 extending his/her arms out with the computing device 10* in one or both hands (e.g., as if to offer the computing device 10* to, for example, the first user 20); the second user 30 passing the computing device 10* from one hand to another hand, and extending the second hand with the computing device 10* out and away from the second user 30; the second user 30 rotating the computing device 10* around using his/her hands so that the front side 17a of the computing device 10* faces away from the second user 30 and faces the first user 20, who is standing or sitting across from the second user 30, and so forth. These movements or gestures made by the second user 30, when detected, may infer that the transfer (e.g., change in possession) of the computing device 10* from the second user 30 to another user (e.g., the first user 20) has occurred.

One way to track the movements or gestures of the second user 30 when the second user 30 is holding the computing device 10* and is transferring (e.g., passing off) the computing device 10* to another user (e.g., first user 20) is to track the movements of the computing device 10* itself. That is, these gestures that may be exhibited by the second user 30 during the transfer of the computing device 10* from the second user 30 to, for example, the first user 20 may cause the computing device 10* to be spatially moved in particular and identifiable ways. In many cases, such identifiable movements may be repeated whenever, for example, a computing device 10* is transferred between two users regardless of who the two users are. Thus, in order to detect whether a computing device 10* is being transferred from the second user 30 to, for example, the first user 20, one may monitor the spatial movements of the computing device 10* in order to detect movements that matches with certain "signature movements" that have been identified as movements that occur when, for example, a computing device 10* is being transferred between two users (e.g., being transferred from the second user 30 to the first user 20).

In order to determine whether particular spatial movements exhibited by the computing device 10* is as a result of the transfer of the computing device 10* between two users (e.g., transfer from the second user 30 to the first user 20 or from the first user 20 to the second user 30), the computing device 10* may maintain in its memory 114 (see the computing device 10' and the computing device 10" of FIGS. 3a and 3b) a movement library 170 (see FIGS. 3a and 3b), which is a catalog or library of signature movements that have been identified as movements that may occur when a computing device 10* is being transferred between two users (e.g., transferred from the first user 20 to the second user 30 or from the second user 30 to the first user 20). Such a catalog or library may be used in order to determine whether the computing device 10* has been transferred from, for example, the second user 30 to the first user 20. That is, when movements of the computing device 10* that match with a signature movement stored in the movement library 170 have been detected, then the detection of such movements may at least infer (e.g., imply) that a transfer of the computing device 10* has occurred between two users (e.g., from the first user 20 to the second user 30, or from the second user 30 to the first user 20). Various types of signature movements may be stored in the movement library 170 including, for example, signature tilt movements, signature spin rotation movements, signature vibration movements, signature 3-dimensional movements, and so forth that infer or indicate the transfer of the computing device 10*.

One way to monitor the movements of the computing device 10* is to directly detect such movements using one or more integrated "movement" sensors that are designed to directly detect/measure movements of, for example, a computing device 10*. Examples of such movement sensors include, for example, inertia sensors, accelerometers (e.g. three-axis or 3D accelerometers), gyroscopes, and so forth. These sensors (herein "movement" sensors 202—see FIG. 3f, which illustrates the one or more types of sensors 120 that may be included in the computing device 10 of FIG. 1) when integrated with a computing device 10* may be used to directly detect the actual movements/motions of the computing device 10* as the computing device 10* is being transferred from, for example, a first user 20 to a second user 30 or from the second user 30 to the first user 20.

Since not all movements of the computing device 10* that may be detected will be as a result of the computing device 10* being transferred between two users, in various embodiments and as will be further described herein, the computing device 10* may be endowed with particular logic for determining (e.g., identifying) which movements associated with the computing device 10* that have been detected indicates or at least infers that the computing device 10* is or has been transferred from, for example, a second user 30 to a first user 20 (or vice versa) and which detected movements may merely be "noise movements" (e.g., random or accidental movements caused by the user holding the computing device 10* randomly or accidentally moving the computing device 10*)

Various types of movements of the computing device 10* may be tracked in order to determine or at least infer that the computing device 10* is being transferred between, for example, a first user 20 and a second user 30. Examples of the type of movements that may be tracked include, for example, tilt type movements, spin type rotation movements, spatial relocation type movements, vibration movements, overall three-dimensional movements (which may be a composite of various types of movements), and so forth of the computing device 10*. In order to determine or at least infer that the computing device 10* has been transferred from the first user 20 to the second user 30 or from the second user 30 to the first user 20, the various movements exhibited by the computing device 10* may be, individually or in combination, tracked using one or more sensors 120 that may be included with the computing device 10* as illustrated in FIG. 3f. For example, in various embodiments, one or more movement sensors 202 (e.g., inertia devices, accelerometers, etc.) that can directly detect movements, and/or other types of sensors 120 (e.g., image capturing devices 204, audio capturing devices 206, etc.) that may be able to indirectly detect movements may be employed in order to track the movements of the computing device 10* as will be further described herein.

Referring now to FIG. 2a illustrating various types of tilts and tilt movements of the computing device 10* that may be detected and monitored using one or more sensors 120 (e.g., one or more movement sensors 202) in order to, for example, determine or infer that the computing device 10* has been transferred between two users (e.g., transferred from a first user 20 to a second user 30 or from the second user 30 to the first user 20). That is, FIG. 2a shows the backside 17b of the computing device 10* and some of the tilt-type movements that may be monitored by the computing device 10* in order to, for example, determine whether the computing device 10* has been transferred between a first user 20 and a second user 30. As previously described, and in accordance with various embodiments, the first user 20 may be a primary user or owner of the computing device 10* and the second user 30 may be any third party (e.g., a friend or co-worker) who has lower or inferior access rights than the first user 20 to the computing device 10* and/or to one or more items that may be stored or available through the computing device 10*. One type of tilt that may be detected/monitored is tilt 42a of the computing device 10* that may occur when the computing device 10* is at least partially rotated around a central horizontal axis 43a. A second type of tilt that may be detected is tilt 42b, which may occur when the computing device 10* is at least partially rotated around a bottom horizontal axis 43b. Although not depicted, another type of tilt that may occur and that may be monitored is when the computing device 10* is at least partially rotated around an angular axis 43c that is angular with respect to a horizontal axis (e.g., axis 43a or 43b) and is parallel to the plane of the backside 17b similar to axis 43a and axis 43b. Yet another type of tilt that may occur and that may also be monitored is when the computing device 10* is at least partially rotated around a vertical axis 43d. Note that although the vertical axis 43d is depicted as being centered along the backside 17b of the computing device 10*, just like the horizontal axis 43b, the vertical axis 43d does not have to be centered on the backside 17b and instead, may be offset from the center of the backside 17b of the computing device 10* (e.g., may be closer to one end of the device rather than an opposite end of the device.

By detecting that the computing device 10* has been tilted in a particular manner from a first tilt orientation to a second tilt orientation, a determination or an inference may be made that the computing device 10* has been transferred from the first user 20 to the second user 30 or from the second user 30 to the first user 20. In particular, when the first user 20 is handing off or transferring the computing device 10* to the second user 30, the first user 20 may tilt the computing device 10* in a particular way that may be identifiable. Similarly, when the second user 30 is handing off or transferring the computing device 10* to the first user 20, the second user 30 may tilt the computing device 10* in a particular way that may be similarly identifiable. Thus, when the computing device 10* is being transferred from a first user 20 to a second user 30 or vice versa, the computing device 10* (or rather the logic endowed with the computing device 10*) may track the movements (i.e., tilt movements) of the computing device 10* as it moves from a first tilt orientation (e.g., the tilt of the computing device 10* at the beginning of the transfer or when the first user 20 or the second user 30 was in possession of the computing device 10*) to a second tilt orientation (e.g., the tilt of the computing device 10* at the end of the transfer or when the second user 30 or the first user 20, for example, has acquired possession of the computing device 10*).

In order to make a determination or inference that a transfer was made from the first user 20 to the second user 30 or from the second user 30 to the first user 20, the computing device 10* or at least the logic endowed in the computing device 10* may examine the particular movements of the computing device 10* (e.g., how the computing device 10* was reoriented from a first tilt orientation to a second tilt orientation including speed and cadence of the reorientation) as the computing device 10* moves from the first tilt orientation to a second tilt orientation. The computing device 10* may additionally or alternatively analyze the second tilt orientation (e.g., the tilt of the computing device 10* after it has finished being reoriented) at least with respect to the first tilt orientation in order to determine or infer that the computing device 10* has been transferred. To further determine or at least infer that the computing device 10* has been transferred from the first user 20 to the second user 30 or from the second user 30 to the first user 20, the examination/analysis of the detected tilt movements of the computing device 10* may involve comparing the detected tilt movements of the computing device 10* with catalogued or library signature tilt movements (which may be stored in the memory 114 of the computing device 10) that are identified as being movements associated with transfer of the computing device 10* between two users.

That is, the computing device 10* may maintain in its memory 114 (see FIGS. 3a and 3b) a movement library 170 that may include a catalogue or library of signature movements including signature tilt movements that have been previously identified as tilt movements that may occur when, for example, a computing device 10* is transferred between two users (e.g., first user 20 and second user 30). Thus, when tilt movements that match with catalogued or library signature tilt movements have been detected, then a determination or inference may be made that a transfer of the computing device 10* between two users has occurred. Note that the above discussed tilt movements relates to the movement of the computing device 10* as it moves from a first tilt orientation to a second tilt orientation.

Thus, another aspect of tilt orientation changes that may be considered in order to determine or infer that a transfer has taken place is to simply look at the end points of the tilt reorientation and their differences. In other words, to analyze the first tilt orientation (e.g., the tilt orientation of the computing device 10* before the computing device 10* being reoriented) and the second tilt orientation (e.g., the end tilt orientation of the computing device 10* after it has been reoriented) with respect to each other, and the differences between the first tilt orientation and the second tilt orientation. Thus, in some embodiments, the computing device 10* may also or additionally maintain a catalogue or library of changes of tilt orientation (e.g., tilt orientation changes) that have been previously identified as signature tilt changes that occur when, for example, a computing device 10* is transferred between two users. Such catalogue or library of tilt orientation changes may be stored as part of a movement library 170 stored in memory 114 (see FIGS. 3a and 3b) of the computing device 10* of FIG. 1 (e.g., the computing device 10' of FIG. 3a or the computing device 10" of FIG. 3b). Therefore, when tilt orientation changes that match with catalogued or library signature tilt orientation changes (e.g., as stored in the movement library 170 of the memory 114) have been detected, then at least an inference may be made that a transfer of the computing device 10* between two users (e.g., transfer from the first user 20 to the second user 30 or from the second user 30 to the first user 20) has occurred.

Referring now to FIG. 2b illustrating another type of movement of the computing device 10* that may be detected/monitored in order to determine or infer that the computing device 10* has been transferred between two users. In particular, FIG. 2b shows a few types of spin rotation and spin rotation movements of the computing device 10* that may be detected/monitored using one or more sensors 120 (e.g., one or more movement sensors 202) in order to determine or infer that a transfer of the computing device 10* between two users has occurred. Note that this type of rotation (e.g., spin rotation) is different from the type of rotation associated with the previously described tilt movement where the "tilt" rotation involves the entire backside 17b (or the front side 17a) of the computing device 10* rotating around some axis in a sweeping motion. In a spin rotation, the backside 17b (or the front side 17a) of the computing device 10* substantially spins around an axis without the sweeping motion. Referring back to FIG. 2b, which shows some of the various types of spin rotations that may be monitored by the computing device 10* in order to, for example, determine whether the computing device 10* has been transferred between two users (e.g., transferred from the first user 20 to the second user 30 or from the second user 30 to the first user 20). Examples of the type of spin rotations that may be monitored include a spin rotation 44a of the computing device 10* that occurs when the computing device 10* is rotated around a center axis 45a that is centered and vertical to the backside 17b of the computing device 10*. Another type of spin rotation that may be monitored is a spin rotation 44b of the computing device 10* that occurs when the computing device 10* is rotated around a center axis 45b that may be centered but not vertical to the backside 17B of the computing device 10*. Instead, the center axis 45b is angular to the backside 17b of the computing device 10* such that when the computing device 10* is rotating around the center axis 45b, the computing device 10* will have a constant tilt with respect to the center axis 45b. Another type of rotation that may be monitored is spin rotation 44c of the computing device 10* that may occur when the computing device 10* is rotated around an axis 45c that may not be centered on the backside 17B of the computing device and that may not be vertical to the backside 17B of the computing device 10*.

By detecting that the computing device 10* has been spin rotated in a particular manner, a determination or an inference may be made that the computing device 10* has been transferred between two users (e.g., transferred from the first user 20 to the second user 30 or from the second user 30 to the first user 20). In particular, when the first user 20 is handing off or transferring the computing device 10* to the second user 30, the first user 20 may spin rotate the computing device 10* in a particular way. Thus, when the computing device 10* is being transferred from, for example, the second user 30 to the first user 20, the computing device 10*(or rather the logic endowed with the computing device 10*) may track the movements of the computing device 10* as it moves from a first spin orientation (e.g., the orientation of the computing device 10* at the beginning of the transfer or when the second user 30 was in possession of the computing device 10*) to a second spin orientation (e.g., the orientation of the computing device 10* at the end of the transfer or when the first user 20 has acquired possession of the computing device 10*).

Similar to the tilt or tilt movement detection/analysis described earlier, in order to make a determination or inference that a transfer was made between two users (e.g., either transferred from the first user 20 to the second user 30 or from the second user 30 to the first user 20), the computing device 10* or at least the logic endowed in the computing device 10* may scrutinize the particular movements of the computing device 10* as the computing device 10* spin rotates from a first orientation (e.g., the initial orientation of the computing device 10* at the beginning of the transfer of the computing device 10* between two users) to a second orientation (e.g., the end orientation of the computing device 10* at the end of the transfer). The computing device 10* may additionally or alternatively analyze the second orientation (e.g., the orientation of the computing device 10* after it has finished being spin rotated) at least with respect to the first orientation (e.g., the orientation of the computing device 10* before it was spin rotated) in order to determine or at least infer that the computing device 10* has been transferred. To further determine or at least infer that the computing device 10* has been transferred between two users (e.g., transferred from the first user 20 to the second user 30 or from the second user 30 to the first user 20), the examination/analysis of the detected spin rotation movements of the computing device 10* from the first orientation to the second orientation may involve comparing the detected spin rotation movements of the computing device 10* with catalogued or library signature spin rotation movements that are identified as being associated with transfer of the computing device 10*. That is, the computing device 10* may maintain in its memory 114 (see FIGS. 3a and 3b) a movement library 170 that may include a catalogue or library of signature movements including signature spin rotation movements that may have been previously identified as spin rotation movements that may occur when, for example, a computing device 10* is transferred between two users. When the computing device 10* or at least the logic endowed with the computing device 10* detects the computing device 10* exhibiting movements that match with the signature spin rotation movements stored in the movement library 170 then at least an inference may be made that the computing device 10* has been transferred between two users (e.g., transferred from the first user 20 to the second user 30 or from the second user 30 to the first user 20).

Turning now to FIG. 2c illustrating yet another type of movement of the computing device 10* that may be detected/monitored in order to determine or infer that the computing device 10* has been transferred between two users. In particular, FIG. 2c shows the computing device 10* being relocated by moving from a first spatial location 46 to a second spatial location 48 when the computing device 10* is transferred between two users (e.g., transferred from the second user 30 to the first user 20). In various embodiments, such movements from the first spatial location 46 to the second spatial location 48, which will be referred to herein as "spatial relocation movements," may be detected using one or more sensors 120 (e.g., one or more movement sensors 202). In order to make a determination or inference that a transfer was made from the first user 20 to the second user 30, the computing device 10* or at least the logic endowed in the computing device 10* may examine/analyze the particular spatial relocation movements 47 of the computing device 10 as it moves from the first spatial location 46 to the second spatial location 48, and to compare the pattern of spatial relocation movements 47 (e.g., path, speed, acceleration, and so forth).

In some cases, the computing device 10*(or rather the logic endowed with the computing device 10*) may additionally or alternatively analyze the second spatial location 48 with respect to the first spatial location 46 in order to determine or at least infer that the computing device 10* has been transferred from, for example, the second user 30 to the first user 20. To further determine or infer that the computing device 10* has been transferred from the second user 30 to the first user 20 (or vice versa), the examination/analysis of the detected spatial relocation movements of the computing device 10* may be compared with catalogued or library signature spatial relocation movements (or simply "signature spatial movements") that have been identified as being associated with the transfer of the computing device 10 between two users. That is, the computing device 10* may maintain in its memory 114 (see FIGS. 2a and 2b) a movement library 170 that may include a catalogue or library of signature movements including signature spatial relocation movements that may have been previously identified as spatial relocation movements that may occur when, for example, a computing device 10* is transferred between two users. When the computing device 10* or at least the logic endowed with the computing device 10* detects the computing device 10* exhibiting movements that match with signature spatial relocation movements stored in the movement library 170 at least an inference may be made that the computing device 10* has been transferred between two users (e.g., transferred from the first user 20 to the second user 30 or from the second user 30 to the first user 20).

In some embodiments, in order to determine or at least infer that the computing device 10* has been transferred between two users, the computing device 10* may be endowed with logic that detects/monitors vibrations that may have been exhibited by the computing device 10*. In some cases, such vibration may have been transferred to the computing device 10* from a user (e.g., the first user 20 or the second user 30) who is holding the computing device 10* after the computing device 10* has been transferred to the user from another user. That is, each user who may come in contact with the computing device 10* may pass on to the computing device 10* unique vibration patterns (e.g., as a result of user's heartbeat). Thus, when the second user 30, for example is holding the computing device 10*, the computing device 10* may vibrate in a particular signature vibration pattern that is associated with the second user 30. In contrast, when the computing device 10* has been transferred to the first user 20 from the second user 30, and the first user 20 is holding the computing device 10*, the computing device 10* may vibrate in a vibration pattern (e.g., signature vibration pattern) that is associated with the first user 20. Thus, one way to determine whether the computing device 10* has been transferred from the first user 20 to the second user 30, or from the second user 30 to the first user 20 is to detect/monitor at least changes in vibrations of the computing device 10*. In some cases, this may involve the computing device 10*(or at least the logic endowed with the computing device 10*) initially detecting the particular vibration pattern of the computing device 10* when the computing device 10* is being possessed by, for example, the second user 30, and to detect when the computing device 10* no longer vibrates in such a particular vibration pattern. In order to determine whether the computing device 10* has been transferred from, for example, the second user 30 to the first user 20, the computing device 10* may be further designed to determine that the computing device 10* is vibrating in a way that matches with a signature vibration pattern of the first user 20 when previously it had detected that the computing device 10* was vibrating in a manner that did not match with the signature vibration pattern of the first user 20 (e.g., in a manner that matched with the signature vibration pattern of the second user 30). By making such a determination, an inference may be made that the computing device 10* has been transferred from the second user 30 to the first user 20.

In some embodiments, the computing device 10* may include logic that is designed to determine whether the computing device 10* has moved away from one user, such as the second user 30, and has moved closer to another user, such as the first user 20, in order to determine whether the computing device 10* has been transferred from the second user 30 to the first user 20. That is, by making such a determination, an inference may be made that the computing device 10* has been transferred from the second user 30 to the first user 20. In some embodiments, in order to make such a determination, data from a combination of sensors 120 may be processed and analyzed. That is, in order to determine whether the computing device 10* has moved away from the second user 30 and closer to the first user 20, a combination of one or more movement sensors 202 (see FIG. 3f) for directly detecting movements of the computing device 10*, one or more image capturing devices 204 (e.g., webcam or digital camera), and/or one or more audio capturing devices 206 (e.g., microphones) may be employed in order to determine whether the computing device 10* is moving away from the second user 30 and moving closer to the first user 20 (and thus, an inference that the computing device 10* has been transferred from the second user 30 to the first user 20). For example, the computing device 10* in some cases may employ one or more movement sensors 202 to detect the actual movements of the computing device 10* and one or more image capturing devices 204 (along with facial recognition system/application) to determine that a face associated with the second user 30 is moving away from the computing device 10* and a face associated with the first user 20 is moving closer to the computing device 10*. Based on the data provided by both the movement sensors 202 and the image capturing devices 204, at least an inference may be made that the computing device 10* has been transferred from the second user 30 to the first user 20.

In some embodiments, and as illustrated in FIG. 2d, rather than only monitoring for a particular type of movement (e.g., tilt-type movements, spin rotation movements, spatial relocation movements, vibration movements, and so forth) the computing device 10* may be endowed with logic that is designed to detect/monitor the overall three-dimensional movements of the computing device 10* and to determine whether the computing device 10* has moved in a particular three-dimensional way that infers that the computing device 10* has been transferred between two users (e.g., transferred from the first user 20 to the second user 30 or from the second user 30 to the first user 20). In order to accomplish this, the computing device 10* may maintain in its memory 114 (see FIGS. 2a and 2b) a movement library 170 that may include a catalogue or library of signature movements including signature three-dimensional movements that may have been previously identified as three-dimensional movements that may occur when, for example, a computing device 10* is transferred between two users. When the computing device 10* or at least the logic endowed with the computing device 10* detects the computing device 10* exhibiting movements that match with the signature three-dimensional movements stored in the movement library 170 then at least an inference may be made that the computing device 10* has been transferred between two users (e.g., transferred from the first user 20 to the second user 30 or the second user 30 to the first user 20).

In some cases, it may be insufficient to rely only on the directly detected movements of the computing device 10* in order to determine whether the computing device 10* has been transferred between two users. For example, and as will be described in greater detail herein, in some instances, higher standards for determining whether a transfer has occurred (which may not be satisfied based purely only on the detected movements of the computing device 10*) may be needed in order to ensure that confidential information is not inadvertently accessed. Thus, and as described briefly above, in addition to directly detecting the movements of the computing device 10* using movement sensors 202 (e.g., inertia sensors, accelerometers, gyroscopes, and so forth), environmental aspects surrounding the computing device 10* may also or alternatively be detected/monitored in order to determine whether the computing device 10* has been transferred between two users (e.g., transferred from a first user 20 to a second user 30 or from the second user 30 to the first user 20). For instance, in some embodiments, the computing device 10* or the logic endowed with the computing device 10* may be designed to detect, using one or more image capturing devices 204, certain visual cues that when detected at least infers the transfer of the computing device 10* between two users (e.g., transfer from the second user 30 to the first user 20.

For example, in some embodiments, the computing device 10* may be endowed with a facial recognition system (e.g., facial recognition software) that may be employed with one or more image capturing devices 204 in order to determine the presence or absence of a face associated with the first user 20 or the second user 30 within the proximate vicinity (e.g., within the immediate vicinity such as within three or four feet) of the computing device 10*. For example, if the face of the second user 30, which may have been initially detected in the proximate vicinity of the computing device 10*, is no longer detected in the proximate vicinity of the computing device 10*, and if the face associated with the first user 20 is instead detected in the proximate vicinity of the computing device 10*, then a determination or at least an inference may be made that a transfer of the computing device 10* from the second user 30 to the first user 20 may have occurred. The phrase "proximate vicinity" as used here is in reference to the immediate area surrounding the computing device 10* such as within a distance from the computing device 10* from which an object or a person is at least visually (or audibly) discernable or identifiable by the computing device 10* using, for example, a facial recognition system (or a voice verification system).

Another type of visual cues that the computing device 10* or at least the logic endowed with the computing device 10* may seek/consider in order to determine whether the computing device 10* has been transferred between two users (e.g., transferred from a first user 20 to a second user 30 or from the second user 30 to the first user 20) is the presence or absence of one or more eyes (e.g., irises or retinas) in the proximate vicinity of the computing device 10* that are determined to be associated with the first user 20 or the second user 30. In particular, if the eyes of the first user 20 is initially detected in the proximate vicinity of the computing device 10* but is subsequently determined not to be at least in the field of view of an image capturing device 204 of the computing device 10* and/or if one or more eyes of another person (e.g., second user 30) other than the first user 20 suddenly appears in the field of view of the image capturing device 204, then at least an inference may be made that the computing device 10* has been transferred from the first user 20 to the second user 30. Similarly, if one or more eyes of a person (e.g., second user 30) other than the first user 20 is initially detected in the proximate vicinity of the computing device 10* but is subsequently no longer detected at least in the field of view of the image capturing device 204 of the computing device 10* and/or if one or more eyes of the first user 20 suddenly appears in the field of view of the image capturing device 204 of the computing device 10* then at least an inference may be made that computing device 10* has been transferred from the second user 30 to the first user 20.

In various embodiments, the computing device 10* or at least the logic that may be endowed with the computing device 10* may be designed to detect absence or presence of audio cues in the proximate vicinity of the computing device 10* in order to determine or at least infer as to whether the computing device 10* has been transferred between two users (e.g., either transferred from a first user 20 to a second user 30 or transferred from the second user 30 to the first user 20). For example, in some embodiments, the computing device 10* may be endowed with voice verification system that may be designed to detect, via one or more audio capturing devices 206 (e.g., one or more microphones), the sudden presence or increase in volume of a voice in the proximate vicinity of the computing device 10* having a voice pattern that matches with the signature voice pattern of the first user 20. By making such a determination and/or by detecting the absence or diminishment of a voice associated with the second user 30 in the proximate vicinity of the computing device 10*, an inference may be made that the computing device 10 has been transferred from, for example, the second user 30 to the first user 20.

In various embodiments, the computing device 10* or at least the logic endowed with the computing device 10* may be designed to determine the transfer of the computing device 10* between two users (e.g., either transferred from the first user 20 to the second user 30 or transferred from the second user 30 to the first user 20) based on one or more detected movements of the computing device 10*, one or more detected visual cues, and/or one or more detected audio cues. That is, since in many situations, a single type of indicator or measurement (e.g., detected movements of the computing device 10\* or detected visual cues in the proximate vicinity of the computing device 10\*) may not reliably or conclusively indicate that the transfer of the computing device 10\* between two users has occurred, in various embodiments, the computing device 10\* may make the determination as to whether the computing device 10\* has been transferred based on a combination of different types of indicators/measurements (e.g., movements of the computing device 10\*, visual cues, and/or audio cues).

For example, in the case where the computing device 10\* is being transferred from the second user 30 (e.g., a party with inferior access rights to the computing device 10\* and/or to one or more items stored in the computing device 10\*) back to the first user 20 (e.g., a primary user of the computing device 10\* having superior access rights to the computing device 10\* and/or to the one or more items stored in the computing device 10\*), and the goal is to automatically allow greater access to one or more items stored in the computing device 10\* upon determining that the computing device 10\* has been transferred back to the first user 20, it may be desirable to have a higher requirement/standards for determining that the computing device 10\* has indeed been transferred to the first user 20 in order to ensure that confidential items such as confidential documents and files are not inadvertently released to someone other than the first user 20 (e.g., primary user). In such a scenario, it may not be sufficient to merely rely only on, for example, the detected movements of computing device 10\* in order to determine that the computing device 10\* has been transferred back to the first user 20. Instead, such a transfer determination may rely on a combination of detected movements of the computing device 10\* and one or more of visual and/or audio cues (alternatively, it may be possible to rely only on visual cues or only on audio cues since these types of indicators, at least in some cases, may be more reliable indicators of transfer than detected movements of the computing device 10\*).

In various embodiments, and as described earlier, in response to determining that the computing device 10\* has been transferred from, for example, the second user 30 to the first user 20, the computing device 10\* or at least the logic that may be endowed with the computing device 10\* may be designed to provide at least greater access via the computing device 10\* to one or more items (e.g., electronic documents, image or audio files, applications, passwords, and so forth) that were at least not partially accessible when the computing device 10\* was in the possession of the second user 30. In various embodiments, the one or more items that greater access may be provided to may be one or more electronic items that the second user 30 may have had limited or restricted access to or had completely no access to prior to the transfer of the computing device 10\* when the second user 30 had possession of the computing device 10\*.

The type of access to be provided in response to determining that the computing device 10\* has been transferred from, for example, the second user 30 to the first user 20 will depend on a number of factors, including what type of items is greater access being provided to. For example, if the one or more items are one or more software applications (herein "applications"), then the greater access to be provided may be access to one or more functionalities of the one or more applications 160. Alternatively, the greater access to be provided to the one or more applications 160 in some cases may mean access to the one or more applications 160 being completely unblocked and/or unhidden. In contrast, if the one or more items are one or more electronic documents (e.g., productivity documents, image or audio files, etc.), then providing at least greater access to such items may relate to providing greater editorial access (e.g., allowing modifications, deletions, additions, and so forth to the items) to the one or more items.

In some cases, providing at least greater access to the one or more items may mean providing viewing access to the one or more items, while in other cases, it may mean providing audio access to the one or more items. In still other cases it may mean providing both viewing and audio access to the one or more items. In some cases, providing at least greater access to the one or more items may mean providing completely unrestricted access to the one or more items. In any event, a more detailed discussion related to the various types of access that may be provided to the one or more items will be provided below with respect to the operations and processes to be described herein.

Referring now to FIGS. 3a and 3b illustrating, as indicated earlier, two embodiments (illustrated in FIG. 3a as computing device 10' and in FIG. 3b as computing device 10") of the computing device 10\* of FIGS. 1, 2a, 2b, 2c, and 2d. Referring particularly now to FIG. 3a, which illustrates a computing device 10' that includes a transfer determining module 102', an access providing module 104', an access restricting module 106', a memory 114 (which may store one or more applications 160 and/or a movement library 170), one or more processors 116 (e.g., microprocessors, controllers, etc.), one or more sensors 120, a user interface 110 (e.g., a display monitor such as a touchscreen, a keypad, a mouse, a microphone, a speaker, etc.), and a network interface 112 (e.g., network interface card or NIC).

In brief, the transfer determining module 102' of FIG. 3a is a logic module that is designed to at least determine whether the computing device 10' has been transferred between two users (e.g., transferred either from the first user 20 to the second user 30 or from the second user 30 to the first user 20 of FIGS. 1, 2a, 2b, 2c, and 2d). The access providing module 104' is a logic module that is designed to provide at least greater access via the computing device 10' to one or more items (e.g., electronic documents, audio or image files, software applications, passwords, and so forth) in response to a determination made by the transfer determining module 102' that the computing device 10' has been transferred from the second user 30 (e.g., a third party having inferior access rights to the computing device 10' and/or to one or more items accessible through the computing device 10') to the first user 20 (a user having superior access rights than the second user 30 to the computing device 10' and/or to the one or more items). In contrast, the access restricting module 106' is a logic module that is designed to restrict access via the computing device 10' to the one or more items in response to a determination that the computing device 10' has been transferred from the first user 10' (e.g., a primary user or owner of the computing device 10') to the second user 30. For this particular embodiment of the computing device 10\* of FIGS. 1, 2a, 2b, 2c, and 2d, the three logic modules (e.g., the transfer determining module 102', the access providing module 104', and the access restricting module 106') are depicted in FIG. 3a as being implemented using purely circuitry components (e.g., hardware components) such as application specific integrated circuit or ASIC. Thus, the computing device 10' illustrated in FIG. 2a may be referred to as the "hardwired" or "hard" embodiment of the computing device 10\* of FIGS. 1, 3a, 3b, 3c, and 3d.

Turning now to FIG. 3b, which illustrate a "soft" embodiment (e.g., computing device 10") of the computing device 10\* of FIGS. 1, 2a, 2b, 2c, and 2d. In particular, FIG. 3b shows a computing device 10" that has components similar or the same as the components of the computing device 10' of FIG. 3a. For example, the computing device 10''', similar to computing device 10' of FIG. 3a, may comprise of a memory 114 (storing one or more applications 160 and/or a movement library 170), one or more processors 116, one or more sensors 120, a user interface 110, and/or a network interface 112. And similar to the computing device 10' of FIG. 3a, the computing device 10'' of FIG. 3b may include logic modules including a transfer determining module 102'', an access providing module 104'', and an access restricting module 106'' that functionally correspond to and mirror the transfer determining module 102', the access providing module 104', and the access restricting module 106' of the computing device 10' of FIG. 3a. However, unlike the logic modules (e.g., the transfer determining module 102', the access providing module 104', and the access restricting module 106') of the computing device 10' of FIG. 3a, the logic modules (e.g., the transfer determining module 102'', the access providing module 104'', and the access restricting module 106'') of the computing device 10'' of FIG. 3b are implemented by the one or more processors 116 executing computer readable instructions 152 (e.g., software and/or firmware) that may be stored in the memory 114.

Note that although FIG. 3a illustrates all of the logic modules (e.g., the transfer determining module 102', the access providing module 104', and the access restricting module 106') being implemented using purely hardware components such as ASIC, and although FIG. 3b illustrates all of the logic modules (e.g., the transfer determining module 102'', the access providing module 104'', and the access restricting module 106'') being implemented using one or more processors 116 executing computer readable instructions 152, in other embodiments, such logic modules may be implemented using a combination of hardware components, such as ASIC, and software components in the form of computer readable instructions 152 that may be executed using one or more processors 116 (or other types of circuitry such as field programmable gate arrays or FPGAs). For example, in some embodiments, at least one of the logic modules (e.g., transfer determining module 102') may be implemented using specially designed circuitry (e.g., ASIC) while a second logic module (e.g., access providing module 104'') may be implemented using a processor 116 (or other types of programmable circuitry such as FPGA) executing computer readable instructions 152 (e.g., software and/or firmware).

In various embodiments, the memory 114 of the computing device 10' of FIG. 3a and the computing device 10'' of FIG. 3b may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments, the one or more applications 160 stored in memory 114 of FIGS. 3a and 3b may include, for example, an operating system 162, one or more productivity applications 164 such as a word processing application or a spreadsheet application, one or more communication applications 166 such as an email or IM application, and one or more personal information manager applications 168 (e.g., Microsoft Outlook).

Figure 3C:
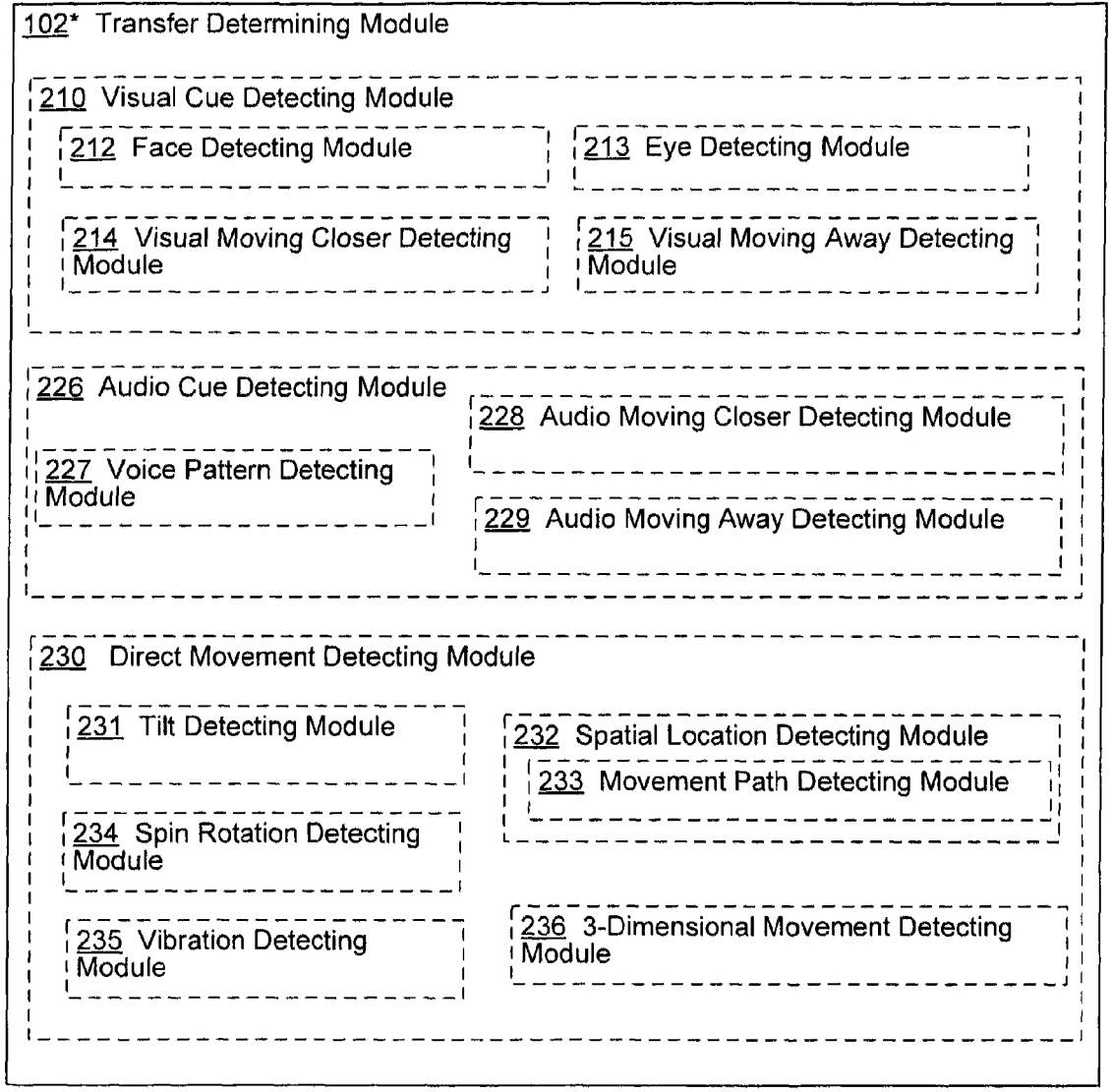
FIG. 3c shows another perspective of the transfer determining module 102* of FIGS. 3a and 3b.

Turning now to FIG. 3c illustrating a particular implementation of the transfer determining module 102*(e.g., the transfer determining module 102' or the transfer determining module 102'') of FIGS. 2a and 2b. As illustrated, the transfer determining module 102* may include one or more sub-logic modules in various alternative implementations. For example, in various implementations, the transfer determining module 102* may include a visual cue detecting module 210 (which may further comprise of a face detecting module 212, an eye detecting module 213, a visual moving closer detecting module 214, and/or a visual moving away detecting module 215), an audio cue detecting module 226 (which may further comprise of a voice pattern detecting module 227, an audio moving closer detecting module 228, and/or an audio moving away detecting module 229), and/or a direct movement detecting module 230 (which may further comprise of a tilt detecting module 231, a spatial location detecting module 232 that may also include a movement path detecting module 233, a spin rotation detecting module 234, a vibration detecting module 235, and/or a 3-dimensional movement detecting module 236). Specific details related to the transfer determining module 102* as well as the above-described sub-modules of the transfer determining module 102* will be provided below with respect to the operations and processes to be described herein.

Figure 3D:
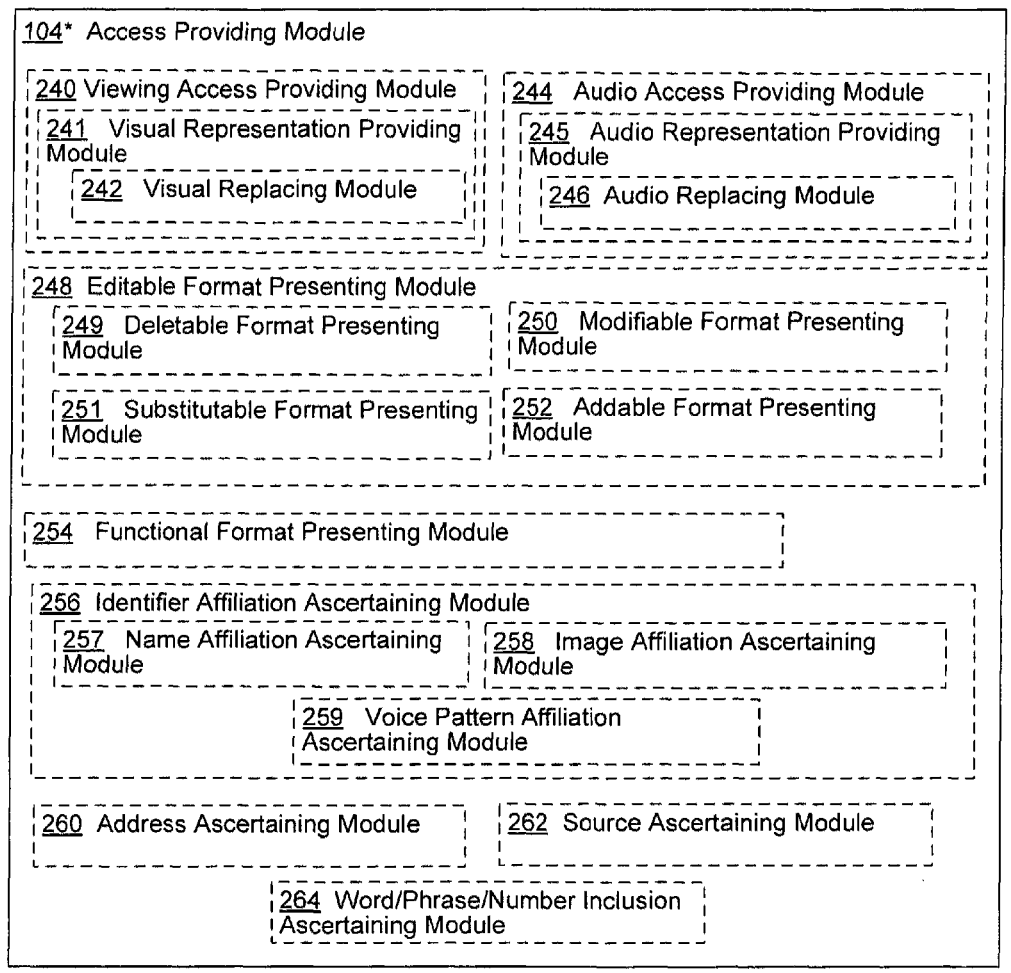
FIG. 3d shows another perspective of the access providing module 104* of FIGS. 3a and 3b.

Referring now to FIG. 3d illustrating a particular implementation of the access providing module 104*(e.g., the access providing module 104' or the access providing module 104'') of FIGS. 3a and 3b. As illustrated, the access providing module 104* may include one or more sub-logic modules in various alternative implementations. For example, in various implementations, the access providing module 104* may include a viewing access providing module 240 (which may include, in some cases, a visual representation providing module 241 that may further include a visual replacing module 242), an audio access providing module 244 (which may include, in some cases, an audio representation providing module 245 that may further include an audio replacing module 246), an editable format presenting module 248 (which may further include a deletable format presenting module 249, a modifiable format presenting module 250, a substitutable format presenting module 251, and/or an addable format presenting module 252), a functional format presenting module 254, an identifier affiliation ascertaining module 256 (which may further include a name affiliation ascertaining module 257, an image affiliation ascertaining module 258, and/or a voice pattern affiliation ascertaining module 259), an address ascertaining module 260, a source ascertaining module 262 and/or a word/phrase/number inclusion ascertaining module 264. Specific details related to the access providing module 104* as well as the above-described sub-modules of the access providing module 104* will be provided below with respect to the operations and processes to be described herein.

Figure 3E:
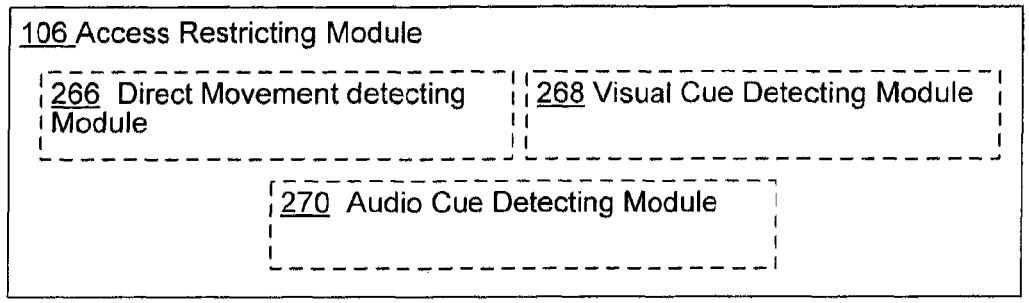
FIG. 3e shows another perspective of the access restricting module 106* of FIGS. 3a and 3b.
Figure 3F:
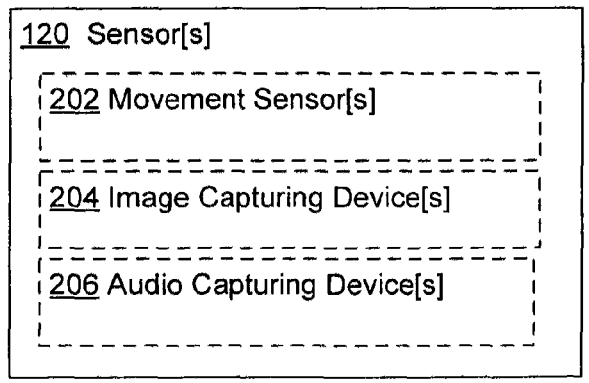
FIG. 3f shows various types of sensors 120 that may comprise the one or more sensors 120 that may be included with the computing device 10* of FIGS. 3a and 3b.

Referring to FIG. 3e illustrating a particular implementation of the access restricting module 106*(e.g., the access restricting module 106' or the access restricting module 106'') of FIGS. 3a and 3b. As further illustrated in FIG. 3e, the access restricting module 106*, in various embodiments, may include a direct movement detecting module 266, a visual cue detecting module 268, and/or an audio cue detecting module 270). Specific details related to the access restricting module 106* as well as the above-described sub-modules of the access restricting module 106* will be provided below with respect to the operations and processes to be described herein.

FIG. 3f illustrates a particular implementation of the one or more sensors 120 that may be included with the computing device 10*(e.g., the computing device 10' of FIG. 3a or the computing device 10'' of FIG. 3b) of FIGS. 1, 2a, 2b, 2c, and 2d. As illustrated, the one or more sensors 120 that may be included with the computing device 10* may include one or more movement sensors 202 (e.g., one or more accelerometers, inertia sensors, and/or gyro sensors), one or more image capturing devices 204 (e.g., a web cam, a digital camera, etc.), and/or one or more audio capturing devices 206 (e.g., microphones).

Figure 4:
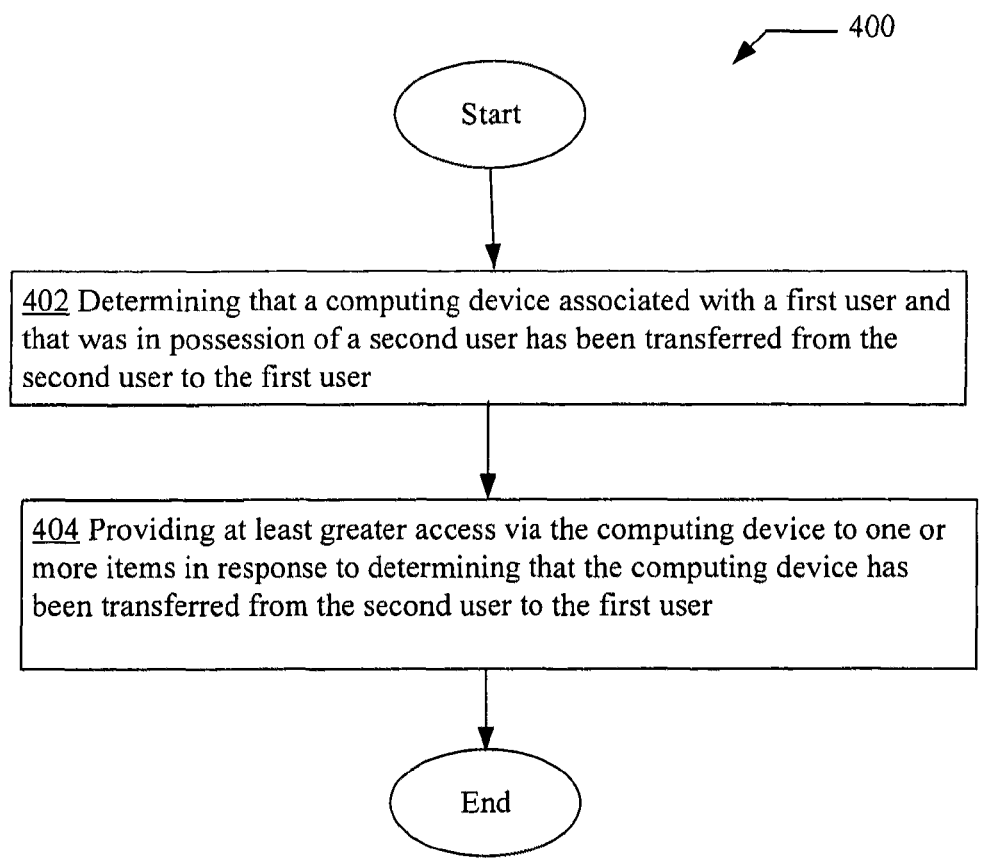
FIG. 4 is a high-level logic flowchart of a process.

A more detailed discussion related to the computing device 10* of FIGS. 1, 2a, 2b, 2c, and 2d (e.g., the computing device 10' of FIG. 3a or the computing device 10" of FIG. 3b) will now be provided with respect to the processes and operations to be described herein. FIG. 4 illustrates an operational flow 400 representing example operations for, among other things, providing at least greater access via a computing device 10* to one or more items (e.g., software applications, electronic documents including productivity documents, audio or image files, electronic messages including emails, passwords, so forth) in response to determining that the computing device 10* that is associated with a first user 20 has been transferred from a second user 30 (e.g., another user who may have inferior access rights than the first user 20 to the computing device 10* and/or to the one or more items) to the first user 20. In FIG. 4 and in the following figures that include various examples of operational flows, discussions and explanations will be provided with respect to the exemplary environment 100 described above and as illustrated in FIG. 1 and/or with respect to other examples (e.g., as provided in FIGS. 2a, 2b, 2c, 2d, 3a, 3b, 3c, 3d, 3e, and 3e and contexts. However, it should be understood that the operational flows may be executed in a number of other environments and contexts, and/or in modified versions of FIGS. 2a, 2b, 2c, 2d, 3a, 3b, 3c, 3d, 3e, and 3f. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to a transfer determining operation 402 for determining that a computing device associated with a first user and that was in possession of a second user has been transferred from the second user to the first user. For instance, and as an illustration, the transfer determining module 102*(e.g., the transfer determining module 102' of FIG. 3a or the transfer determining module 102" of FIG. 3b) of the computing device 10* of FIG. 1 (e.g., the computing device 10' of FIG. 3a or the computing device 10" of FIG. 3b) determining that the computing device 10* associated with a first user 20 and that was in possession of a second user 30 has been transferred from the second user 30 to the first user 20. Note that in various implementations, the computing device 10* may be "associated" with the first user 20 because the first user 20 is the primary user or may be the owner of the computing device 10*. Alternatively, the computing device 10* may be "associated" with the first user 20 because the computing device 10* can identify the first user 20 (e.g., via facial recognition system, via retinal or iris scanning, via password, or by some other means) and recognizes that the first user 20 has at least superior access rights to the one or more items than other parties (e.g., the second user 30). In some implementations, the computing device 10* may be in the control of the second user 30 when the computing device 10* is in the possession of the second user 30 such as by being held by the second user 30 or by being in the immediate vicinity of the second user 30 (e.g., the computing device 10* being within arm's reach from the second user 30 or being within three or four feet from the second user 30).

In addition to the transfer determining operation 402, operational flow 400 may also include an access providing operation 404 for providing at least greater access via the computing device to one or more items in response to determining that the computing device has been transferred from the second user to the first user as further illustrated in FIG. 4. For instance, the access providing module 104*(e.g., access restricting module 104' of FIG. 3a or access providing module 104" of FIG. 3b) of the computing device 10* of FIG. 1 (e.g., the computing device 10' of FIG. 3a or the computing device 10" of FIG. 3b) providing at least greater access via the computing device 10* to one or more items (e.g., documents, image or audio files, passwords, applications, and so forth) in response to determining that the computing device 10* has been transferred from the second user 30 to the first user 20. In various implementations, the access via the computing device 10* to be provided to the one or more items being greater than the access provided to the one or more items prior to the transfer of the computing device 10* from the second user 30 to the first user 20. As will be further described herein, there are a number of ways to provide greater access to the one or more items depending upon a number of factors including, for example, what types of items are to be accessed.

For example, if the one or more items are one or more productivity documents, such as word processing documents, then providing greater access to such items may be by including the true representations of the documents into a directory (e.g., including the "true" document names or subject headings of the documents in the directory or replacing pseudonames or subject headings in the form of obfuscating locum tenentes, which may have been included in the directory when the computing device 10* was in the possession of the second user 30, with the true document names or subject headings of the documents) that may be presented through the computing device 10*. Alternatively, in other cases, greater access to the one or more documents may be provided by providing editable forms of the documents, which may have been previously not been editable when the computing device 10* was in the possession of the second user 30.

On the other hand, if the one or more items are one or more software applications, then providing access to such items may involve allowing use of one or more functionalities associated with the items (e.g., applications), which may not have been available for use when the computing device 10* was in the possession of the second user 30. For example, if the one or more items include a word processing application, then providing greater access to such an application 160 may involve enabling one or more editing functions of the application 160, which may not have been available when the computing device 10* was in the possession of the second user 30. Other ways of providing greater access to the one or more items will be further described herein.

Figure 5A:
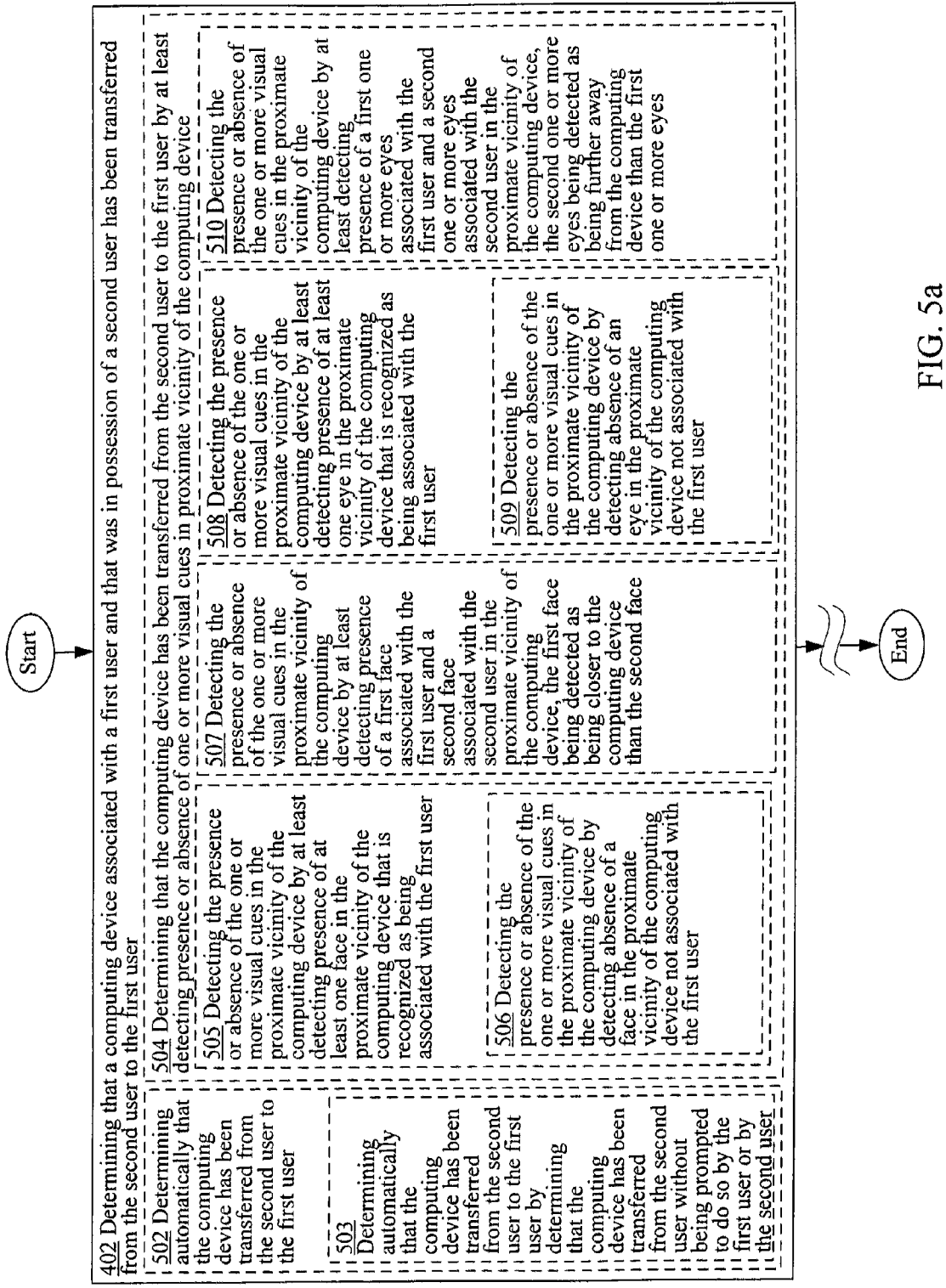
FIG. 5a is a high-level logic flowchart of a process depicting alternate implementations of the transfer determining operation 402 of FIG. 4.

As will be described below, the transfer determining operation 402 and the access providing operation 404 of FIG. 4 may be executed in a variety of different ways in various alternative implementations. FIGS. 5a, 5b, 5c, 5d, 5e, 5f, 5g, 5h, 5i, 5j, 5k, and 5l, for example, illustrate at least some of the alternative ways that the transfer determining operation 402 of FIG. 4 may be executed in various alternative implementations. For example, in various implementations, the transfer determining operation 402 of FIG. 4 may include an operation 502 for determining automatically that the computing device has been transferred from the second user to the first user as depicted in FIG. 5a. For instance, the transfer determining module 102*(e.g., the transfer determining module 102' of FIG. 3a or the transfer determining module 102" of FIG. 3b) of the computing device 10* of FIG. 1 (e.g., the computing device 10' of FIG. 3a or the computing device 10" of FIG. 3b) determining automatically that the computing device 10* has been transferred from the second user 30 to the first user 20.

As further illustrated in FIG. 5a, in some implementations, operation 502 include an operation 503 for determining automatically that the computing device has been transferred from the second user to the first user by determining that the computing device has been transferred from the second user without being prompted to do so by the first user or by the second user. For instance, the transfer determining module 102* of the computing device 10* of FIG. 1 (e.g., the computing device 10' of FIG. 3a or the computing device 10" of FIG. 3b) determining automatically that the computing device 10* has been transferred from the second user 30 to the first user 20 by determining that the computing device 10* has been transferred from the second user 30 without being prompted to do so by the first user 20 or by the second user 30. In various implementations, the automatic determination of the computing device 10* being transferred from the second user 30 to the first user 20 without the first user 20 providing an input such as a password. Note that for purposes of the following, and unless indicated otherwise, references to "computing device 10*" may be in reference to the computing device 10' of FIG. 3a or the computing device 10" of FIG. 3b.

As will be further described in the following, various approaches may be employed in various alternative implementations in order to determine whether the computing device 10* has been transferred from the second user 30 to the first user 20. For example, and as further illustrated in FIG. 5a, in various implementations, the transfer determining operation 402 may include an operation 504 for determining that the computing device has been transferred from the second user to the first user by at least detecting presence or absence of one or more visual cues in proximate vicinity of the computing device. For instance, the transfer determining module 102* including the visual cue detecting module 210 (see FIG. 3c) of the computing device 10* of FIG. 1 (e.g., the computing device 10' of FIG. 3a or the computing device 10" of FIG. 3b) determining that the computing device 10* has been transferred from the second user 30 to the first user 20 when the visual cue detecting module 210 at least detects presence or absence of one or more visual cues (e.g., absence or presence of a face or an eye) in proximate vicinity (e.g., within arm's reach or within a few feet such as within three to four feet) of the computing device 10*. In various implementations, such detection of the one or more visual cues may be based on data provided by one or more sensors 120 such as one or more image capturing devices 204 that may be disposed on one or more sides of the computing device 10*.

As further illustrated in FIG. 5a, operation 504 may be implemented in a number of different ways in various alternative implementations. For example, in some implementations, operation 504 may include an operation 505 for detecting the presence or absence of the one or more visual cues in the proximate vicinity of the computing device by at least detecting presence of at least one face in the proximate vicinity of the computing device that is recognized as being associated with the first user as further depicted in FIG. 5a. For instance, the visual cue detecting module 210 including the face detecting module 212 (see FIG. 3c) of the computing device 10 detecting the presence or absence of the one or more visual cues in the proximate vicinity of the computing device 10* when the face detecting module 212 at least detects presence of at least one face in the proximate vicinity (e.g., within four or five feet from a side of the computing device 10* that a display such as a touchscreen is disposed on) of the computing device 10* that is recognized as being associated with the first user 20.

In some cases, operation 505 may include an operation 506 for detecting the presence or absence of the one or more visual cues in the proximate vicinity of the computing device by detecting absence of a face in the proximate vicinity of the computing device not associated with the first user. For instance, the visual cue detecting module 210 including the face detecting module 212 (see FIG. 3c) of the computing device 10* detecting the presence or absence of the one or more visual cues in the proximate vicinity of the computing device 10* when the face detecting module 212 detects absence of a face (e.g., absence of any face) in the proximate vicinity (e.g., within six or seven feet from the computing device 10*) of the computing device 10* not associated with the first user 20.

In the same or alternative implementations, operation 504 may include an operation 507 for detecting the presence or absence of the one or more visual cues in the proximate vicinity of the computing device by at least detecting presence of a first face associated with the first user and a second face associated with the second user in the proximate vicinity of the computing device, the first face being detected as being closer to the computing device than the second face. For instance, the visual cue detecting module 210 including the face detecting module 212 of the computing device 10* detecting the presence or absence of the one or more visual cues in the proximate vicinity of the computing device 10* when the face detecting module 212 at least detects presence of a first face associated with the first user 20 and a second face associated with the second user 30 in the proximate vicinity (e.g., within five or six feet from a side of the computing device 10* that a display such as a touchscreen is disposed on) of the computing device 10*, the first face being detected as being closer to the computing device 10* than the second face.

In some implementations, operation 504 for determining that the computing device has been transferred from the second user to the first user by at least detecting presence or absence of one or more visual cues in proximate vicinity of the computing device may additionally or alternatively include an operation 508 for detecting the presence or absence of the one or more visual cues in the proximate vicinity of the computing device by at least detecting presence of at least one eye in the proximate vicinity of the computing device that is recognized as being associated with the first user as depicted in FIG. 5a. For instance, the visual cue detecting module 210 including the eye detecting module 213 (see FIG. 3c) of the computing device 10* detecting the presence or absence of the one or more visual cues in the proximate vicinity of the computing device 10* when the eye detecting module 213 at least detects presence of at least one eye (e.g., retinal or iris characteristics) in the proximate vicinity (e.g., within three or four feet from a side of the computing device 10* that a display such as a touchscreen is disposed on) of the computing device 10* that is recognized as being associated with the first user 20.

In some cases, operation 508 may involve an operation 509 for detecting the presence or absence of the one or more visual cues in the proximate vicinity of the computing device by detecting absence of an eye in the proximate vicinity of the computing device not associated with the first user as further illustrated in FIG. 5a. For instance, the visual cue detecting module 210 including the eye detecting module 213 of the computing device 10* detecting the presence or absence of the one or more visual cues in the proximate vicinity of the computing device 10* when the eye detecting module 213 detects absence of an eye (e.g., any eye) in the proximate vicinity e.g., within six or seven feet from the computing device 10*) of the computing device 10* not associated with the first user 20.

In the same or different implementations, operation 504 may include an operation 510 for detecting the presence or absence of the one or more visual cues in the proximate vicinity of the computing device by at least detecting presence of a first one or more eyes associated with the first user and a second one or more eyes associated with the second user in the proximate vicinity of the computing device, the second one or more eyes being detected as being further away from the computing device than the first one or more eyes as further depicted in FIG. 5a. For instance, the visual cue detecting module 210 including the eye detecting module 213 of the computing device 10* detecting the presence or absence of the one or more visual cues in the proximate vicinity of the computing device when the eye detecting module 213 at least detects presence of a first one or more eyes associated with the first user 20 and a second one or more eyes associated with the second user 30 in the proximate vicinity (e.g., within ten feet) of the computing device 10*, the second one or more eyes being detected as being further away from the computing device 10* than the first one or more eyes.

Figure 5B:
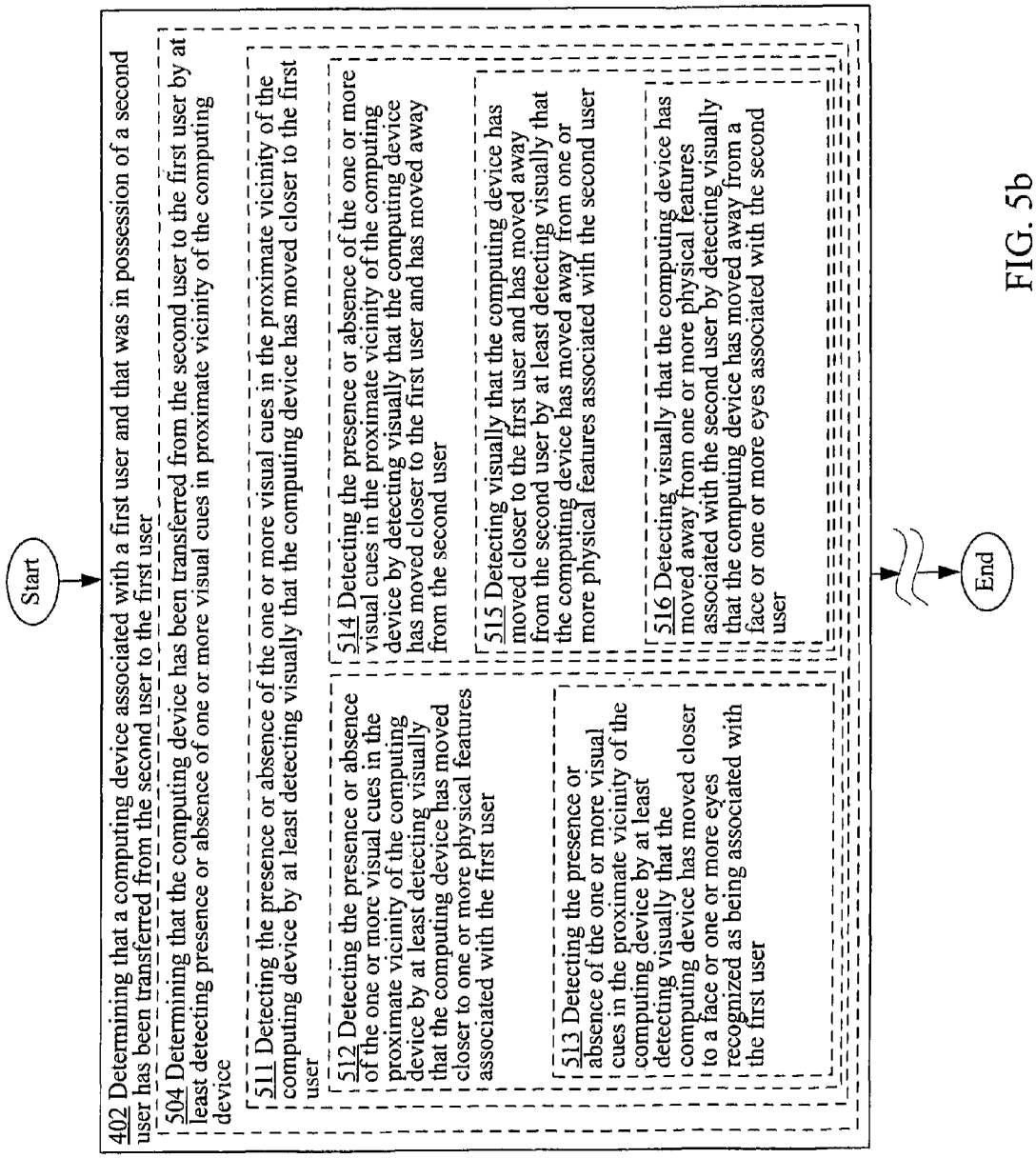
FIG. 5b is a high-level logic flowchart of a process depicting alternate implementations of the transfer determining operation 402 of FIG. 4.

Turning to FIG. 5b, in the same or different implementations, operation 504 for determining that the computing device has been transferred from the second user to the first user by at least detecting presence or absence of one or more visual cues in proximate vicinity of the computing device may include an operation 511 for detecting the presence or absence of the one or more visual cues in the proximate vicinity of the computing device by at least detecting visually that the computing device has moved closer to the first user as further depicted in FIG. 5b. For instance, the visual cue detecting module 210 including the visual moving closer detecting module 214 (see FIG. 3c) of the computing device 10* detecting the presence or absence of the one or more visual cues in the proximate vicinity (e.g., within 40 feet) of the computing device 10* by having the visual moving closer detecting module 214 at least detecting visually (e.g., face of the first user 20 appearing to move closer to the computing device 10* or background landscape appearing to be visually moving in a particular manner that at least infers the transfer of the computing device 10* from the second user 30 to the first user 20) using, for example, one or more image capturing devices 204 that the computing device 10* has moved closer to the first user 20.

As further illustrated in FIG. 5b, in some implementations, operation 511 may include an operation 512 for detecting the presence or absence of the one or more visual cues in the proximate vicinity of the computing device by at least detecting visually that the computing device has moved closer to one or more physical features associated with the first user. For instance, the visual cue detecting module 210 including the visual moving closer detecting module 214 of the computing device 10* detecting the presence or absence of the one or more visual cues in the proximate vicinity of the computing device 10* when the visual moving closer detecting module 214 using, for example, the one or more image capturing devices 204 at least detecting visually that the computing device 10* has moved closer to one or more physical features (e.g., face or eye) associated with the first user 20.

In some cases, operation 512 may include an operation 513 for detecting the presence or absence of the one or more visual cues in the proximate vicinity of the computing device by at least detecting visually that the computing device has moved closer to a face or one or more eyes recognized as being associated with the first user. For instance, the visual cue detecting module 210 including the visual moving closer detecting module 214 of the computing device 10* detecting the presence or absence of the one or more visual cues in the proximate vicinity of the computing device 10* when the visual cue detecting module 210 at least detects visually using, for example, the one or more image capturing devices 204 that the computing device 10* has moved closer to a face or one or more eyes recognized by the visual cue detecting module 210 as being associated with the first user 20.

In the same or different implementations, operation 511 may include an operation 514 for detecting the presence or absence of the one or more visual cues in the proximate vicinity of the computing device by detecting visually that the computing device has moved closer to the first user and has moved away from the second user. For instance, the visual cue detecting module 210 including the visual moving closer detecting module 214 and the visual moving away detecting module 215 (see FIG. 3c) of the computing device 10* detecting the presence or absence of the one or more visual cues in the proximate vicinity of the computing device 10* when the visual moving closer detecting module 214 detects visually that the computing device 10* has moved closer to the first user 20 and when the visual moving away detecting module 215 has detected visually that the computing device 10* has moved away from the second user 30.

As further illustrated in FIG. 5b, in some cases, operation 514 may further include an operation 515 for detecting visually that the computing device has moved closer to the first user and has moved away from the second user by at least detecting visually that the computing device has moved away from one or more physical features associated with the second user. For instance, the visual moving closer detecting module 214 and the visual moving away detecting module 215 of the computing device 10* detecting visually that the computing device 10* has moved closer to the first user 20 and has moved away from the second user 30 when the visual moving away detecting module 215 at least detects visually (e.g., using one or more image capturing devices 204) that the computing device 10* has moved away from one or more physical features (e.g., an eye or face) associated with the second user 30.

As further illustrated in FIG. 5b, operation 515 may involve an operation 516 for detecting visually that the computing device has moved away from one or more physical features associated with the second user by detecting visually that the computing device has moved away from a face or one or more eyes associated with the second user. For instance, the visual moving away detecting module 215 of the computing device 10* detecting visually that the computing device 10* has moved away from one or more physical features associated with the second user 30 by detecting visually that the computing device 10* has moved away from a face or one or more eyes associated with the second user 30.

Figure 5C:
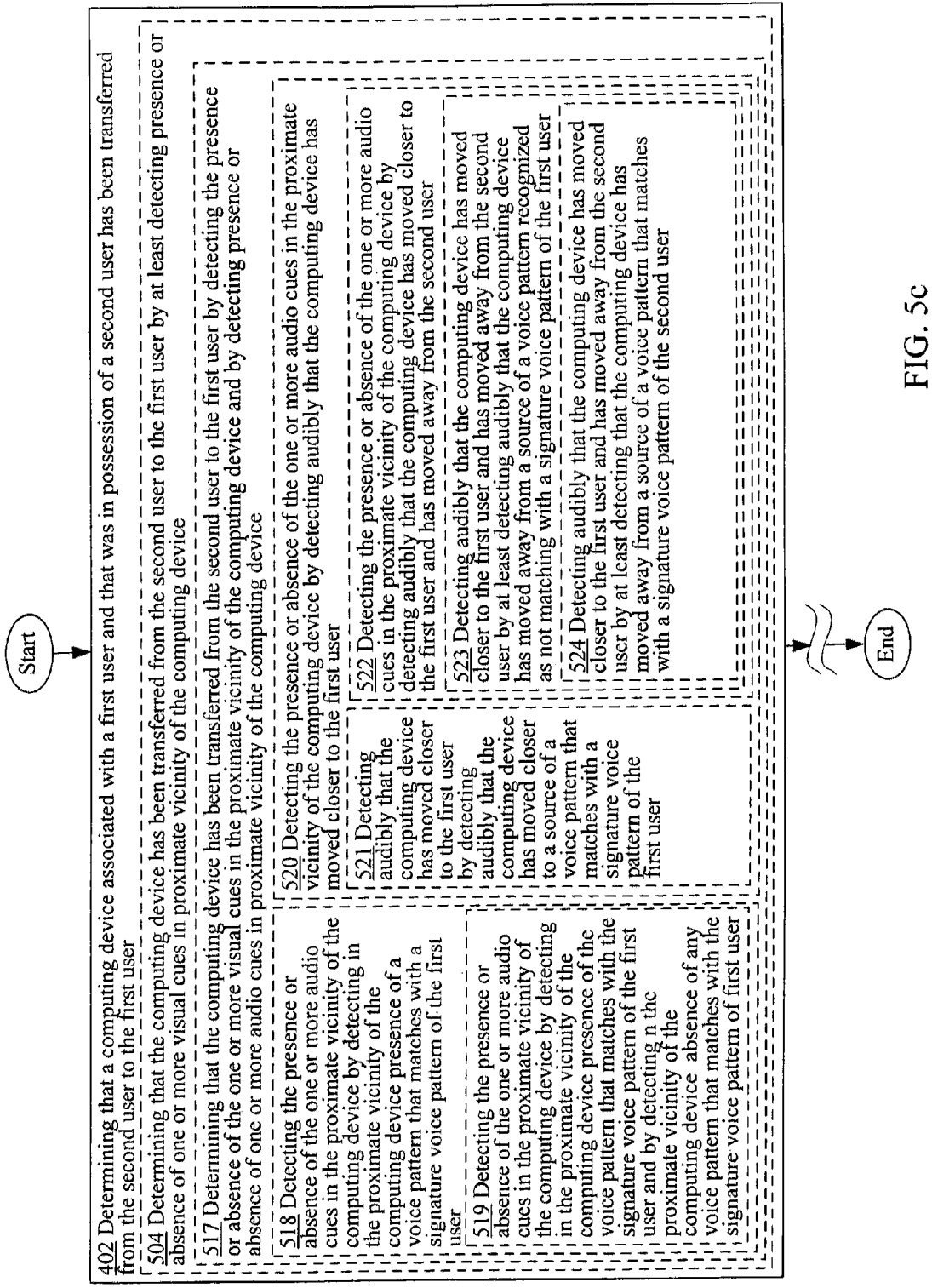
FIG. 5c is a high-level logic flowchart of a process depicting alternate implementations of the transfer determining operation 402 of FIG. 4.

In some instances, the operation 504 for determining that the computing device has been transferred from the second user to the first user by at least detecting presence or absence of one or more visual cues in proximate vicinity of the computing device may involve making such a determination based on both visual cues and audio cues. For example, and as illustrated in FIG. 5c, operation 504 in some implementations may include an operation 517 for determining that the computing device has been transferred from the second user to the first user by detecting the presence or absence of the one or more visual cues in the proximate vicinity of the computing device and by detecting presence or absence of one or more audio cues in proximate vicinity of the computing device. For instance, the transfer determining module 102*(e.g., the transfer determining module 102' of the computing device 10' of FIG. 3a or the transfer determining module 102" of the computing device 10" of FIG. 3b) including the visual cue detecting module 210 and the audio cue detecting module 226 (see FIG. 3c) of the computing device 10* determining that the computing device 10* has been transferred from the second user 30 to the first user 20 when the visual cue detecting module 210 detects the presence or absence of the one or more visual cues in the proximate vicinity (e.g., within 10 feet) of the computing device 10* and when the audio cue detecting module 226 detects the presence or absence of one or more audio cues in proximate vicinity (e.g., within 10 feet) of the computing device 10*.

As further illustrated in FIG. 5c, operation 517 may be implemented in a variety of different ways in various alternative implementations. For example in some implementations, operation 517 may include an operation 518 for detecting the presence or absence of the one or more audio cues in the proximate vicinity of the computing device by detecting in the proximate vicinity of the computing device presence of a voice pattern that matches with a signature voice pattern of the first user. For instance, the audio cue detecting module 226 including the voice pattern detecting module 227 (see FIG. 3c) of the computing device 10* detecting the presence or absence of the one or more audio cues in the proximate vicinity of the computing device 10* when the voice pattern detecting module 227 detects in the proximate vicinity (e.g., within five feet) of the computing device 10* presence of a voice pattern that matches with a signature voice pattern of the first user 20.

As also illustrated in FIG. 5c, in some implementations, operation 518 may further include an operation 519 for detecting the presence or absence of the one or more audio cues in the proximate vicinity of the computing device by detecting in the proximate vicinity of the computing device presence of the voice pattern that matches with the signature voice pattern of the first user and by detecting in the proximate vicinity of the computing device absence of any voice pattern that matches with the signature voice pattern of first user. For instance, the audio cue detecting module 226 including the voice pattern detecting module 227 of the computing device 10* detecting the presence or absence of the one or more audio cues in the proximate vicinity of the computing device 10* when the voice pattern detecting module 227 detects in the proximate vicinity (e.g., within 7 or 8 feet) of the computing device 10* presence of the voice pattern that matches with the signature voice pattern of the first user 20 and when the voice pattern detecting module 227 detects in the proximate vicinity of the computing device 10* absence of any voice pattern that matches with the signature voice pattern of first user 20.

In the same or different implementations, operation 517 for determining that the computing device has been transferred from the second user to the first user by detecting the presence or absence of the one or more visual cues in the proximate vicinity of the computing device and by detecting presence or absence of one or more audio cues in proximate vicinity of the computing device may include an operation 520 for detecting the presence or absence of the one or more audio cues in the proximate vicinity of the computing device by detecting audibly that the computing device has moved closer to the first user as further depicted in FIG. 5c. For instance, the audio cue detecting module 226 including the audio moving closer detecting module 228 (see FIG. 3c) of the computing device 10* detecting the presence or absence of the one or more audio cues in the proximate vicinity of the computing device 10* when the audio moving closer detecting module 228 detects audibly (e.g., audibly detecting using, for example, one or more audio capturing devices 206) that the computing device 10* has moved closer to the first user 20. For example, in some cases, such an operation may involve initially detecting the presence of a voice pattern that matches with the signature voice pattern of the first user 20* in the proximate vicinity of the computing device 10* and determining whether the source of the voice is getting closer (e.g., whether the voice is getting louder).

In some cases, operation 520 may include an operation 521 for detecting audibly that the computing device has moved closer to the first user by detecting audibly that the computing device has moved closer to a source of a voice pattern that matches with a signature voice pattern of the first user. For instance, the audio moving closer detecting module 228 (see FIG. 3c) of the computing device 10* detecting audibly that the computing device 10* has moved closer to the first user 20 by detecting audibly that the computing device 10* has moved closer to a source of a voice pattern (e.g., as sensed by one or more audio capturing devices 206) that matches with a signature voice pattern of the first user 20.

In the same or different implementations, operation 520 may include an operation 522 for detecting the presence or absence of the one or more audio cues in the proximate vicinity of the computing device by detecting audibly that the computing device has moved closer to the first user and has moved away from the second user as illustrated in FIG. 5c. For instance, the audio cue detecting module 226 including the audio moving closer detecting module 228 and the audio moving away detecting module 229 (see FIG. 3c) of the computing device 10* detecting the presence or absence of the one or more audio cues in the proximate vicinity of the computing device 10* when the audio moving closer detecting module 228 detects audibly that the computing device 10* has moved closer to the first user 20 and the audio moving away detecting module 229 has detected that the computing device 10* has moved away from the second user 30.

As further illustrated in FIG. 5c, operation 522 in some implementations may include an operation 523 for detecting audibly that the computing device has moved closer to the first user and has moved away from the second user by at least detecting audibly that the computing device has moved away from a source of a voice pattern recognized as not matching with a signature voice pattern of the first user. For instance, the audio moving closer detecting module 228 of the computing device 10* detecting audibly that the computing device 10* has moved closer to the first user 20 and the audio moving away detecting module 229 of the computing device 10* detecting audibly that the computing device 10* has moved away from the second user 30 by at least detects audibly that the computing device 10* has moved away from a source of a voice pattern (e.g., as sensed by one or more audio capturing devices 206) recognized as not matching with a signature voice pattern of the first user 20.

In some cases, operation 523, in turn, may further include an operation 524 for detecting audibly that the computing device has moved closer to the first user and has moved away from the second user by at least detecting that the computing device has moved away from a source of a voice pattern that matches with a signature voice pattern of the second user. For instance, the audio moving closer detecting module 228 detecting audibly that the computing device 10* has moved closer to the first user 20 and the audio moving away detecting module 229 of the computing device 10* detecting audibly that the computing device 10* has moved away from the second user 30 when the audio moving away detecting module 229 at least detects that the computing device 10* has moved away from a source of a voice pattern that matches with a signature voice pattern of the second user 30.

Figure 5D:
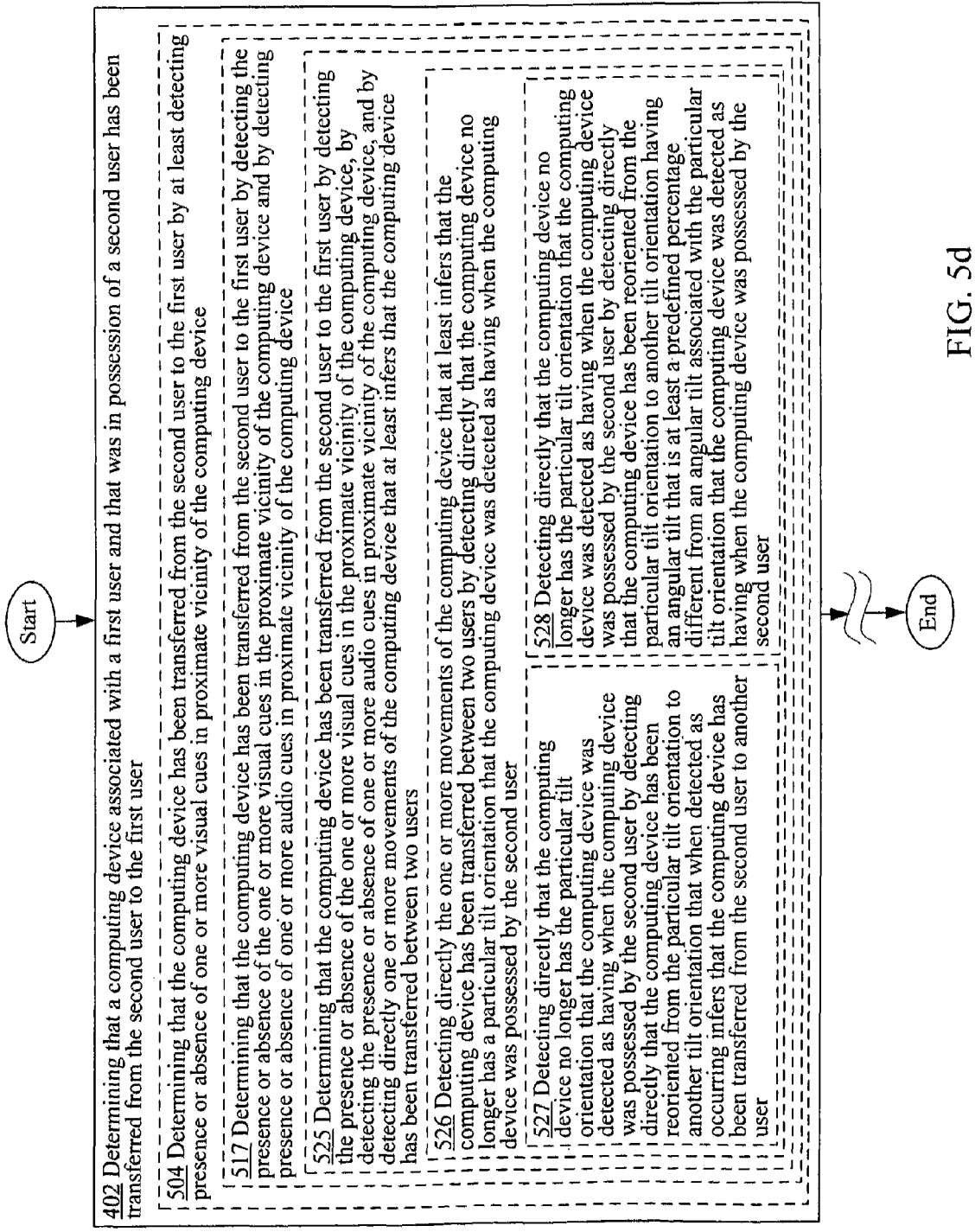
FIG. 5d is a high-level logic flowchart of a process depicting alternate implementations of the transfer determining operation 402 of FIG. 4.

As illustrated in FIG. 5d, in some cases, operation 517 for determining that the computing device has been transferred from the second user to the first user by detecting the presence or absence of the one or more visual cues in the proximate vicinity of the computing device and by detecting presence or absence of one or more audio cues in proximate vicinity of the computing device may include an operation 525 for determining that the computing device has been transferred from the second user to the first user by detecting the presence or absence of the one or more visual cues in the proximate vicinity of the computing device, by detecting the presence or absence of one or more audio cues in proximate vicinity of the computing device, and by detecting directly one or more movements of the computing device that at least infers that the computing device has been transferred between two users. For instance, the transfer determining module 102* including the visual cue detecting module 210, the audio cue detecting module 226, and the direct movement detecting module 230 (see FIG. 3c) of the computing device 10* determining that the computing device 10* has been transferred from the second user 30 to the first user 20 when the visual cue detecting module 210 detects the presence or absence of the one or more visual cues in the proximate vicinity of the computing device 10* when the audio cue detecting module 226 detects the presence or absence of one or more audio cues in proximate vicinity of the computing device 10*, and when the direct movement detecting module 230 detects directly using, for example, one or more movement sensors 202 one or more movements of the computing device 10* that at least infers that the computing device 10* has been transferred between two users (e.g., transferred between the second user 30 and the first user 20).

As further depicted in FIG. 5d, operation 525 may include one or more operations in various alternative implementations. For example, in some cases, operation 525 may include an operation 526 for detecting directly the one or more movements of the computing device that at least infers that the computing device has been transferred between two users by detecting directly that the computing device no longer has a particular tilt orientation that the computing device was detected as having when the computing device was possessed by the second user. For instance, the direct movement detecting module 230 including the tilt detecting module 231 (see FIG. 3c) of the computing device 10* detecting directly (e.g., via one or more movement sensors 202) the one or more movements of the computing device 10* that at least infers that the computing device 10* has been transferred between two users (e.g., transferred between the second user 30 and the first user 20) when the tilt detecting module 231 detects directly using, for example, one or more movement sensors 202 that the computing device 10* no longer has a particular tilt orientation that the computing device 10* was detected as having when the computing device 10* was possessed by the second user 30 (e.g., was held by second user 30 or was in close proximity to the second user 30 such as within proximately four or five feet of the computing device 10*).

As further illustrated in FIG. 5d, operation 526, in some implementations, may include an operation 527 for detecting directly that the computing device no longer has the particular tilt orientation that the computing device was detected as having when the computing device was possessed by the second user by detecting directly that the computing device has been reoriented from the particular tilt orientation to another tilt orientation that when detected as occurring infers that the computing device has been transferred from the second user to another user. For instance, the tilt detecting module 231 of the computing device 10* detecting directly that the computing device 10* no longer has the particular tilt orientation that the computing device 10* was detected as having when the computing device 10* was possessed by the second user 30 by detecting directly that the computing device 10* has been reoriented from the particular tilt orientation to another tilt orientation that when detected as occurring infers that the computing device 10* has been transferred from the second user 30 to another user.

In some cases, operation 526 may alternatively or additionally include an operation 528 for detecting directly that the computing device no longer has the particular tilt orientation that the computing device was detected as having when the computing device was possessed by the second user by detecting directly that the computing device has been reoriented from the particular tilt orientation to another tilt orientation having an angular tilt that is at least a predefined percentage different from an angular tilt associated with the particular tilt orientation that the computing device was detected as having when the computing device was possessed by the second user. For instance, the tilt detecting module 231 of the computing device 10* detecting directly that the computing device 10* no longer has the particular tilt orientation that the computing device 10* was detected as having when the computing device 10* was possessed by the second user 30 by detecting directly that the computing device 10* has been reoriented from the particular tilt orientation to another tilt orientation having an angular tilt that is at least a predefined percentage different from an angular tilt associated with the particular tilt orientation that the computing device 10* was detected as having when the computing device 10* was possessed by the second user 30.

Figure 5E:
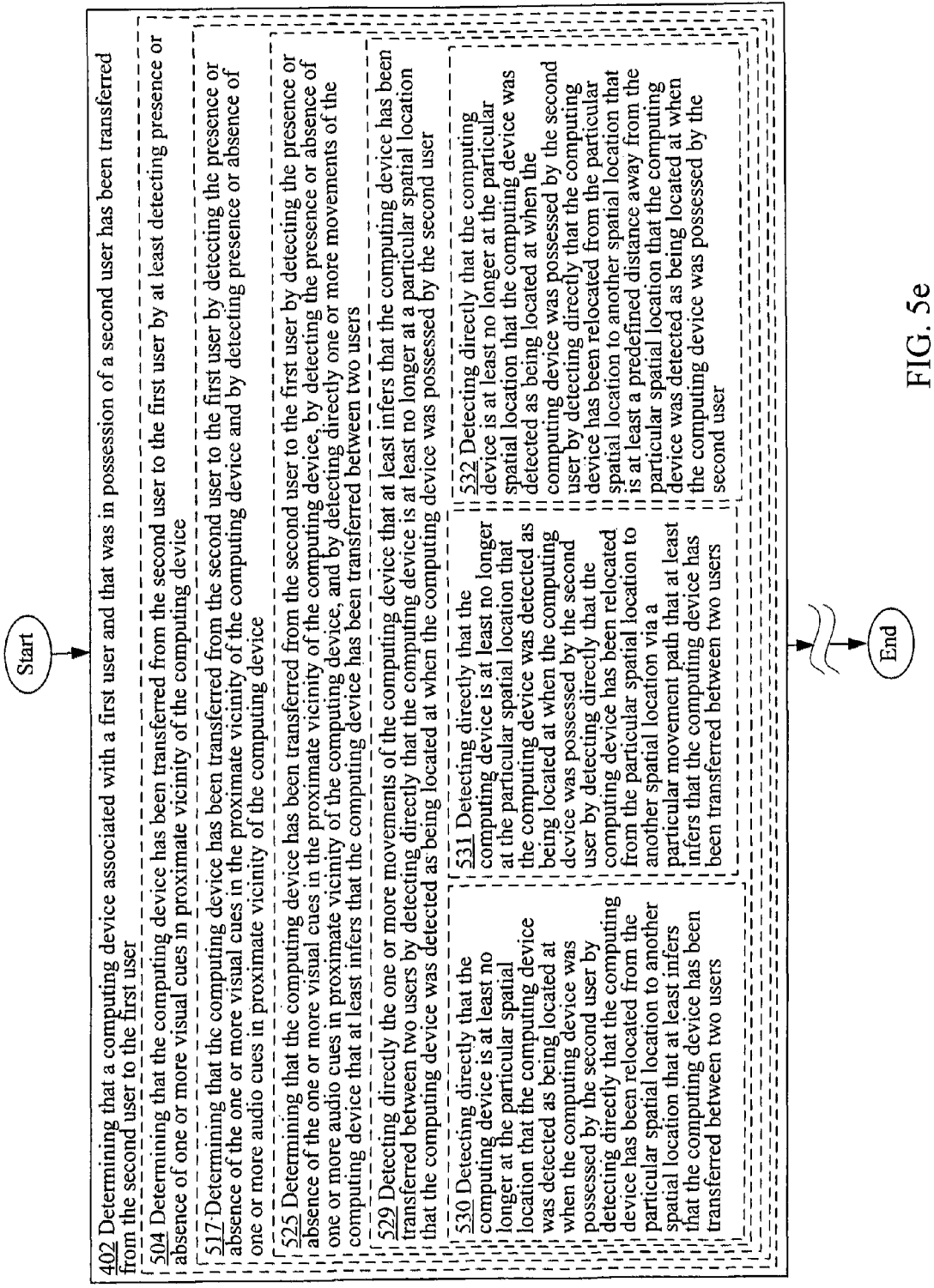
FIG. 5e is a high-level logic flowchart of a process depicting alternate implementations of the transfer determining operation 402 of FIG. 4.

Turning now to FIG. 5e, in some cases, operation 525 for determining that the computing device has been transferred from the second user to the first user by detecting the presence or absence of the one or more visual cues in the proximate vicinity of the computing device, by detecting the presence or absence of one or more audio cues in proximate vicinity of the computing device, and by detecting directly one or more movements of the computing device that at least infers that the computing device has been transferred between two users may include an operation 529 for detecting directly the one or more movements of the computing device that at least infers that the computing device has been transferred between two users by detecting directly that the computing device is at least no longer at a particular spatial location that the computing device was detected as being located at when the computing device was possessed by the second user. For instance, the direct movement detecting module 230 including the spatial location detecting module 232 (see FIG. 3c) of the computing device 10* detecting directly the one or more movements of the computing device 10* that when detected at least infers that the computing device 10* has been transferred between two users (e.g., transferred between the second user 30 and the first user 20) when the spatial location detecting module 232 detects directly using, for example, one or more movement sensors 202 that the computing device 10* is at least no longer at a particular spatial location that the computing device 10* was detected as being located at when the computing device 10* was possessed by the second user 30.

In various implementations, operation 529 may further include one or more additional operations as further illustrated in FIG. 5e. For example, in some implementations, operation 529 may include an operation 530 for detecting directly that the computing device is at least no longer at the particular spatial location that the computing device was detected as being located at when the computing device was possessed by the second user by detecting directly that the computing device has been relocated from the particular spatial location to another spatial location that at least infers that the computing device has been transferred between two users. For instance, the spatial location detecting module 232 of the computing device 10* detecting directly that the computing device 10* is at least no longer at the particular spatial location that the computing device 10* was detected as being located at when the computing device 10* was possessed by the second user 30 by detecting directly that the computing device 10* has been relocated from the particular spatial location to another spatial location that when detected at least infers that the computing device 10* has been transferred between two users (e.g., transferred between the second user 30 and the first user 20).

In the same or different implementations, operation 529 may include an operation 531 for detecting directly that the computing device is at least no longer at the particular spatial location that the computing device was detected as being located at when the computing device was possessed by the second user by detecting directly that the computing device has been relocated from the particular spatial location to another spatial location via a particular movement path that at least infers that the computing device has been transferred between two users as further depicted in FIG. 5e. For instance, the spatial location detecting module 232 including the movement path detecting module 233 (see FIG. 3c) of the computing device 10* detecting directly that the computing device is at least no longer at the particular spatial location that the computing device 10* was detected as being located at when the computing device 10* was possessed by the second user 30 when the movement path detecting module 233 detects directly (e.g., via one or more movement sensors 202) that the computing device 10* has been relocated from the particular spatial location to another spatial location via a particular movement path that when detected as occurring at least infers that the computing device 10* has been transferred between two users (e.g., transferred between the second user 30 and the first user 20).

In the same or different implementations, operation 529 may additionally or alternatively include an operation 532 for detecting directly that the computing device is at least no longer at the particular spatial location that the computing device was detected as being located at when the computing device was possessed by the second user by detecting directly that the computing device has been relocated from the particular spatial location to another spatial location that is at least a predefined distance away from the particular spatial location that the computing device was detected as being located at when the computing device was possessed by the second user as further illustrated in FIG. 5e. For instance, the spatial location detecting module 232 of the computing device 10* detecting directly that the computing device 10* is at least no longer at the particular spatial location that the computing device 10* was detected as being located at when the computing device 10* was possessed by the second user 30 by detecting directly that the computing device 10* has been relocated from the particular spatial location to another spatial location that is at least a predefined distance away from the particular spatial location that the computing device 10* was detected as being located at when the computing device 10* was possessed by the second user 30. In some implementations, such an operation may be executed in order to disregard "noise" movements that may as a result of random or accidental movements of the computing device 10* (e.g., those random or accidental movements of the computing device 10* caused by, for example, the second user 30 who may be holding the computing device 10*).

Figure 5F:
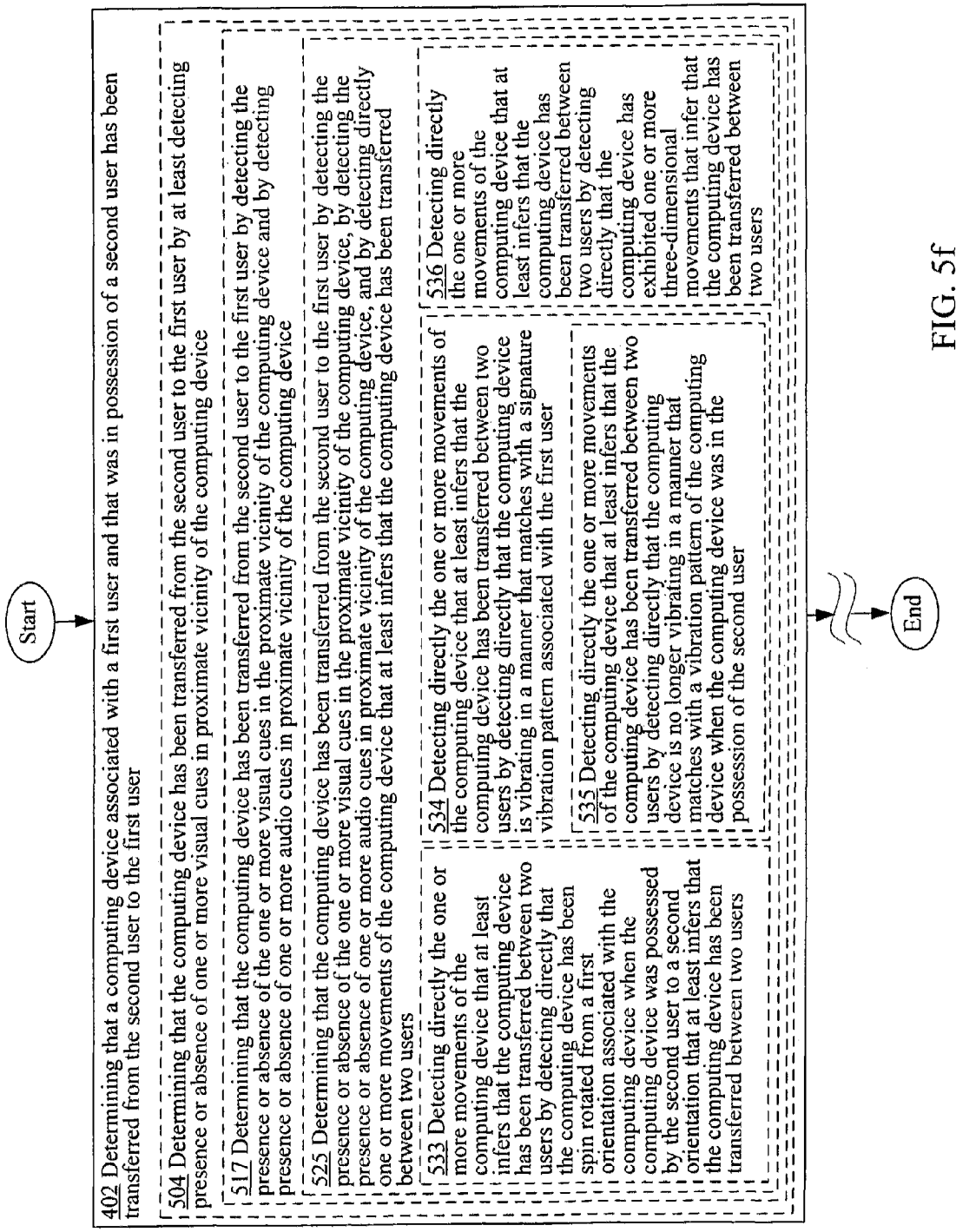
FIG. 5f is a high-level logic flowchart of a process depicting alternate implementations of the transfer determining operation 402 of FIG. 4.

Turning now to FIG. 5f, in various implementations, operation 525 for determining that the computing device has been transferred from the second user to the first user by detecting the presence or absence of the one or more visual cues in the proximate vicinity of the computing device, by detecting the presence or absence of one or more audio cues in proximate vicinity of the computing device, and by detecting directly one or more movements of the computing device that at least infers that the computing device has been transferred between two users may include an operation 533 for detecting directly the one or more movements of the computing device that at least infers that the computing device has been transferred between two users by detecting directly that the computing device has been spin rotated from a first orientation associated with the computing device when the computing device was possessed by the second user to a second orientation that at least infers that the computing device has been transferred between two users. For instance, the direct movement detecting module 230 including the spin rotation detecting module 234 (see FIG. 3c) of the computing device 10* detecting directly the one or more movements of the computing device 10* that at least infers that the computing device 10* has been transferred between two users when the spin rotation detecting module 234 detects directly that the computing device 10* has been spin rotated from a first orientation associated with the computing device 10* when the computing device 10* was possessed by the second user 30 to a second orientation that when detected at least infers that the computing device 10* has been transferred between two users.

In the same or different implementations, operation 525 may include an operation 534 for detecting directly the one or more movements of the computing device that at least infers that the computing device has been transferred between two users by detecting directly that the computing device is vibrating in a manner that matches with a signature vibration pattern associated with the first user as further depicted in FIG. 5f. For instance, the direct movement detecting module 230 including the vibration detecting module 235 (see FIG. 3c) of the computing device 10* detecting directly the one or more movements of the computing device 10* that at least infers that the computing device 10* has been transferred between two users when the vibration detecting module 235 using, for example, one or more movement sensors 202 detects directly that the computing device 10* is vibrating in a manner that matches with a signature vibration pattern associated with the first user 20.

As further illustrated in FIG. 5f, in some implementations, operation 534 may further include an operation 535 for detecting directly the one or more movements of the computing device that at least infers that the computing device has been transferred between two users by detecting directly that the computing device is no longer vibrating in a manner that matches with a vibration pattern of the computing device when the computing device was in the possession of the second user. For instance, the direct movement detecting module 230 including the vibration detecting module 235 of the computing device 10* detecting directly the one or more movements of the computing device 10* that at least infers that the computing device 10* has been transferred between two users when the vibration detecting module 235 detects directly that the computing device 10* is no longer vibrating in a manner that matches with a vibration pattern of the computing device 10* when the computing device 10* was in the possession of (e.g., being held by) the second user 30.

In various implementations, operation 525 for determining that the computing device has been transferred from the second user to the first user by detecting the presence or absence of the one or more visual cues in the proximate vicinity of the computing device, by detecting the presence or absence of one or more audio cues in proximate vicinity of the computing device, and by detecting directly one or more movements of the computing device that at least infers that the computing device has been transferred between two users may include an operation 536 for detecting directly the one or more movements of the computing device that at least infers that the computing device has been transferred between two users by detecting directly that the computing device has exhibited one or more three-dimensional movements that infer that the computing device has been transferred between two users. For instance, the direct movement detecting module 230 including the three-dimensional movement detecting module 236 (see FIG. 3c) of the computing device 10* detecting directly the one or more movements of the computing device 10* that at least infers that the computing device 10* has been transferred between two users by detecting directly that the computing device 10* has exhibited one or more three-dimensional movements (e.g., overall three-dimensional movements of the computing device 10* that may comprise of various types of specific movements including tilt movements, spin rotation movements, spatial locational movements, and so forth) that infer that the computing device 10* has been transferred between two users. For example, suppose the computing device 10* exhibits certain three-dimensional movements, which may be caused by the second user 30, who is holding the computing device 10*. Upon detection, a determination may be made as to whether the detected three-dimensional movements matches with signature three-dimensional movements of the computing device 10* that are known to be associated with transfer of the computing device 10* between two users. If indeed, the detected three-dimensional movement matches with the signature three-dimensional movements then at least an inference may be made that the computing device 10* has been transferred between two users (e.g., transferred from the second user 30 to the first user 20).

Figure 5G:
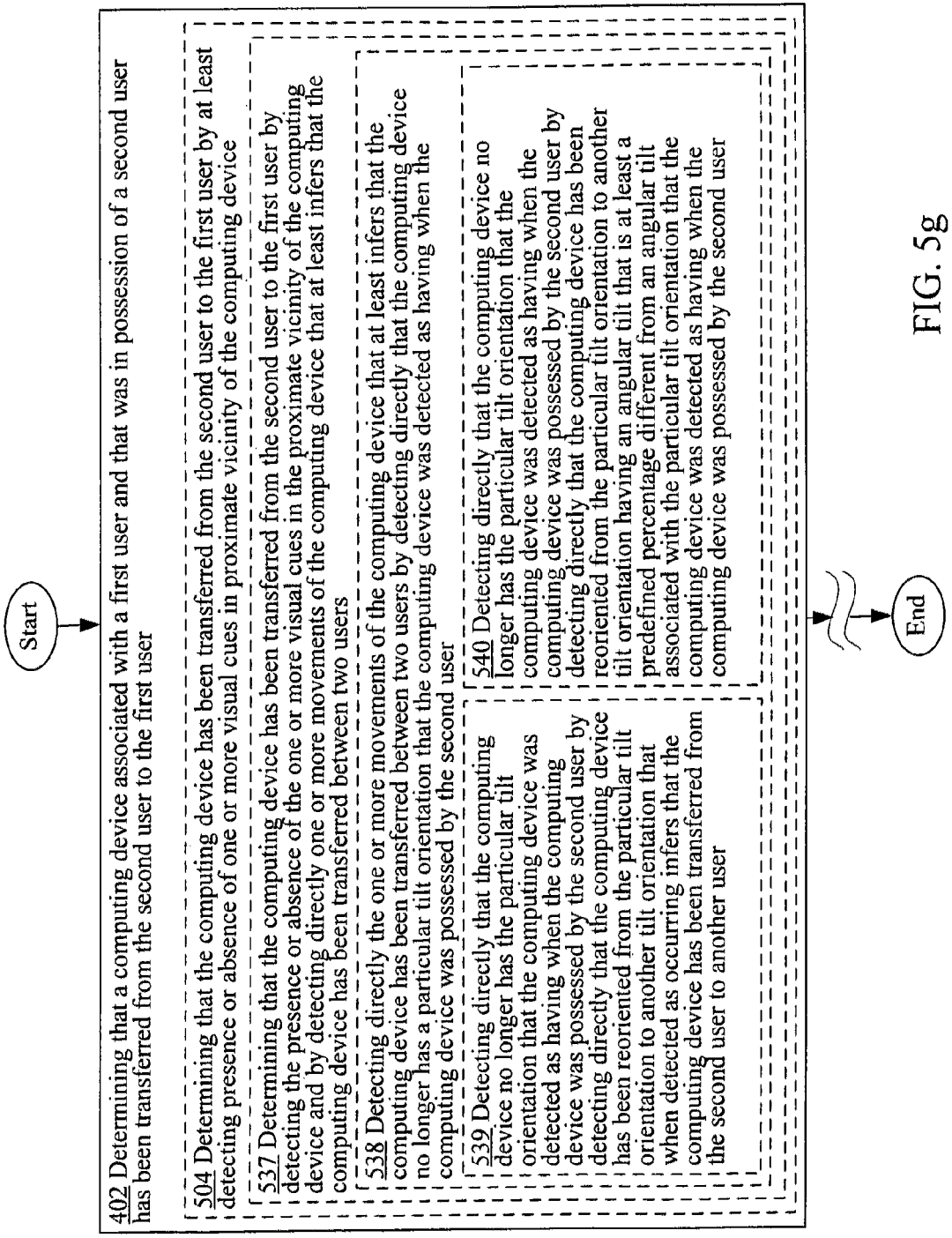
FIG. 5g is a high-level logic flowchart of a process depicting alternate implementations of the transfer determining operation 402 of FIG. 4.

Referring now to FIG. 5g, in some cases, operation 504 for determining that the computing device has been transferred from the second user to the first user by at least detecting presence or absence of one or more visual cues in proximate vicinity of the computing device may be performed by directly detecting one or more movements of the computing device in addition to detecting the presence or absence of the one or more visual cues. For example, in some implementations, operation 504 may include an operation 537 for determining that the computing device has been transferred from the second user to the first user by detecting the presence or absence of the one or more visual cues in the proximate vicinity of the computing device and by detecting directly one or more movements of the computing device that at least infers that the computing device has been transferred between two users. For instance, the transfer determining module 102* including the visual cue detecting module 210 and the direct movement detecting module 230 of the computing device 10* determining that the computing device 10* has been transferred from the second user 30 to the first user 20 when the visual cue detecting module 210 detects the presence or absence of the one or more visual cues in the proximate vicinity of the computing device 10* and when the direct movement detecting module 230 detects directly one or more movements of the computing device 10* that at least infers that the computing device 10* has been transferred between two users.

As further illustrated in FIG. 5g, operation 537 may include one or more additional operations in various alternative implementations. For example, in some implementations, operation 537 may include an operation 538 for detecting directly the one or more movements of the computing device that at least infers that the computing device has been transferred between two users by detecting directly that the computing device no longer has a particular tilt orientation that the computing device was detected as having when the computing device was possessed by the second user. For instance, the direct movement detecting module 230 including the tilt detecting module 231 of the computing device 10* detecting directly the one or more movements of the computing device 10* that when detected at least infers that the computing device 10* has been transferred between two users when the tilt detecting module 231 detects directly that the computing device 10* no longer has a particular tilt orientation that the computing device 10* was detected as having when the computing device 10* was possessed by the second user 30.

In some cases, operation 538 may further include an operation 539 for detecting directly that the computing device no longer has the particular tilt orientation that the computing device was detected as having when the computing device was possessed by the second user by detecting directly that the computing device has been reoriented from the particular tilt orientation to another tilt orientation that when detected as occurring infers that the computing device has been transferred from the second user to another user. For instance, the tilt detecting module 231 of the computing device 10* detecting directly that the computing device 10* no longer has the particular tilt orientation that the computing device 10* was detected as having when the computing device 10* was possessed by the second user 30 by detecting directly that the computing device 10* has been reoriented from the particular tilt orientation to another tilt orientation that when detected as occurring infers that the computing device 10* has been transferred from the second user 30 to another user (e.g., first user 20).

In the same or different implementations, operation 538 may include an operation 540 for detecting directly that the computing device no longer has the particular tilt orientation that the computing device was detected as having when the computing device was possessed by the second user by detecting directly that the computing device has been reoriented from the particular tilt orientation to another tilt orientation having an angular tilt that is at least a predefined percentage different from an angular tilt associated with the particular tilt orientation that the computing device was detected as having when the computing device was possessed by the second user. For instance, the tilt detecting module 231 of the computing device 10* detecting directly that the computing device 10* no longer has the particular tilt orientation that the computing device 10* was detected as having when the computing device 10* was possessed by the second user 30 by detecting directly that the computing device 10* has been reoriented from the particular tilt orientation to another tilt orientation having an angular tilt that is at least a predefined percentage different from an angular tilt associated with the particular tilt orientation that the computing device 10* was detected as having when the computing device 10* was possessed by the second user 30.

Figure 5H:
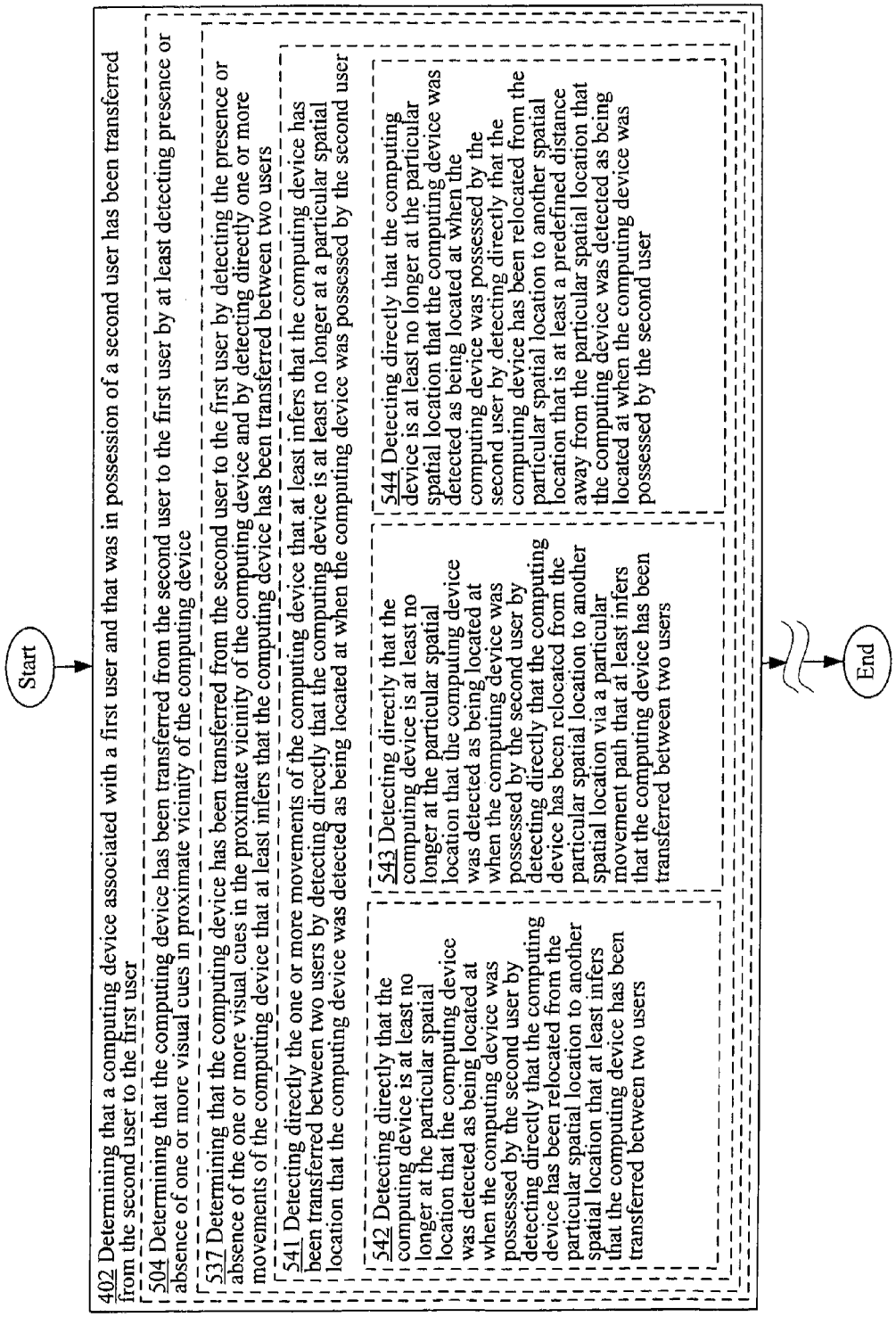
FIG. 5h is a high-level logic flowchart of a process depicting alternate implementations of the transfer determining operation 402 of FIG. 4.

In some cases operation 537 for determining that the computing device has been transferred from the second user to the first user by detecting the presence or absence of the one or more visual cues in the proximate vicinity of the computing device and by detecting directly one or more movements of the computing device that at least infers that the computing device has been transferred between two users may include an operation 541 for detecting directly the one or more movements of the computing device that at least infers that the computing device has been transferred between two users by detecting directly that the computing device is at least no longer at a particular spatial location that the computing device was detected as being located at when the computing device was possessed by the second user as illustrated in FIG. 5h. For instance, the direct movement detecting module 230 including the spatial location detecting module 232 of the computing device 10* detecting directly the one or more movements of the computing device 10* that at least infers that the computing device 10* has been transferred between two users when the spatial location detecting module 232 detects directly that the computing device 10* is at least no longer at a particular spatial location that the computing device 10* was detected as being located at when the computing device 10* was possessed by the second user 30.

As further illustrated in FIG. 5h, in various implementations operation 541 may further include one or more additional operations including, for example, an operation 542 for detecting directly that the computing device is at least no longer at the particular spatial location that the computing device was detected as being located at when the computing device was possessed by the second user by detecting directly that the computing device has been relocated from the particular spatial location to another spatial location that at least infers that the computing device has been transferred between two users. For instance, the spatial location detecting module 232 of the computing device 10* detecting directly that the computing device 10* is at least no longer at the particular spatial location that the computing device 10* was detected as being located at when the computing device 10* was possessed by the second user 30 by detecting directly that the computing device 10* has been relocated from the particular spatial location to another spatial location that when detected at least infers that the computing device 10* has been transferred between two users.

In the same or alternative implementations, operation 541 may additionally or alternatively include an operation 543 for detecting directly that the computing device is at least no longer at the particular spatial location that the computing device was detected as being located at when the computing device was possessed by the second user by detecting directly that the computing device has been relocated from the particular spatial location to another spatial location via a particular movement path that at least infers that the computing device has been transferred between two users as further depicted in FIG. 5h. For instance, the spatial location detecting module 232 including the movement path detecting module 233 of the computing device 10* detecting directly that the computing device 10* is at least no longer at the particular spatial location that the computing device 10* was detected as being located at when the computing device 10* was possessed by the second user 30 when the movement path detecting module 233 detects directly that the computing device 10* has been relocated from the particular spatial location to another spatial location via a particular movement path that when detected at least infers that the computing device 10* has been transferred between two users.

In the same or alternative implementations, operation 541 may additionally or alternatively include an operation 544 for detecting directly that the computing device is at least no longer at the particular spatial location that the computing device was detected as being located at when the computing device was possessed by the second user by detecting directly that the computing device has been relocated from the particular spatial location to another spatial location that is at least a predefined distance away from the particular spatial location that the computing device was detected as being located at when the computing device was possessed by the second user. For instance, the spatial location detecting module 232 of the computing device 10* detecting directly that the computing device 10* is at least no longer at the particular spatial location that the computing device 10* was detected as being located at when the computing device 10* was possessed by the second user 30 by detecting directly that the computing device 10* has been relocated from the particular spatial location to another spatial location that is at least a predefined distance away from the particular spatial location that the computing device 10* was detected as being located at when the computing device 10* was possessed by the second user 30.

Figure 5I:
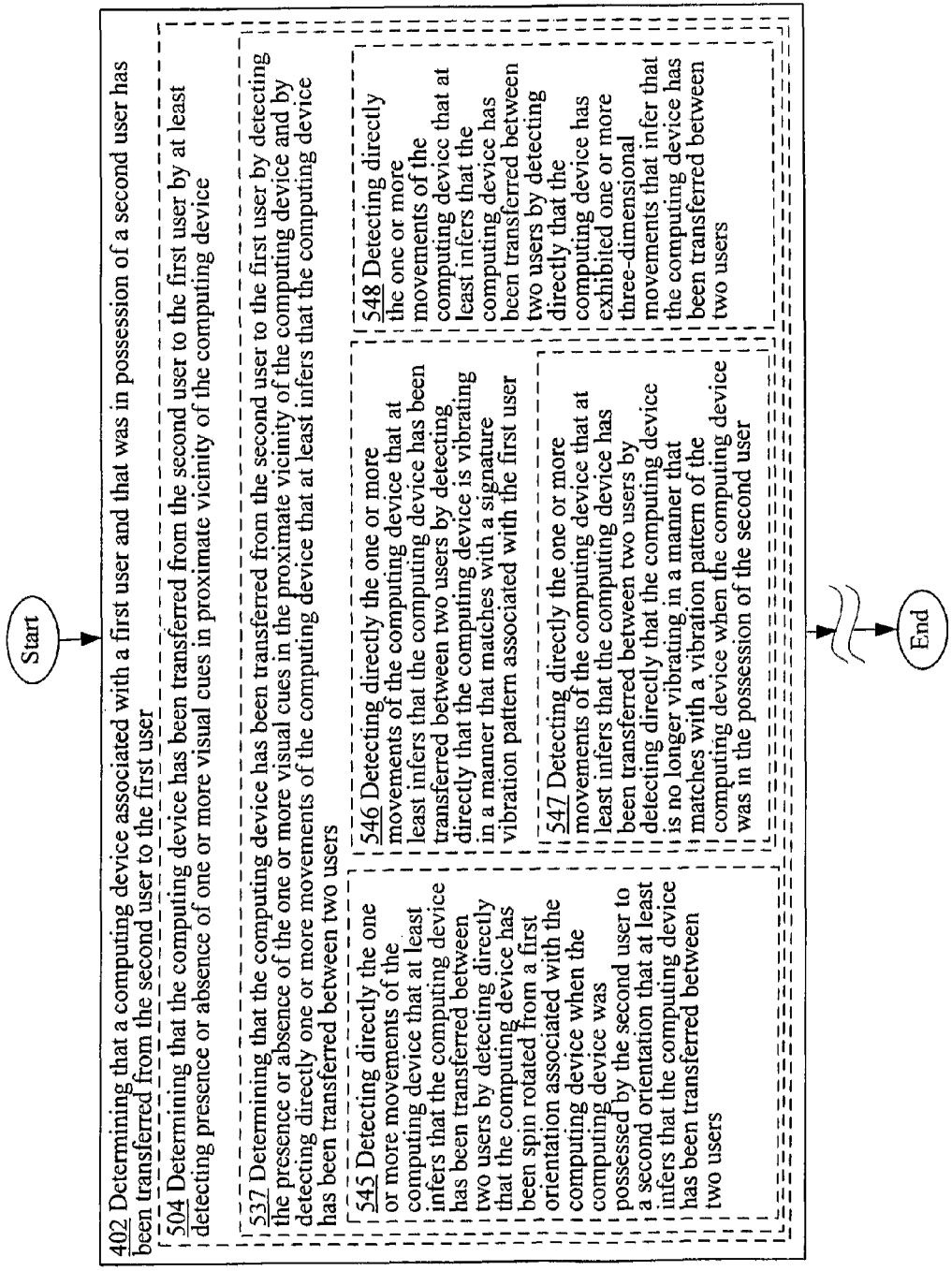
FIG. 5i is a high-level logic flowchart of a process depicting alternate implementations of the transfer determining operation 402 of FIG. 4.

Turning now to FIG. 5i, in some implementations, operation 537 for determining that the computing device has been transferred from the second user to the first user by detecting the presence or absence of the one or more visual cues in the proximate vicinity of the computing device and by detecting directly one or more movements of the computing device that at least infers that the computing device has been transferred between two users may include an operation 545 for detecting directly the one or more movements of the computing device that at least infers that the computing device has been transferred between two users by detecting directly that the computing device has been spin rotated from a first orientation associated with the computing device when the computing device was possessed by the second user to a second orientation that at least infers that the computing device has been transferred between two users. For instance, the direct movement detecting module 230 including the spin rotation detecting module 234 of the computing device 10* detecting directly the one or more movements of the computing device 10* that at least infers that the computing device 10* has been transferred between two users when the spin rotation detecting module 234 detects directly that the computing device 10* has been spin rotated from a first orientation associated with the computing device 10* when the computing device 10* was possessed by the second user 30 to a second orientation that when detected at least infers that the computing device 10* has been transferred between two users.

In the same or different implementations, operation 537 may additionally or alternatively include an operation 546 for detecting directly the one or more movements of the computing device that at least infers that the computing device has been transferred between two users by detecting directly that the computing device is vibrating in a manner that matches with a signature vibration pattern associated with the first user as further illustrated in FIG. 5i. For instance, the direct movement detecting module 230 including the vibration detecting module 235 of the computing device 10* detecting directly the one or more movements of the computing device 10* that at least infers that the computing device 10* has been transferred between two users when the vibration detecting module 235 using, for example, one or more movement sensors 202 detects directly that the computing device 10* is vibrating in a manner that matches with a signature vibration pattern associated with the first user 20.

In some cases, operation 546 may further include an operation 547 for detecting directly the one or more movements of the computing device that at least infers that the computing device has been transferred between two users by detecting directly that the computing device is no longer vibrating in a manner that matches with a vibration pattern of the computing device when the computing device was in the possession of the second user as further depicted in FIG. 5i. For instance, the direct movement detecting module 230 including the vibration detecting module 235 of the computing device 10* detecting directly the one or more movements of the computing device 10* that at least infers that the computing device 10* has been transferred between two users when the vibration detecting module 235 detects directly that the computing device 10* is no longer vibrating in a manner that matches with a vibration pattern of the computing device 10* when the computing device 10* was in the possession of (e.g., being held by) the second user 30.

In the same or alternative implementations, operation 537 may include an operation 548 for detecting directly the one or more movements of the computing device that at least infers that the computing device has been transferred between two users by detecting directly that the computing device has exhibited one or more three-dimensional movements that infer that the computing device has been transferred between two users. For instance, the direct movement detecting module 230 including the three-dimensional movement detecting module 236 (see FIG. 3c) of the computing device 10* detecting directly the one or more movements of the computing device 10* that at least infers that the computing device 10* has been transferred between two users when the three-dimensional movement detecting module 236 detects directly that the computing device 10* has exhibited one or more three-dimensional movements that when detected infer that the computing device 10* has been transferred between two users.

Figure 5J:
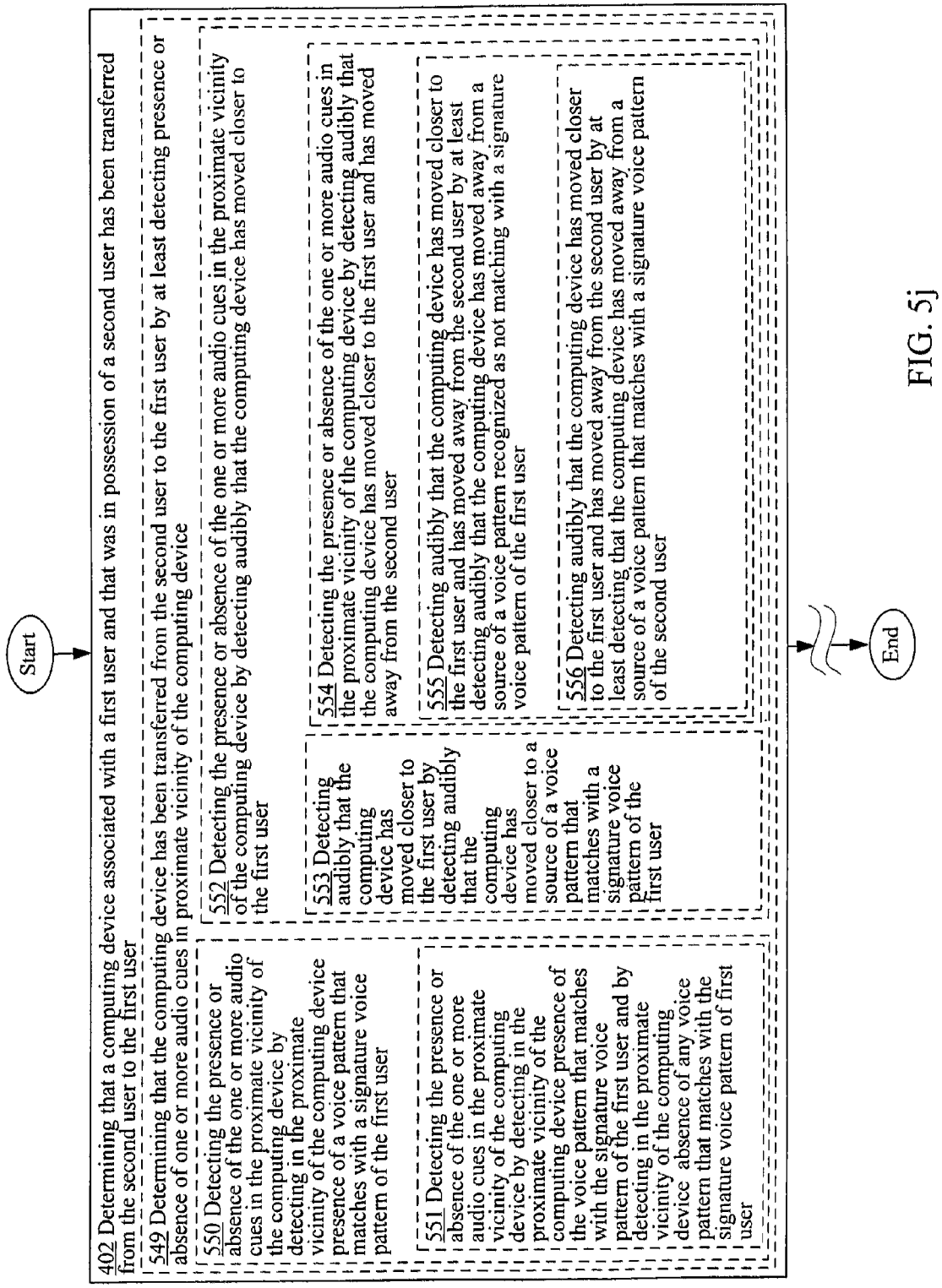
FIG. 5j is a high-level logic flowchart of a process depicting alternate implementations of the transfer determining operation 402 of FIG. 4.

Turning now to FIG. 5j, in various implementations, the transfer determining module 402 of FIG. 4 may include an operation 549 for determining that the computing device has been transferred from the second user to the first user by at least detecting presence or absence of one or more audio cues in proximate vicinity of the computing device. For instance, the transfer determining module 102* including the audio cue detecting module 226 of the computing device 10* determining that the computing device 10* has been transferred from the second user 30 to the first user 20 when the audio cue detecting module 226 of the computing device 10* at least detects presence or absence of one or more audio cues (e.g., detected or not detected voice patterns) in proximate vicinity of the computing device 10*.

As further illustrated in FIG. 5j, operation 549 may include one or more additional operations in various alternative implementations. For example, in some implementations, operation 549 may include an operation 550 for detecting the presence or absence of the one or more audio cues in the proximate vicinity of the computing device by detecting in the proximate vicinity of the computing device presence of a voice pattern that matches with a signature voice pattern of the first user. For instance, the audio cue detecting module 226 including the voice pattern detecting module 227 of the computing device 10* detecting the presence or absence of the one or more audio cues in the proximate vicinity of the computing device 10* when the voice pattern detecting module 227 detects in the proximate vicinity (e.g., within five feet) of the computing device 10* presence of a voice pattern that matches with a signature voice pattern of the first user 20.

In some cases, operation 550 may further include an operation 551 for detecting the presence or absence of the one or more audio cues in the proximate vicinity of the computing device by detecting in the proximate vicinity of the computing device presence of the voice pattern that matches with the signature voice pattern of the first user and by detecting in the proximate vicinity of the computing device absence of any voice pattern that matches with the signature voice pattern of first user. For instance, the audio cue detecting module 226 including the voice pattern detecting module 227 of the computing device 10* detecting the presence or absence of the one or more audio cues in the proximate vicinity of the computing device 10* when the voice pattern detecting module 227 detects in the proximate vicinity of the computing device 10* presence of the voice pattern that matches with the signature voice pattern of the first user 20 and by detecting in the proximate vicinity (e.g., 5 feet) of the computing device 10* absence of any voice pattern that matches with the signature voice pattern of first user 20.

In some implementations, operation 549 may include an operation 552 for detecting the presence or absence of the one or more audio cues in the proximate vicinity of the computing device by detecting audibly that the computing device has moved closer to the first user. For instance, the audio cue detecting module 226 including the audio moving closer detecting module 228 (see FIG. 3c) of the computing device 10* detecting the presence or absence of the one or more audio cues in the proximate vicinity of the computing device 10* when the audio moving closer detecting module 228 detects audibly (e.g., audibly detecting using, for example, one or more audio capturing devices 206) that the computing device 10* has moved closer to the first user 20. For example, in some cases, such an operation may involve initially detecting the presence of a voice pattern that matches with the signature voice pattern of the first user 20* in the proximate vicinity of the computing device 10* and determining whether the source of the voice is getting closer (e.g., whether the voice is getting louder).

In some implementations, operation 552 may include an operation 553 for detecting audibly that the computing device has moved closer to the first user by detecting audibly that the computing device has moved closer to a source of a voice pattern that matches with a signature voice pattern of the first user. For instance, the audio moving closer detecting module 228 of the computing device 10* detecting audibly that the computing device 10* has moved closer to the first user 20 by detecting audibly that the computing device 10* has moved closer to a source of a voice pattern (e.g., as sensed by one or more audio capturing devices 206) that matches with a signature voice pattern of the first user 20.

In the same or different implementations, operation 552 may additionally or alternatively include an operation 554 for detecting the presence or absence of the one or more audio cues in the proximate vicinity of the computing device by detecting audibly that the computing device has moved closer to the first user and has moved away from the second user as further depicted in FIG. 5j. For instance, the audio cue detecting module 226 including the audio moving closer detecting module 228 and the audio moving away detecting module 229 of the computing device 10* detecting the presence or absence of the one or more audio cues in the proximate vicinity of the computing device 10* when the audio moving closer detecting module 228 detects audibly that the computing device 10* has moved closer to the first user 20 and the audio moving away detecting module 229 has detected that the computing device 10* has moved away from the second user 30.

In some implementations, operation 554 may further include an operation 555 for detecting audibly that the computing device has moved closer to the first user and has moved away from the second user by at least detecting audibly that the computing device has moved away from a source of a voice pattern recognized as not matching with a signature voice pattern of the first user. For instance the audio moving closer detecting module 228 and the audio moving away detecting module 229 of the computing device 10* detecting audibly that the computing device 10* has moved closer to the first user 20 and has moved away from the second user 30 when the audio moving away detecting module 229 at least detects audibly that the computing device 10* has moved away from a source of a voice pattern (e.g., as sensed by one or more audio capturing devices 206) recognized as not matching with a signature voice pattern of the first user 20.

In some cases, operation 555 may, in turn, further include an operation 556 for detecting audibly that the computing device has moved closer to the first user and has moved away from the second user by at least detecting that the computing device has moved away from a source of a voice pattern that matches with a signature voice pattern of the second user. For instance, the audio moving closer detecting module 228 and the audio moving away detecting module 229 of the computing device 10* detecting audibly that the computing device 10* has moved closer to the first user 20* and has moved away from the second user 30 when the audio moving away detecting module 229 at least detects that the computing device 10* has moved away from a source of a voice pattern that matches with a signature voice pattern of the second user 30.

Figure 5K:
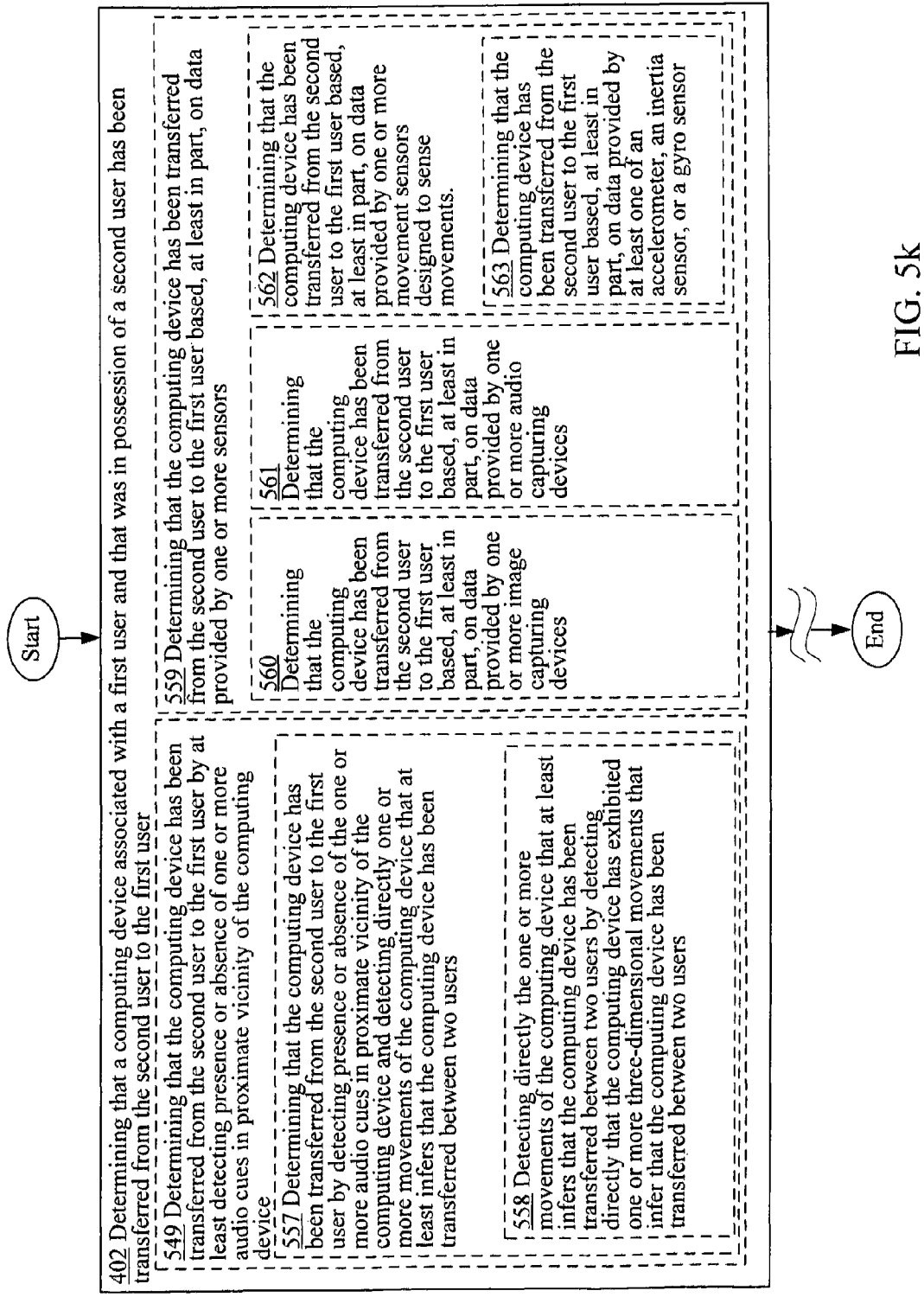
FIG. 5k is a high-level logic flowchart of a process depicting alternate implementations of the transfer determining operation 402 of FIG. 4.
Figure 51:
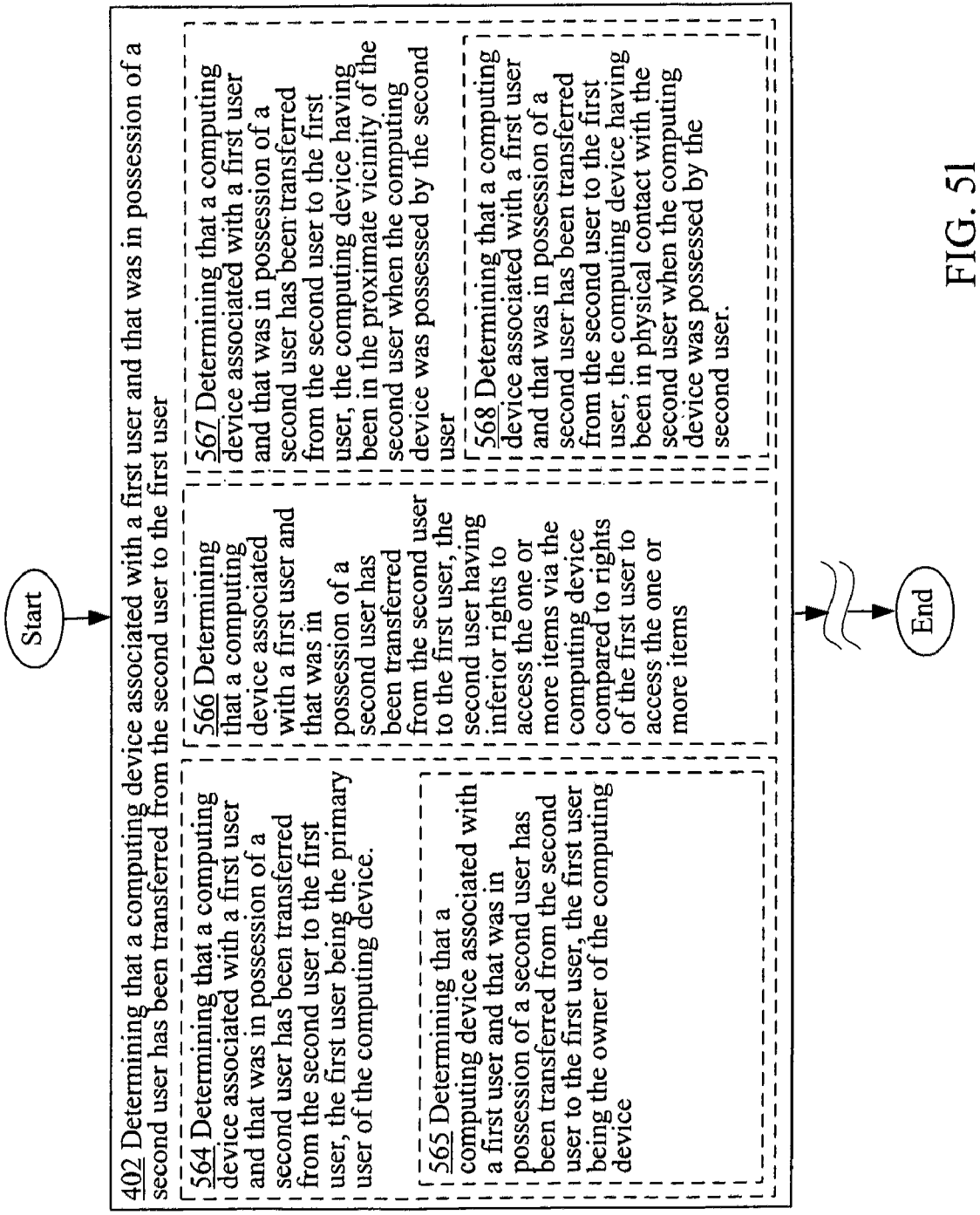

In some cases, operation 549 for determining that the computing device has been transferred from the second user to the first user by at least detecting presence or absence of one or more audio cues in proximate vicinity of the computing device may include an operation 557 for determining that the computing device has been transferred from the second user to the first user by detecting presence or absence of the one or more audio cues in proximate vicinity of the computing device and detecting directly one or more movements of the computing device that at least infers that the computing device has been transferred between two users as illustrated in FIG. 5k. For instance, the transfer determining module 102* including the audio cue detecting module 226 and the direct movement detecting module 230 of the computing device 10* determining that the computing device 10* has been transferred from the second user 30 to the first user 20 when the audio cue detecting module 226 detects presence or absence of one or more audio cues in proximate vicinity of the computing device 10* and the direct movement detecting module 230 detecting directly one or more movements of the computing device 10* that at least infers that the computing device 10* has been transferred between two users (e.g., transferred between the second user 30 and the first user 20).

As further illustrated in FIG. 5k, in some implementations, operation 557 may include an operation 558 for detecting directly the one or more movements of the computing device that at least infers that the computing device has been transferred between two users by detecting directly that the computing device has exhibited one or more three-dimensional movements that infer that the computing device has been transferred between two users. For instance, the direct movement detecting module 230 including the three-dimensional movement detecting module 236 of the computing device 10* detecting directly (via one or more movement sensors 202) the one or more movements of the computing device 10* that at least infers that the computing device 10* has been transferred between two users when the three-dimensional movement detecting module 236 detects directly that the computing device 10* has exhibited one or more three-dimensional movements that when detected at least infer that the computing device 10* has been transferred between two users.

In various implementations, the transfer determining operation 402 of FIG. 4 may be performed using data provided by one or more sensors 120. For example, and as illustrated in FIG. 5k, the transfer determining operation 402 in various implementations may include an operation 559 for determining that the computing device has been transferred from the second user to the first user based, at least in part, on data provided by one or more sensors. For instance, the transfer determining module 102* of the computing device 10* determining that the computing device 10* has been transferred from the second user 30 to the first user 20 based, at least in part, on data provided by one or more sensors 120.

As further illustrated in FIG. 5k, in various implementations operation 559 may include one or more additional operations including, for example, an operation 560 for determining that the computing device has been transferred from the second user to the first user based, at least in part, on data provided by one or more image capturing devices. For instance, the transfer determining module 102* of the computing device 10* determining that the computing device 10* has been transferred from the second user 30 to the first user 20 based, at least in part, on data provided by one or more image capturing devices 204 (e.g., one or more webcams, digital cameras, and so forth, integrated with the computing device 10*).

In the same or different implementations, operation 559 may additionally or alternatively include an operation 561 for determining that the computing device has been transferred from the second user to the first user based, at least in part, on data provided by one or more audio capturing devices. For instance, the transfer determining module 102* of the computing device 10* determining that the computing device 10* has been transferred from the second user 30 to the first user 20 based, at least in part, on data provided by one or more audio capturing devices 206 (e.g., microphones).

In the same or different implementations, operation 559 may additionally or alternatively include an operation 562 for determining that the computing device has been transferred from the second user to the first user based, at least in part, on data provided by one or more movement sensors designed to sense movements as further depicted in FIG. 5k. For instance, the transfer determining module 102* of the computing device 10* determining that the computing device 10* has been transferred from the second user 30 to the first user 20 based, at least in part, on data provided by one or more movement sensors 202 designed to sense movements (e.g., tilt movements, spin rotation movements, spatial relocation movements, overall three-dimensional movements, etc.).

In some implementations, operation 562 may further include an operation 563 for determining that the computing device has been transferred from the second user to the first user based, at least in part, on data provided by at least one of an accelerometer, an inertia sensor, or a gyro sensor as further depicted in FIG. 5k. For instance, the transfer determining module 102* of the computing device 10* determining that the computing device 10* has been transferred from the second user 30 to the first user 20 based, at least in part, on data provided by at least one of an accelerometer, an inertia sensor, or a gyro sensor.

In various embodiments, the computing device 10* referred to in the transfer determining operation 402 of FIG. 4 may be "associated" with the first user 20 in a variety of different ways in various alternative implementations. For example, and as illustrated in FIG. 5*l*, the transfer determining operation 402 of FIG. 4 may include an operation 564 for determining that a computing device associated with a first user and that was in possession of a second user has been transferred from the second user to the first user, the first user being the primary user of the computing device. For instance, the transfer determining module 102* of the computing device 10* determining that a computing device 10* associated with a first user 20 and that was in possession of a second user 30 has been transferred from the second user 30 to the first user 20, the first user 20 being the primary user of the computing device 10*.

As further illustrated in FIG. 5*l*, in some cases, operation 564 may actually involve an operation 565 for determining that a computing device associated with a first user and that was in possession of a second user has been transferred from the second user to the first user, the first user being the owner of the computing device. For instance, the transfer determining module 102* of the computing device 10* determining that a computing device 10* associated with a first user 20 and that was in possession of a second user 30 has been transferred from the second user 30 to the first user 20, the first user 20 being the owner of the computing device 10*.

In some implementations, the transfer determining operation 402 may actually involve an operation 566 for determining that a computing device associated with a first user and that was in possession of a second user has been transferred from the second user to the first user, the second user having inferior rights to access the one or more items via the computing device compared to rights of the first user to access the one or more items. For instance, the transfer determining module 102* of the computing device 10* determining that a computing device 10* associated with a first user 20 and that was in possession of a second user 30 has been transferred from the second user 30 to the first user 20, the second user 30 having inferior rights to access the one or more items via the computing device 10* compared to rights of the first user 20 to access the one or more items.

In various embodiments, the computing device 10* involved in the transfer determining operation 402 of FIG. 4 may be in the "possession" of the second user 30 in a variety of different ways. For example, and as further illustrated in FIG. 5*l*, the transfer determining operation 402 of FIG. 4 may include an operation 567 for determining that a computing device associated with a first user and that was in possession of a second user has been transferred from the second user to the first user, the computing device having been in the proximate vicinity of the second user when the computing device was possessed by the second user. For instance, the transfer determining module 102* of the computing device 10* determining that a computing device 10* associated with a first user 20 and that was in possession of a second user 30 has been transferred from the second user 30 to the first user 20, the computing device 10* having been in the proximate vicinity (e.g., within reach or arm's length) of the second user 30 when the computing device 10* was possessed by the second user 30.

In some implementations, operation 567 may actually involve an operation 568 for determining that a computing device associated with a first user and that was in possession of a second user has been transferred from the second user to the first user, the computing device having been in physical contact with the second user when the computing device was possessed by the second user. For instance, the transfer determining module 102* of the computing device 10* determining that a computing device 10* associated with a first user 20 and that was in possession of a second user 30 has been transferred from the second user 30 to the first user 20, the computing device 10* having been in physical contact with the second user 30 (e.g., being held by the second user 30) when the computing device 10* was possessed by the second user 30.

Referring back to the access providing operation 404 of FIG. 4, the access providing operation 404 similar to the transfer determining operation 402 of FIG. 4 may be executed in a number of different ways in various alternative embodiments as illustrated in FIGS. 6*a*, 6*b*, 6*c*, and 6*d*. In some implementations, for example, the access providing operation 404 of FIG. 4 may include an operation 669 for providing at least greater access via the computing device to one or more items in response to said determining by providing at least greater access to the one or more items that were at least not partially accessible by the second user when the second user had possession of the computing device. For instance, the access providing module 104* of the computing device 10* providing at least greater access via the computing device 10* to one or more items in response to said determining (e.g., determining that the computing device 10* has been transferred from the second user 30 to the first user 20) by providing at least greater access to one or more items (e.g., one or more applications 160, documents, audio or image files, passwords, and so forth) that were at least not partially accessible by the second user 30 when the second user 30 had possession of the computing device 10*.

In some implementations, operation 669 may include an operation 670 for providing at least greater access via the computing device to one or more items in response to said determining by providing at least greater access to the one or more items that were totally inaccessible by the second user when the second user had possession of the computing device. For instance, the access providing module 104* of the computing device 10* providing at least greater access via the computing device 10* to one or more items in response to said determining (e.g., determining that the computing device 10* has been transferred from the second user 30 to the first user 20) by providing at least greater access to one or more items (e.g., one or more documents and/or one or more applications 160) that were totally or entirely inaccessible (e.g., not visually or audibly visible, not editorially accessible, and/or not functionally accessible) by the second user 30 when the second user 30 had possession of the computing device 10*.

Figure 6A:
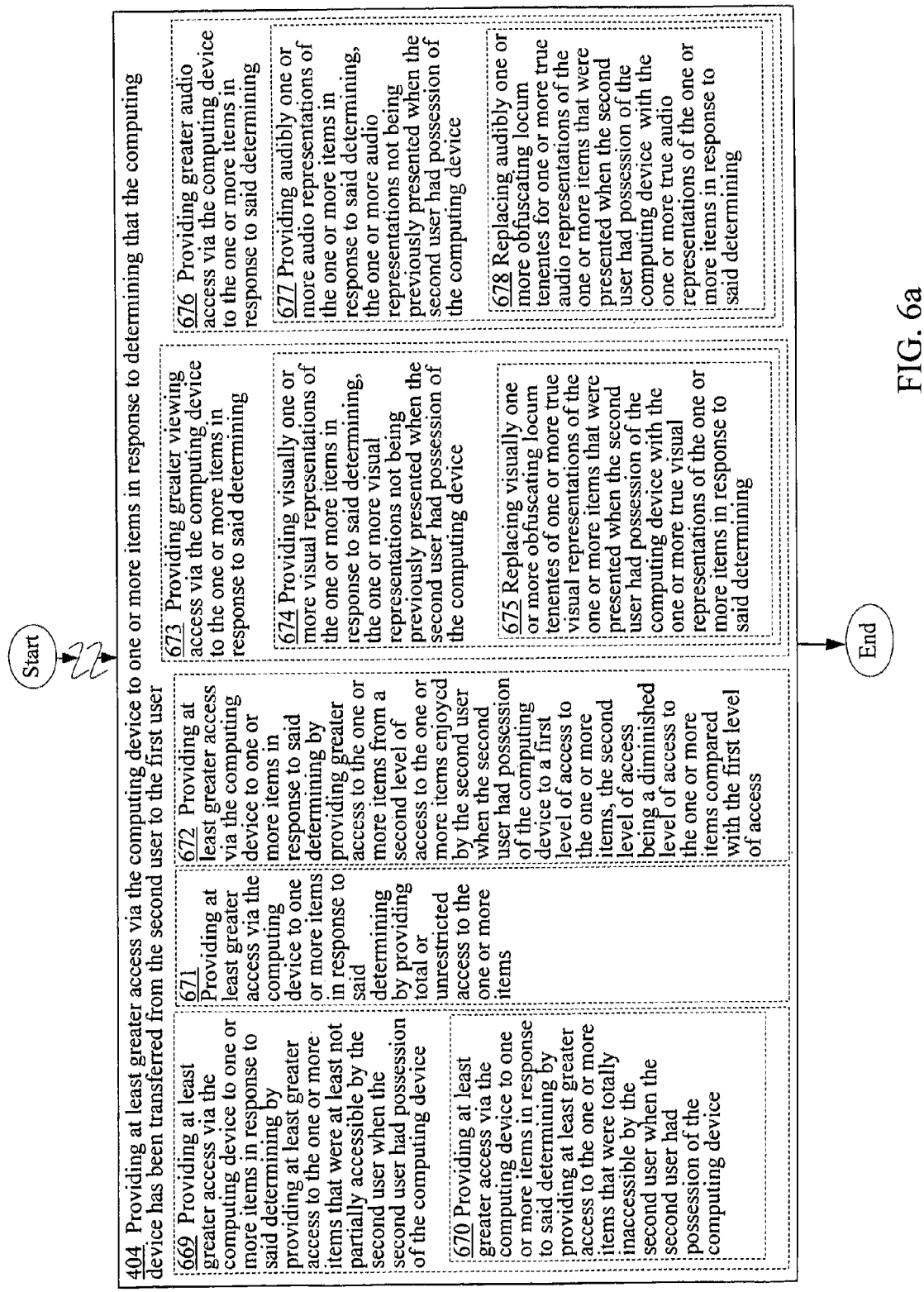
FIG. 6a is a high-level logic flowchart of a process depicting alternate implementations of the access providing operation 404 of FIG. 4.

In the same or different implementations, the access providing operation 404 of FIG. 4 may include an operation 671 for providing at least greater access via the computing device to one or more items in response to said determining by providing total or unrestricted access to the one or more items as further illustrated in FIG. 6*a*. For instance, the access providing module 104* of the computing device 10* providing at least greater access via the computing device 10* to one or more items in response to said determining (e.g., determining that the computing device 10* has been transferred from the second user 30 to the first user 20) by providing total or unrestricted access (e.g., absolute editorial access and/or functional access) to the one or more items (e.g., one or more applications 160 and/or one or more documents or files).

In same or different implementations, the access providing operation 404 may include an operation 672 for providing at least greater access via the computing device to one or more items in response to said determining by providing greater access to the one or more items from a second level of access to the one or more items enjoyed by the second user when the second user had possession of the computing device to a first level of access to the one or more items, the second level of access being a diminished level of access to the one or more items compared with the first level of access. For instance, the access providing module 104* of the computing device 10* providing at least greater access via the computing device 10* to one or more items in response to said determining by providing greater access to the one or more items (e.g., word processing document) from a second level of access (e.g., read-only access) to the one or more items enjoyed by the second user 30 when the second user 30 had possession (e.g., had control) of the computing device 10* to a first level of access (e.g., full read/write access including editorial access) to the one or more items, the second level of access being a diminished level of access to the one or more items compared with the first level of access.

In the same or different implementations, the access providing operation 404 may additionally or alternatively include an operation 673 for providing greater viewing access via the computing device to the one or more items in response to said determining as further illustrated in FIG. 6a. For instance, the viewing access providing module 240 (see FIG. 3d) of the computing device 10* providing greater viewing access via the computing device 10* to the one or more items in response to said determining of the computing device 10* being transferred from the second user 30 to the first user 20. For example, if the one or more items are one or more textual messages (e.g., emails), than displaying the entire content of the messages rather than, for example, not displaying any indications of the existence of the one or more messages or displaying only the subject headings of the one or more messages as may have been the case when the computing device 10* was in the possession of the second user 30.

As further illustrated in FIG. 6a, in various implementations, operation 673 may include one or more additional operations. For example, in some implementations, operation 673 may include an operation 674 for providing visually one or more visual representations of the one or more items in response to said determining, the one or more visual representations not being previously presented when the second user had possession of the computing device. For instance, the visual representation providing module 241 (see FIG. 3d) of the computing device 10* providing visually one or more visual representations of the one or more items (e.g., one or more document titles of one or more documents) in response to said determining, the one or more visual representations not being previously presented when the second user 30 had possession of the computing device 10*.

In some cases, operation 674 may, in turn, include an operation 675 for replacing visually one or more obfuscating locum tenentes of one or more true visual representations of the one or more items that were presented when the second user had possession of the computing device with the one or more true visual representations of the one or more items in response to said determining. For instance, the visual replacing module 242 (see FIG. 3d) of the computing device 10* replacing visually one or more obfuscating locum tenentes (e.g., fake document titles) of one or more true visual representations of the one or more items (e.g., word processing documents) that were presented when the second user 30 had possession of the computing device 10* with the one or more true visual representations (e.g., correct document titles) of the one or more items in response to said determining of the computing device 10* being transferred from the second user 30 to the first user 20.

In the same or different implementations, the access providing operation 404 of FIG. 4 may include an operation 676 for providing greater audio access via the computing device to the one or more items in response to said determining as illustrated in FIG. 6a. For instance, the audio access providing module 244 (see FIG. 3d) of the computing device 10* providing greater audio access via the computing device 10* to the one or more items (e.g., voice messages) in response to said determining of the computing device 10* being transferred from the second user 30 to the first user 20. For example, if the one or more items are one or more voice messages then allowing greater access to such items may mean allowing, for example, the first user 20 to audibly play the one or more voice messages.

As further depicted in FIG. 6a, operation 676 may include one or more additional operations in various alternative implementations. For example, in some implementations, operation 676 may include an operation 677 for providing audibly one or more audio representations of the one or more items in response to said determining, the one or more audio representations not being previously presented when the second user had possession of the computing device. For instance, the audio representation providing module 245 (see FIG. 3d) of the computing device 10* providing audibly one or more audio representations of the one or more items (e.g., one or more voice messages) in response to said determining, the one or more audio representations (e.g., audio indications of received messages) not being previously presented when the second user 30 had possession of the computing device 10*.

In some cases, operation 677 may, in turn, include an operation 678 for replacing audibly one or more obfuscating locum tenentes for one or more true audio representations of the one or more items that were presented when the second user had possession of the computing device with the one or more true audio representations of the one or more items in response to said determining. For instance, the audio replacing module 246 (see FIG. 3d) of the computing device 10* replacing audibly one or more obfuscating locum tenentes (e.g., fake voice messages) for one or more true audio representations of the one or more items (e.g., voice messages) that were presented when the second user 30 had possession of the computing device 10* with the one or more true audio representations (e.g., actual voice messages) of the one or more items in response to said determining of the computing device 10* being transferred from the second user 30 to the first user 20.

Figure 6B:
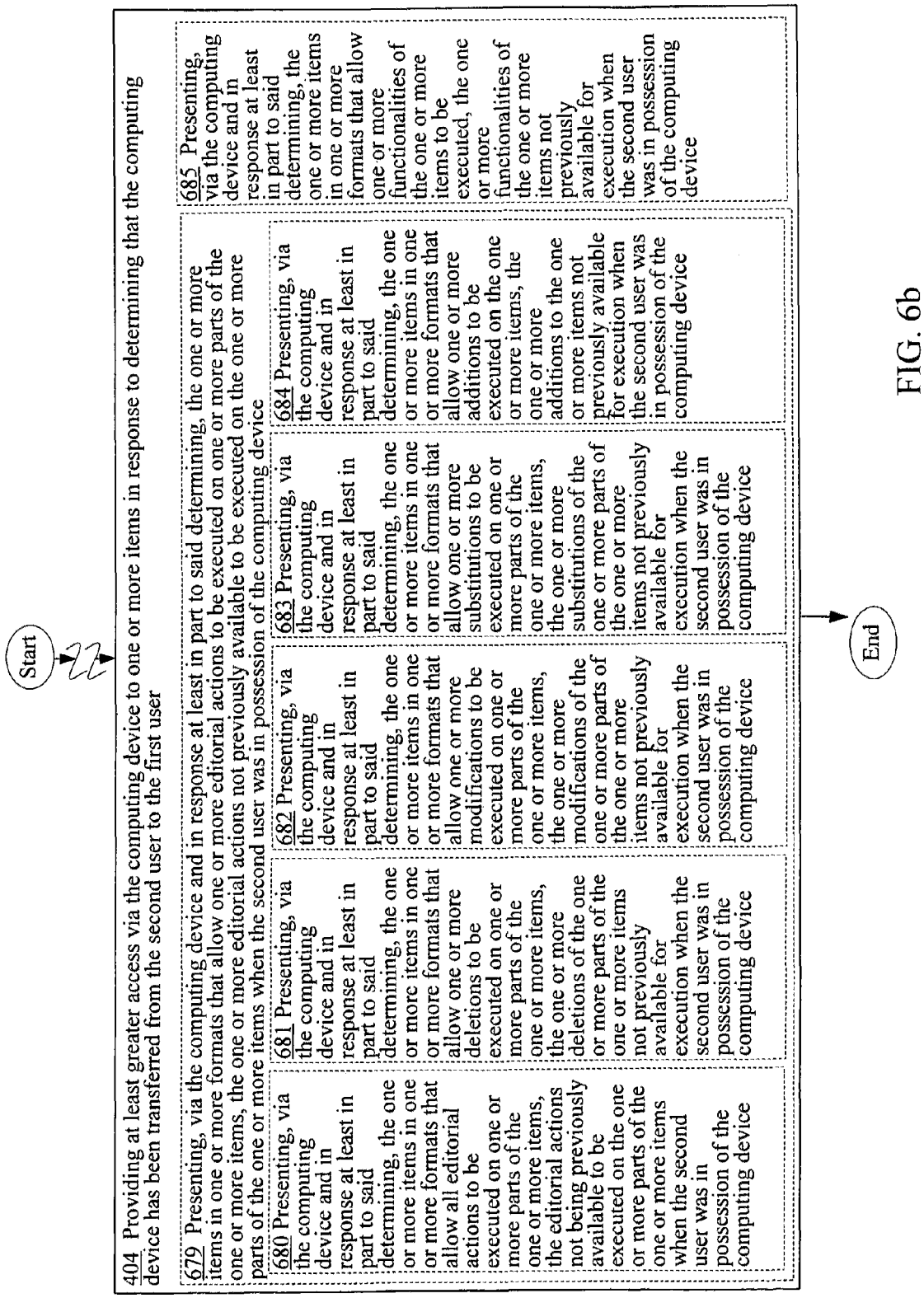
FIG. 6b is a high-level logic flowchart of a process depicting alternate implementations of the access providing operation 404 of FIG. 4.

Turning now to FIG. 6b, in various implementations, the access providing operation 404 of FIG. 4 may include an operation 679 for presenting, via the computing device and in response at least in part to said determining, the one or more items in one or more formats that allow one or more editorial actions to be executed on one or more parts of the one or more items, the one or more editorial actions not previously available to be executed on the one or more parts of the one or more items when the second user was in possession of the computing device. For instance, the editable format presenting module 248 (see FIG. 3d) of the computing device 10* presenting, via the computing device 10* and in response at least in part to said determining, the one or more items (e.g., word processing or spreadsheet documents) in one or more formats that allow one or more editorial actions to be executed on one or more parts of the one or more items, the one or more editorial actions not previously available to be executed on the one or more parts of the one or more items when the second user 30 was in possession of the computing device 10\*.

As further illustrated in FIG. 6*b*, operation 679 may include one or more additional operations in various alternative implementations. For example, in some implementations, operation 679 may include an operation 680 for presenting, via the computing device and in response at least in part to said determining, the one or more items in one or more formats that allow all editorial actions to be executed on one or more parts of the one or more items, the editorial actions not being previously available to be executed on the one or more parts of the one or more items when the second user was in possession of the computing device. For instance, the editable format presenting module 248 of the computing device 10\* presenting, via the computing device 10\* and in response at least in part to said determining, the one or more items (e.g., one or more presentation documents) in one or more formats (e.g., read/write formats) that allow all editorial actions (e.g., deletions, modifications, additions, and so forth) to be executed on one or more parts of the one or more items, the editorial actions not being previously available to be executed on the one or more parts of the one or more items when the second user 30 was in possession of the computing device 10\*.

In the same or different implementations, operation 679 may additionally or alternatively include an operation 681 for presenting, via the computing device and in response at least in part to said determining, the one or more items in one or more formats that allow one or more deletions to be executed on one or more parts of the one or more items, the one or more deletions of the one or more parts of the one or more items not previously available for execution when the second user was in possession of the computing device. For instance, the deletable format presenting module 249 (see FIG. 3*d*) of the computing device 10\* presenting, via the computing device 10\* and in response at least in part to said determining, the one or more items in one or more formats that allow one or more deletions to be executed on one or more parts (e.g., a sentence or a word) of the one or more items (e.g., word processing documents), the one or more deletions of the one or more parts of the one or more items not previously available for execution when the second user 30 was in possession of the computing device 10\*.

In the same or different implementations, operation 679 may additionally or alternatively include an operation 682 for presenting, via the computing device and in response at least in part to said determining, the one or more items in one or more formats that allow one or more modifications to be executed on one or more parts of the one or more items, the one or more modifications of the one or more parts of the one or more items not previously available for execution when the second user was in possession of the computing device. For instance, the modifiable format presenting module 250 (see FIG. 3*d*) of the computing device 10\* presenting, via the computing device 10\* and in response at least in part to said determining, the one or more items (e.g., word processing documents or image files) in one or more formats that allow one or more modifications (e.g., revisions or alterations) to be executed on one or more parts of the one or more items, the one or more modifications of the one or more parts of the one or more items not previously available for execution when the second user 30 was in possession of the computing device 10\*.

In the same or different implementations, operation 679 may additionally or alternatively include an operation 683 for presenting, via the computing device and in response at least in part to said determining, the one or more items in one or more formats that allow one or more substitutions to be executed on one or more parts of the one or more items, the one or more substitutions of the one or more parts of the one or more items not previously available for execution when the second user was in possession of the computing device. For instance, the substitutable format presenting module 251 (see FIG. 3*d*) of the computing device 10\* presenting, via the computing device 10\* and in response at least in part to said determining, the one or more items (e.g., spreadsheet documents) in one or more formats that allow one or more substitutions (e.g., substitute numbers) to be executed on one or more parts of the one or more items, the one or more substitutions of the one or more parts of the one or more items not previously available for execution when the second user 30 was in possession of the computing device 10\*.

In the same or different implementations, operation 679 may additionally or alternatively include an operation 684 for presenting, via the computing device and in response at least in part to said determining, the one or more items in one or more formats that allow one or more additions to be executed on the one or more items, the one or more additions to the one or more items not previously available for execution when the second user was in possession of the computing device. For instance, the addable format presenting module 252 (see FIG. 3*d*) of the computing device 10\* presenting, via the computing device 10\* and in response at least in part to said determining, the one or more items (e.g., graphics or diagramming documents) in one or more formats that allow one or more additions to be executed on the one or more items, the one or more additions to the one or more items not previously available for execution when the second user 30 was in possession of the computing device 10\*.

In various implementations, the access providing operation 404 of FIG. 4 may include an operation 685 for presenting, via the computing device and in response at least in part to said determining, the one or more items in one or more formats that allow one or more functionalities of the one or more items to be executed, the one or more functionalities of the one or more items not previously available for execution when the second user was in possession of the computing device as further illustrated in FIG. 6*b*. For instance, the functional format presenting module 254 (see FIG. 3*d*) of the computing device 10\* presenting, via the computing device 10\* and in response at least in part to said determining, the one or more items (e.g., one or more applications 160 such as a word processing application) in one or more formats that allow one or more functionalities (e.g., saving or copying features) of the one or more items to be executed, the one or more functionalities of the one or more items not previously available for execution when the second user 30 was in possession of the computing device 10\*.

Figure 6C:
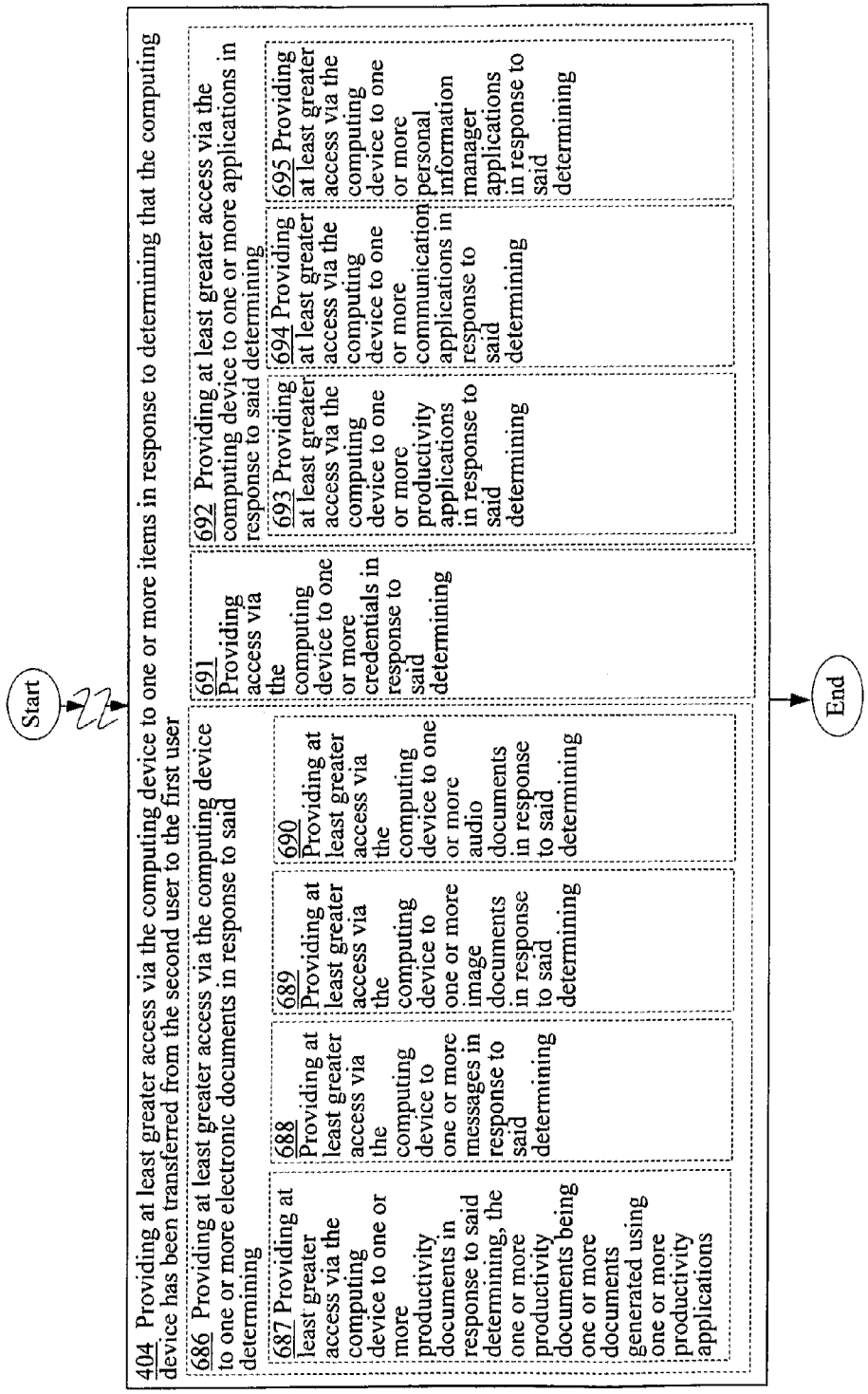
FIG. 6c is a high-level logic flowchart of a process depicting alternate implementations of the access providing operation 404 of FIG. 4.

Turning now to FIG. 6*c*, in various implementations, the access providing operation 404 may include an operation 686 for providing at least greater access via the computing device to one or more electronic documents in response to said determining. For instance, the access providing module 104\* of the computing device 10\* providing at least greater access via the computing device 10\* to one or more electronic documents (e.g., productivity documents, image files, and/or audio files) in response to said determining of the computing device 10\* being transferred from the second user 30 to the first user 20.

As further illustrated in FIG. 6*c*, operation 686 may including one or more additional operations in various alternative implementations. For example, in some cases, operation 686 may include an operation 687 for providing at least greater access via the computing device to one or more productivity documents in response to said determining, the one or more productivity documents being one or more documents generated using one or more productivity applications. For instance, the access providing module 104* of the computing device 10* providing at least greater access via the computing device 10* to one or more productivity documents in response to said determining, the one or more productivity documents being one or more documents generated using one or more productivity applications (e.g., a word processing application, a spreadsheet application, a presentation application, a diagramming application, and so forth).

In some implementations, operation 686 may additionally or alternatively include an operation 688 for providing at least greater access via the computing device to one or more messages in response to said determining as further depicted in FIG. 6c. For instance, the access providing module 104* of the computing device 10* providing at least greater access via the computing device 10* to one or more messages in response to said determining of the computing device 10* being transferred from the second user 30 to the first user 20.

In some implementations, operation 686 may additionally or alternatively include an operation 689 for providing at least greater access via the computing device to one or more image documents in response to said determining. For instance, the access providing module 104* of the computing device 10* providing at least greater access via the computing device 10* to one or more image documents (e.g., video clips and/or digital image files) in response to said determining of the computing device 10* being transferred from the second user 30 to the first user 20.

In some implementations, operation 686 may additionally or alternatively include an operation 690 for providing at least greater access via the computing device to one or more audio documents in response to said determining. For instance, the access providing module 104* of the computing device 10* providing at least greater access via the computing device 10* to one or more audio documents (e.g., audio recordings and/or voice messages) in response to said determining of the computing device 10* being transferred from the second user 30 to the first user 20.

Referring back to FIG. 6c, in various implementations, the access providing operation 404 of FIG. 4 may additionally or alternatively include an operation 691 for providing access via the computing device to one or more credentials in response to said determining. For instance, the access providing module 104* of the computing device 10* providing access via the computing device 10* to one or more credentials (e.g., passwords) in response to said determining of the computing device 10* being transferred from the second user 30 to the first user 20, the one or more credentials not being available when the computing device 10* was in the possession of the second user 30.

In some implementations, the access providing operation 404 may additionally or alternatively include an operation 692 for providing at least greater access via the computing device to one or more applications in response to said determining. For instance, the access providing module 104* of the computing device 10* providing at least greater access (e.g., greater access to one or more functionalities) via the computing device 10* to one or more applications 160 in response to said determining of the computing device 10* being transferred from the second user 30 to the first user 20.

As further illustrated in FIG. 6c, operation 692 in various implementations may include one or more additional operations including an operation 693 for providing at least greater access via the computing device to one or more productivity applications in response to said determining. For instance, the access providing module 104* of the computing device 10* providing at least greater access via the computing device 10* to one or more productivity applications in response to said determining of the computing device 10* being transferred from the second user 30 to the first user 20.

Alternatively or additionally, in some implementations, operation 692 may include an operation 694 for providing at least greater access via the computing device to one or more communication applications in response to said determining. For instance, the access providing module 104* of the computing device 10* providing at least greater access via the computing device 10* to one or more communication applications (e.g., email application, Instant messaging application, and so forth) in response to said determining of the computing device 10* being transferred from the second user 30 to the first user 20.

In some implementations, operation 692 may additionally or alternatively include an operation 695 for providing at least greater access via the computing device to one or more personal information manager applications in response to said determining. For instance, the access providing module 104* of the computing device 10* providing at least greater access via the computing device 10* to one or more personal information manager applications (e.g., Microsoft Outlook) in response to said determining of the computing device 10* being transferred from the second user 30 to the first user 20.

Figure 6D:
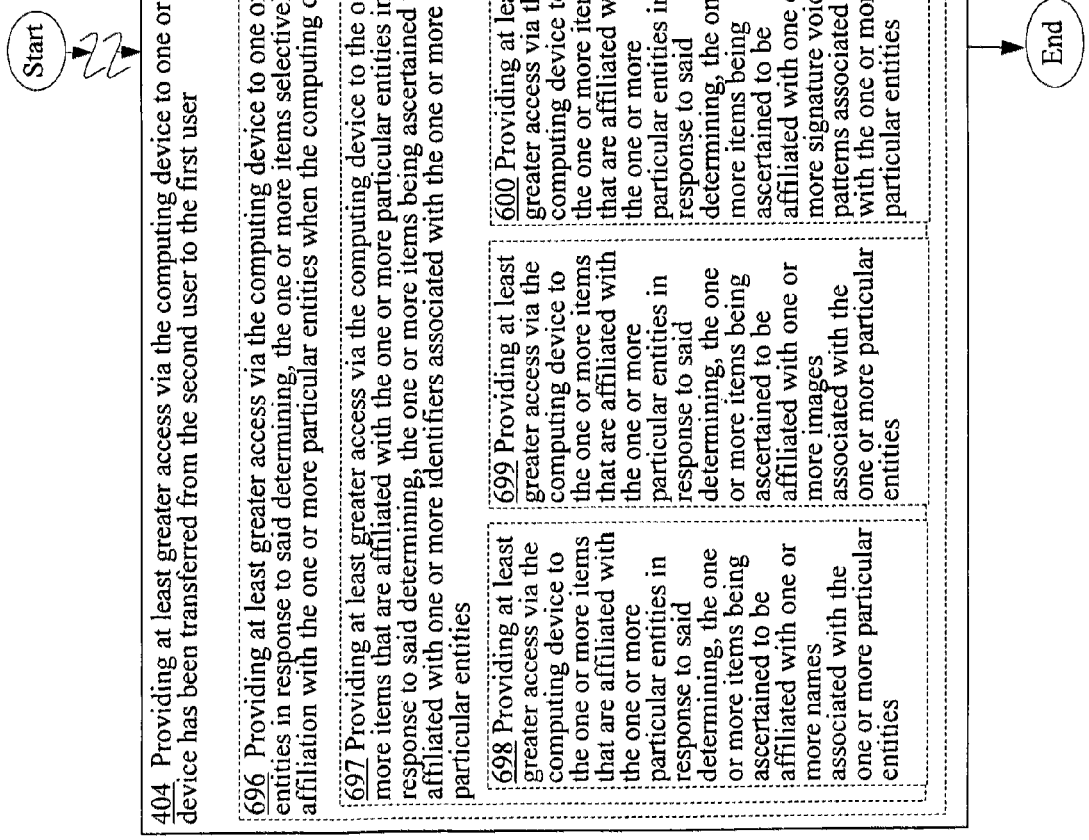
FIG. 6d is a high-level logic flowchart of a process depicting alternate implementations of the access providing operation 404 of FIG. 4.

Turning now to FIG. 6d, in various implementations, the access providing operation 404 may include an operation 696 for providing at least greater access via the computing device to one or more items that are affiliated with one or more particular entities in response to said determining, the one or more items selectively being at least partly not accessible as a result of their affiliation with the one or more particular entities when the computing device was in the possession of the second user. For instance, the access providing module 104* of the computing device 10* providing at least greater access via the computing device 10* to one or more items (e.g., messages) that are affiliated with one or more particular entities (e.g., sent by the one or more particular entities) in response to said determining of the computing device 10* being transferred from the second user 30 to the first user 20, the one or more items selectively being at least partly not accessible as a result of their affiliation with the one or more particular entities when the computing device 10* was in the possession of the second user 30.

In some cases, the implementation of operation 696 may actually involve an operation 697 for providing at least greater access via the computing device to the one or more items that are affiliated with the one or more particular entities in response to said determining, the one or more items being ascertained to be affiliated with one or more identifiers associated with the one or more particular entities. For instance, the access providing module 104* including the identifier affiliation ascertaining module 256 (see FIG. 3d) of the computing device 10* providing at least greater access via the computing device 10* to the one or more items that are affiliated with the one or more particular entities in response to said determining, the one or more items being ascertained by the identifier affiliation ascertaining module 256 to be affiliated with one or more identifiers (e.g., telephone numbers, avatar name, etc.) associated with the one or more particular entities.

As further illustrated in FIG. 6d, in various implementations, operation 697 may include one or more additional operations including, for example, an operation 698 for providing at least greater access via the computing device to the one or more items that are affiliated with the one or more particular entities in response to said determining, the one or more items being ascertained to be affiliated with one or more names associated with the one or more particular entities. For instance, the access providing module 104* including the name affiliation ascertaining module 257 (see FIG. 3d) of the computing device 10* providing at least greater access via the computing device 10* to the one or more items that are affiliated with the one or more particular entities in response to said determining, the one or more items being ascertained by name affiliation ascertaining module 257 to be affiliated with one or more names (e.g., legal names or usernames) associated with the one or more particular entities.

In the same or different implementations, operation 697 may additionally or alternatively include an operation 699 for providing at least greater access via the computing device to the one or more items that are affiliated with the one or more particular entities in response to said determining, the one or more items being ascertained to be affiliated with one or more images associated with the one or more particular entities. For instance, the access providing module 104* including the image affiliation ascertaining module 258 (see FIG. 3d) of the computing device 10* providing at least greater access via the computing device 10* to the one or more items that are affiliated with the one or more particular entities in response to said determining, the one or more items being ascertained by the image affiliation ascertaining module 258 to be affiliated with one or more images (e.g., facial images) associated with the one or more particular entities.

In the same or different implementations, operation 697 may additionally or alternatively include an operation 600 for providing at least greater access via the computing device to the one or more items that are affiliated with the one or more particular entities in response to said determining, the one or more items being ascertained to be affiliated with one or more signature voice patterns associated with the one or more particular entities. For instance, the access providing module 104* including the voice pattern affiliation ascertaining module 259 (see FIG. 3d) of the computing device 10* providing at least greater access via the computing device 10* to the one or more items that are affiliated with the one or more particular entities in response to said determining, the one or more items being ascertained by the voice pattern affiliation ascertaining module 259 to be affiliated with one or more signature voice patterns associated with the one or more particular entities (e.g., persons).

In some implementations, operation 696 for providing at least greater access via the computing device to one or more items that are affiliated with one or more particular entities in response to said determining, the one or more items selectively being at least partly not accessible as a result of their affiliation with the one or more particular entities when the computing device was in the possession of the second user may include an operation 601 for providing at least greater access via the computing device to the one or more items that are affiliated with the one or more particular entities in response to said determining, the one or more items being ascertained to be addressed to the one or more particular entities as depicted in FIG. 6d. For instance, the access providing module 104* including the address ascertaining module 260 (see FIG. 3d) of the computing device 10* providing at least greater access via the computing device 10* to the one or more items that are affiliated with the one or more particular entities in response to said determining, the one or more items (e.g., draft messages from the first user 20) being ascertained by the address ascertaining module 260 to be addressed to the one or more particular entities.

In some implementations, operation 696 may additionally or alternatively include an operation 602 for providing at least greater access via the computing device to the one or more items that are affiliated with the one or more particular entities in response to said determining, the one or more items being ascertained to be sourced from the one or more particular entities. For instance, the access providing module 104* including the source ascertaining module 262 (see FIG. 3d) of the computing device 10* providing at least greater access via the computing device 10* to the one or more items that are affiliated with the one or more particular entities in response to said determining, the one or more items being ascertained by the source ascertaining module 262 to be sourced from (e.g., generated from or received from) the one or more particular entities.

In some implementations, operation 696 may additionally or alternatively include an operation 603 for providing at least greater access via the computing device to the one or more items that are affiliated with the one or more particular entities in response to said determining, the one or more items ascertained to include one or more particular words, phrases, and/or numbers affiliated with the one or more particular entities. For instance, the access providing module 104* including the word/phrase/number inclusion ascertaining module 264 (see FIG. 3d) of the computing device 10* providing at least greater access via the computing device 10* to the one or more items that are affiliated with the one or more particular entities in response to said determining, the one or more items ascertained by the word/phrase/number inclusion ascertaining module 264 to include one or more particular words, phrases, and/or numbers (e.g., nicknames, motto, subject headings, telephone numbers, and so forth) affiliated with the one or more particular entities.

Figure 7:
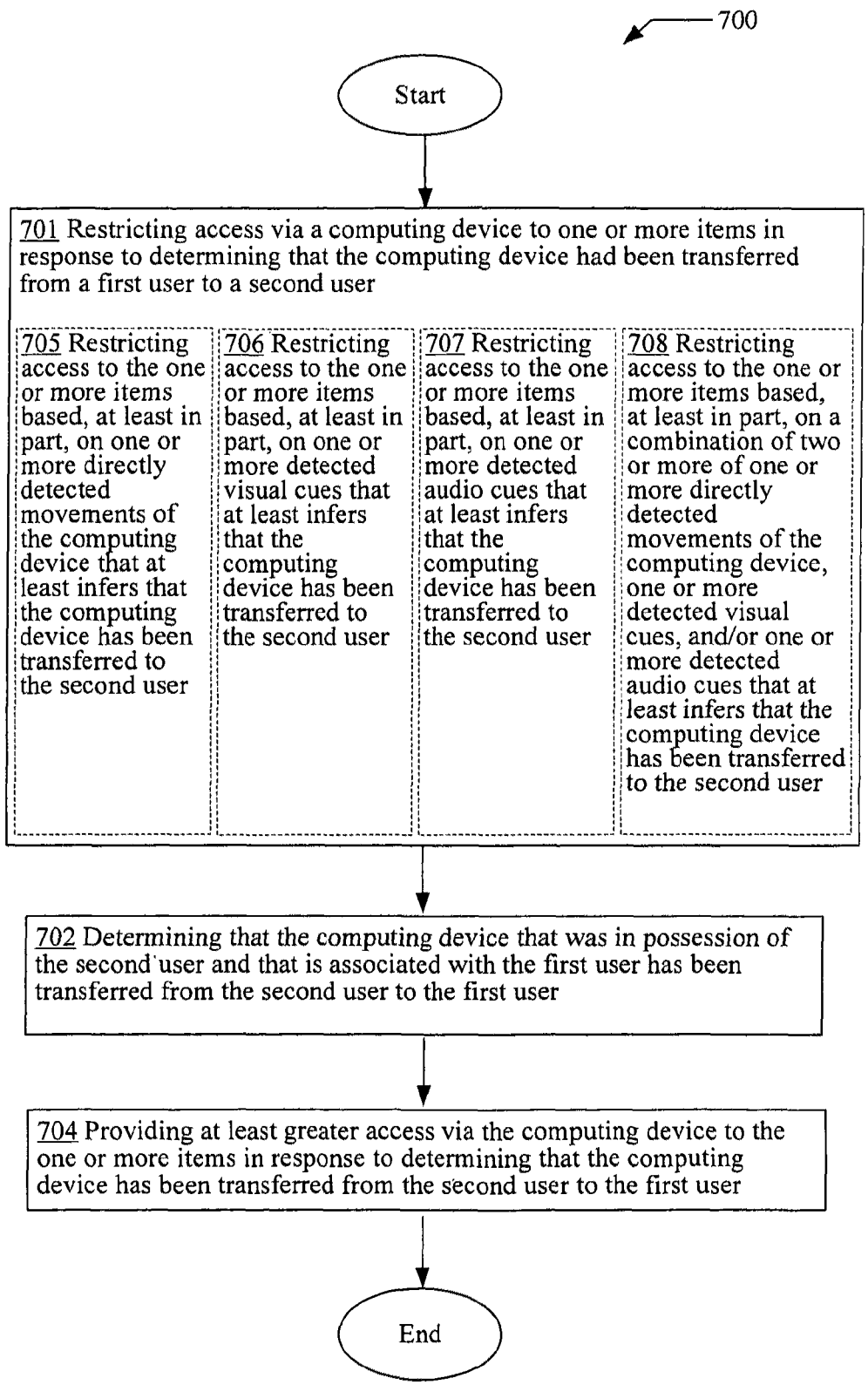
FIG. 7 is another high-level logic flowchart of another process.

Turning now to FIG. 7 illustrating another operational flow 700. Operational flow 700 includes certain operations that essentially mirror the operations included in operational flow 400 of FIG. 4. These operations include a transfer determining operation 702 and an access providing operation 704 that corresponds to and essentially mirror the transfer determining operation 402 and the access providing operation 404, respectively, of FIG. 4.

In addition, operational flow 700 includes an access restricting operation 701 for restricting access via the computing device to the one or more items in response to determining that the computing device had been transferred from the first user to the second user. For instance, the access restricting module 106* of the computing device 10* restricting access (e.g., restricting editorial access, functional access, viewing or listening access, and/or other types of access) via the computing device 10* to the one or more items in response to determining that the computing device 10* had been transferred from the first user 20 to the second user 30.

As further depicted in FIG. 7, the access restricting operation 701 may include one or more additional operations in various alternative implementations. For example, in some implementations, the access restricting operation 701 may include an operation 705 for restricting access to the one or more items based, at least in part, on one or more directly detected movements of the computing device that at least infers that the computing device has been transferred to the second user. For instance, the access restricting module 106* including the direct movement detecting module 266 (see FIG. 3e) of the computing device 10* restricting access to the one or more items based, at least in part, on one or more directly detected movements of the computing device 10* as detected by the direct movement detecting module 266 that at least infers that the computing device 10* has been transferred to the second user 30 from the first user 20. Note that in some implementations, the direct movement detecting module 266 of FIG. 3e may be the same as the direct movement detecting module 230 of FIG. 3c.

In some implementations, the access restricting operation 701 of FIG. 7 may additionally or alternatively include an operation 706 for restricting access to the one or more items based, at least in part, on one or more detected visual cues that at least infers that the computing device has been transferred to the second user as further illustrated in FIG. 7. For instance, the access restricting module 106* including the visual cue detecting module 268 (see FIG. 3e), which may be the same as the visual cue detecting module 210 of FIG. 3c, of the computing device 10* restricting access to the one or more items based, at least in part, on one or more detected visual cues as detected by the visual cue detecting module 268 that at least infers that the computing device 10* has been transferred to the second user 30 from the first user 20.

In some implementations, the access restricting operation 701 of FIG. 7 may additionally or alternatively include an operation 707 for restricting access to the one or more items based, at least in part, on one or more detected audio cues that at least infers that the computing device has been transferred to the second user. For instance, the access restricting module 106* including the audio cue detecting module 270 (see FIG. 3e), which may be the same as the audio cue detecting module 226 of FIG. 3c, of the computing device 10* restricting access to the one or more items based, at least in part, on one or more detected audio cues as detected by the audio cue detecting module 270 that at least infers that the computing device 10* has been transferred to the second user 30 from the first user 20.

In some implementations, the access restricting operation 701 of FIG. 7 may additionally or alternatively include an operation 708 for restricting access to the one or more items based, at least in part, on a combination of two or more of one or more directly detected movements of the computing device, one or more detected visual cues, and/or one or more detected audio cues that at least infers that the computing device has been transferred to the second user. For instance, the access restricting module 106* including the direct movement detecting module 266, the visual cue detecting module 268, and/or the audio cue detecting module 270 of the computing device 10* restricting access to the one or more items based, at least in part, on a combination of two or more of one or more directly detected movements of the computing device 10* as detected by the direct movement detecting module 266, one or more detected visual cues as detected by the visual cue detecting module 268, and/or one or more detected audio cues as detected by the audio cue detecting module 270 that at least infers that the computing device 10* has been transferred to the second user 30 from the first user 20.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system comprising:
   one or more hardware processors;
   a transfer determining module configured to determine that a computing device that was in possession of a second user and that is associated with a first user has been transferred from the second user to the first user, wherein said transfer determining module includes:
   a transfer determining module including a visual cue detecting module configured to determine that the computing device has been transferred from the second user to the first user when the visual cue detecting module at least detects presence or absence of one or more visual cues in proximate vicinity of the computing device, and wherein the visual cue detecting module includes:
- a face detecting module configured to detect the presence or absence of the one or more visual cues in the proximate vicinity of the computing device when the face detecting module at least detects presence of a first face associated with the first user and a second face associated with the second user in the proximate vicinity of the computing device, the first face being detected as being closer to the computing device than the second face; and
- an access providing module configured to provide via the computing device and in response to determining that the computing device has been transferred from the second user to the first user at least greater access to one or more items.

2. The system of claim 1, wherein said transfer determining module including a visual cue detecting module comprises:
- a visual cue detecting module including a face detecting module configured to detect the presence or absence of the one or more visual cues in the proximate vicinity of the computing device when the face detecting module at least detects presence of at least one face in the proximate vicinity of the computing device that is recognized as being associated with the first user.

3. The system of claim 2, wherein said visual cue detecting module including a face detecting module comprises:
- a visual cue detecting module including a face detecting module configured to detect the presence or absence of the one or more visual cues in the proximate vicinity of the computing device when the face detecting module detects absence of a face in the proximate vicinity of the computing device not associated with the first user.

4. The system of claim 1, wherein said transfer determining module including a visual cue detecting module comprises:
- a visual cue detecting module including an eye detecting module configured to detect the presence or absence of the one or more visual cues in the proximate vicinity of the computing device when the eye detecting module at least detects presence of at least one eye in the proximate vicinity of the computing device that is recognized as being associated with the first user.

5. The system of claim 4, wherein said visual cue detecting module including an eye detecting module comprises:
- a visual cue detecting module including an eye detecting module configured to detect the presence or absence of the one or more visual cues in the proximate vicinity of the computing device when the eye detecting module detects absence of an eye in the proximate vicinity of the computing device not associated with the first user.

6. The system of claim 1, wherein said transfer determining module including a visual cue detecting module comprises:
- a visual cue detecting module including a visual moving closer detecting module configured to detect the presence or absence of the one or more visual cues in the proximate vicinity of the computing device when the visual moving closer detecting module at least detects visually that the computing device has moved closer to the first user.

7. The system of claim 6, wherein said visual cue detecting module including a visual moving closer detecting module comprises:
- a visual cue detecting module including a visual moving closer detecting module configured to detect the presence or absence of the one or more visual cues in the proximate vicinity of the computing device when the visual moving closer detecting module at least detects visually that the computing device has moved closer to one or more physical features associated with the first user.

8. The system of claim 7, wherein said visual cue detecting module including a visual moving closer detecting module comprises:
- a visual cue detecting module including a visual moving closer detecting module configured to detect the presence or absence of the one or more visual cues in the proximate vicinity of the computing device when the visual moving closer detecting module at least detects visually that the computing device has moved closer to a face or one or more eyes recognized as being associated with the first user.

9. The system of claim 6, wherein said visual cue detecting module including a visual moving closer detecting module comprises:
- a visual cue detecting module including a visual moving closer detecting module and a visual moving away detecting module configured to detect the presence or absence of the one or more visual cues in the proximate vicinity of the computing device when the visual moving closer detecting module detects visually that the computing device has moved closer to the first user and when the visual moving away detecting module detects visually that the computing device has moved away from the second user.

10. The system of claim 9, wherein said visual cue detecting module including a visual moving closer detecting module and a visual moving away detecting module comprises:
- a visual moving closer detecting module and a visual moving away detecting module configured to detect visually that the computing device has moved closer to the first user and has moved away from the second user when the visual moving away detecting module at least detects visually that the computing device has moved away from one or more physical features associated with the second user.

11. The system of claim 10, wherein said visual moving closer detecting module and a visual moving away detecting module comprises:
- a visual moving away detecting module configured to detect visually that the computing device has moved away from a face or one or more eyes associated with the second user.

12. The system of claim 1, wherein said transfer determining module including a visual cue detecting module comprises:
- a transfer determining module including a visual cue detecting module and an audio cue detecting module configured to determine that the computing device has been transferred from the second user to the first user when the visual cue detecting module detects the presence or absence of the one or more visual cues in the proximate vicinity of the computing device and when the audio cue detecting module detects presence or absence of one or more audio cues in proximate vicinity of the computing device.

13. The system of claim 12, wherein said transfer determining module including a visual cue detecting module and an audio cue detecting module comprises:
- a transfer determining module including a visual cue detecting module, an audio cue detecting module, and a direct movement detecting module configured to determine that the computing device has been transferred from the second user to the first user when the visual cue detecting module detects the presence or absence of the one or more visual cues in the proximate vicinity of the computing device, when the audio cue detecting module detects presence or absence of one or more audio cues in proximate vicinity of the computing device, and when the direct movement detecting module detects directly one or more movements of the computing device that at least infers that the computing device has been transferred between two users.

14. The system of claim 1, wherein said transfer determining module including a visual cue detecting module comprises:
a transfer determining module including a visual cue detecting module and a direct movement detecting module configured to determine that the computing device has been transferred from the second user to the first user when the visual cue detecting module detects the presence or absence of the one or more visual cues in the proximate vicinity of the computing device and when the direct movement detecting module detects directly one or more movements of the computing device that at least infers that the computing device has been transferred between two users.

15. The system of claim 14, wherein said transfer determining module including a visual cue detecting module and a direct movement detecting module comprises:
a direct movement detecting module including a spatial location detecting module configured to detect directly the one or more movements of the computing device that at least infers that the computing device has been transferred between two users when the spatial location detecting module detects directly that the computing device is at least no longer at a particular spatial location that the computing device was detected as being located at when the computing device was possessed by the second user.

16. The system of claim 15, wherein said direct movement detecting module including a spatial location detecting module comprises:
a spatial location detecting module including a movement path detecting module configured to detect directly that the computing device is at least no longer at the particular spatial location that the computing device was detected as being located at when the computing device was possessed by the second user when the movement path detecting module detects directly that the computing device has been relocated from the particular spatial location to another spatial location via a particular movement path that at least infers that the computing device has been transferred between two users.

17. The system of claim 15, wherein said direct movement detecting module including a spatial location detecting module comprises:
a spatial location detecting module configured to detect directly that the computing device is at least no longer at the particular spatial location that the computing device was detected as being located at when the computing device was possessed by the second user by detecting directly that the computing device has been relocated from the particular spatial location to another spatial location that is at least a predefined distance away from the particular spatial location that the computing device was detected as being located at when the computing device was possessed by the second user.

18. The system of claim 14, wherein said transfer determining module including a visual cue detecting module and a direct movement detecting module comprises:
a direct movement detecting module including a vibration detecting module configured to detect directly the one or more movements of the computing device that at least infers that the computing device has been transferred between two users when the vibration detecting module detects directly that the computing device is vibrating in a manner that matches with a signature vibration pattern associated with the first user.

19. The system of claim 14, wherein said transfer determining module including a visual cue detecting module and a direct movement detecting module comprises:
a direct movement detecting module including a three-dimensional movement detecting module configured to detect directly the one or more movements of the computing device that at least infers that the computing device has been transferred between two users when the three-dimensional movement detecting module detects directly that the computing device has exhibited one or more three-dimensional movements that infer that the computing device has been transferred between two users.

20. The system of claim 1, wherein said transfer determining module comprises:
a transfer determining module including an audio cue detecting module configured to determine that the computing device has been transferred from the second user to the first user when the audio cue detecting module at least detects presence or absence of one or more audio cues in proximate vicinity of the computing device.

21. The system of claim 20, wherein said transfer determining module including an audio cue detecting module comprises:
an audio cue detecting module including a voice pattern detecting module configured to detect the presence or absence of the one or more audio cues in the proximate vicinity of the computing device when the voice pattern detecting module detects in the proximate vicinity of the computing device presence of a voice pattern that matches with a signature voice pattern of the first user.

22. The system of claim 21, wherein said audio cue detecting module including a voice pattern detecting module comprises:
an audio cue detecting module including a voice pattern detecting module configured to detect the presence or absence of the one or more audio cues in the proximate vicinity of the computing device when the voice pattern detecting module detects in the proximate vicinity of the computing device presence of the voice pattern that matches with the signature voice pattern of the first user and by detecting in the proximate vicinity of the computing device absence of any voice patterns that matches with the signature voice pattern of first user.

23. The system of claim 20, wherein said transfer determining module including an audio cue detecting module comprises:
an audio cue detecting module including an audio moving closer detecting module configured to detect the presence or absence of the one or more audio cues in the proximate vicinity of the computing device when the audio moving closer detecting module detects audibly that the computing device has moved closer to the first user.

24. The system of claim 23, wherein said audio cue detecting module including an audio moving closer detecting module comprises:
an audio moving closer detecting module configured to detect audibly that the computing device has moved closer to the first user by detecting audibly that the computing device has moved closer to a source of a voice pattern that matches with a signature voice pattern of the first user.

25. The system of claim 23, wherein said audio cue detecting module including an audio moving closer detecting module comprises:
an audio cue detecting module including an audio moving closer detecting module configured to detect the presence or absence of the one or more audio cues in the proximate vicinity of the computing device by detecting audibly that the computing device has moved closer to the first user and has moved away from the second user.

26. The system of claim 25, wherein said audio cue detecting module including an audio moving closer detecting module comprises:
an audio moving closer detecting module and an audio moving away detecting module configured to detect audibly that the computing device has moved closer to the first user and has moved away from the second user by at least detecting audibly that the computing device has moved away from a source of a voice pattern recognized as not matching with a signature voice pattern of the first user.

27. The system of claim 20, wherein said transfer determining module including an audio cue detecting module comprises:
a transfer determining module including an audio cue detecting module and a direct movement detecting module configured to determine that the computing device has been transferred from the second user to the first user when the audio cue detecting module detects presence or absence of one or more audio cues in proximate vicinity of the computing device and the direct movement detecting module detects directly one or more movements of the computing device that at least infers that the computing device has been transferred between two users.

28. The system of claim 27, wherein said transfer determining module including an audio cue detecting module and a direct movement detecting module comprises:
a direct movement detecting module including a three-dimensional movement detecting module configured to detect directly the one or more movements of the computing device that at least infers that the computing device has been transferred between two users by detecting directly that the computing device has exhibited one or more three-dimensional movements that infer that the computing device has been transferred between two users.

29. The system of claim 1, wherein said access providing module comprises:
an access providing module configured to provide via the computing device at least greater access to the one or more items by providing at least greater access to the one or more items that were at least not partially accessible by the second user when the second user had possession of the computing device.

30. The system of claim 29, wherein said access providing module comprises:
an access providing module configured to provide via the computing device at least greater access to the one or more items by providing at least greater access to the one or more items that were totally inaccessible by the second user when the second user had possession of the computing device.

31. The system of claim 1, wherein said access providing module comprises:
an access providing module configured to provide via the computing device at least greater access to the one or more items by providing total or unrestricted access to the one or more items.

32. The system of claim 1, wherein said access providing module comprises:
a viewing access providing module configured to provide via the computing device greater viewing access to the one or more items.

33. The system of claim 1, wherein said access providing module comprises:
an audio access providing module configured to provide via the computing device greater audio access to the one or more items in response to determining that the computing device has been transferred from the second user to the first user.

34. The system of claim 1, wherein said access providing module comprises:
an editable format presenting module configured to present, via the computing device and in response at least in part to determining that the computing device has been transferred from the second user to the first user, the one or more items in one or more formats that allow one or more editorial actions to be executed on one or more parts of the one or more items, the one or more editorial actions not previously available to be executed on the one or more parts of the one or more items when the second user was in possession of the computing device.

35. The system of claim 34, wherein said editable format presenting module comprises:
an editable format presenting module configured to present, via the computing device and in response at least in part to determining that the computing device has been transferred from the second user to the first user, the one or more items in one or more formats that allow all editorial actions to be executed on one or more parts of the one or more items, the editorial actions not being previously available to be executed on the one or more parts of the one or more items when the second user was in possession of the computing device.

36. The system of claim 1, wherein said access providing module comprises:
a functional format presenting module configured to present, via the computing device and in response at least in part to determining that the computing device has been transferred from the second user to the first user, the one or more items in one or more formats that allow one or more functionalities of the one or more items to be executed, the one or more functionalities of the one or more items not previously available for execution when the second user was in possession of the computing device.

37. The system of claim 1, wherein said access providing module comprises:
an access providing module configured to provide via the computing device at least greater access to one or more electronic documents in response to said determining that the computing device has been transferred from the second user to the first user.

38. The system of claim 1, wherein said access providing module comprises:

an access providing module configured to provide via the computing device access to one or more credentials in response to determining that the computing device has been transferred from the second user to the first user.

39. The system of claim 1, wherein said access providing module comprises:
an access providing module configured to provide via the computing device at least greater access to one or more applications in response to determining that the computing device has been transferred from the second user to the first user.

40. The system of claim 1, wherein said access providing module comprises:
an access providing module configured to provide via the computing device at least greater access to one or more items that are affiliated with one or more particular entities in response to determining that the computing device has been transferred from the second user to the first user, the one or more items selectively being at least partly not accessible as a result of their affiliation with the one or more particular entities when the computing device was in the possession of the second user.

41. A computer program product comprising:
a non-transitory article of manufacture bearing
one or more instructions for determining that a computing device associated with a first user and that was in possession of a second user has been transferred from the second user to the first user, wherein said one or more instructions for determining that a computing device associated with a first user and that was in possession of a second user has been transferred from the second user to the first user includes:
one or more instructions for determining that the computing device has been transferred from the second user to the first user upon at least a detection of a presence or absence of one or more visual cues in proximate vicinity of the computing device, wherein said one or more instructions for determining that the computing device has been transferred from the second user to the first user by at least a detection of a presence or absence of one or more visual cues in proximate vicinity of the computing device includes:
one or more instructions for detecting the presence or absence of the one or more visual cues in the proximate vicinity of the computing device by detecting a presence of a first face associated with the first user and a second face associated with the second user in the proximate vicinity of the computing device, the first face being detected as being closer to the computing device than the second face; and
one or more instructions for providing at least greater access via the computing device to one or more items in response to determining that the computing device has been transferred from the second user to the first user.

* * * * *

UNITED STATES PATENT AND TRADEMARK OFFICE
CERTIFICATE OF CORRECTION

PATENT NO. : 8,347,399 B2
APPLICATION NO. : 13/066917
DATED : January 1, 2013
INVENTOR(S) : Royce A. Levien et al.

Page 1 of 1

It is certified that error appears in the above-identified patent and that said Letters Patent is hereby corrected as shown below:

In the Specifications:

In Column 1, Line 30 please insert the following priority claim:

--For purposes of the USPTO extra-statutory requirements, the present application constitutes a continuation-in-part of United States Patent Application No. 13/065,964, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 31 March 2011, which is currently co-pending or is an application of which a currently co-pending application is entitled to the benefit of the filing date.--

Signed and Sealed this
Ninth Day of July, 2013

Teresa Stanek Rea
*Acting Director of the United States Patent and Trademark Office*